US012543675B2

(12) United States Patent
Riccardi et al.

(10) Patent No.: US 12,543,675 B2
(45) Date of Patent: Feb. 10, 2026

(54) *CAPSICUM ANNUUM* PLANTS HAVING IMPROVED THRIPS RESISTANCE

(71) Applicant: NUNHEMS B.V., Nunhem (NL)

(72) Inventors: Paolo Riccardi, Sant Agata Bolognese (IT); Nelson Davila Olivas, Nunhem (NL); Louis Gisberts, Nunhem (NL); Alberto Reggiani, Sant Agata Bolognese (IT)

(73) Assignee: NUNHEMS B.V., Nunhem (NL)

( * ) Notice: Subject to any disclaimer, the term of this patent is extended or adjusted under 35 U.S.C. 154(b) by 510 days.

(21) Appl. No.: 18/009,660

(22) PCT Filed: Jun. 1, 2021

(86) PCT No.: PCT/EP2021/064664
§ 371 (c)(1),
(2) Date: Dec. 9, 2022

(87) PCT Pub. No.: WO2021/249826
PCT Pub. Date: Dec. 16, 2021

(65) Prior Publication Data
US 2023/0232762 A1    Jul. 27, 2023

(30) Foreign Application Priority Data
Jun. 10, 2020   (EP) ..................................... 20179345

(51) Int. Cl.
C12N 15/82       (2006.01)
A01H 5/08        (2018.01)
A01H 6/82        (2018.01)

(52) U.S. Cl.
CPC .............. *A01H 5/08* (2013.01); *A01H 6/822* (2018.05)

(58) Field of Classification Search
CPC ................................. A01H 5/08; A01H 6/822
See application file for complete search history.

(56) References Cited

FOREIGN PATENT DOCUMENTS

| EP | 0534858 A1 | 3/1993 |
|---|---|---|
| WO | 2008/135510 A1 | 11/2008 |
| WO | 2015/000992 A1 | 1/2015 |

OTHER PUBLICATIONS

Maharijaya et al., 2015, QTL mapping of thrips resistance in pepper, Theor. Appl. Genet. 128: 1945-1956 (Year: 2015).*
"A major QTL for thrips resistance (*Frankliniella occidentalis*) on chromosome 7 of pepper (*Capsicum annuum*)", IPCOM000247917D, IP.Com Prior Art Database Technical Disclosure, IP.Com, Oct. 11, 2016, 3 pages.
Allen, et al., "Transcript-specific, single-nucleotide polymorphism discovery and linkage analysis in hexaploid bread wheat (*Triticum aestivum* L.)", Plant biotechnology journal, vol. 9, Issue 9, Jun. 1, 2011, pp. 1086-1099.
Antonio Tiezzi, "The pollen tube cytoskeleton", Electron microscopy reviews, vol. 4, Issue 2, 1991, pp. 205-219.
European Search Report for EP Patent Application No. 20179345.2, Issued on Nov. 9, 2020, 4 pages.
Henikoff, et al., "Amino acid substitution matrices from protein blocks", Proceedings of the National Academy of Sciences, vol. 89, Issue 22, Nov. 15, 1992, pp. 10915-10919.
International Search Report for PCT Patent Application No. PCT/EP2021/064664, Issued on Sep. 1, 2021, 4 pages.
Koornneef, et al., "Naturally occurring genetic variation in *Arabidopsis thaliana*", Annual Review of Plant Biology, vol. 55, Dec. 12, 2003, pp. 141-172.
Macel, et al., "Metabolomics of Thrips Resistance in Pepper (*Capsicum* spp.) Reveals Monomer and Dimer Acyclic Diterpene Glycosides as Potential Chemical Defenses", Journal of Chemical Ecology, vol. 45, Issue 5-6, Jun. 8, 2019, pp. 490-501.
Maharijaya, et al., "QTL mapping of thrips resistance in pepper", Theoretical and Applied Genetics, vol. 128, Issue 10, Jul. 8, 2015, pp. 1945-1956.
Maharijaya, et al., "Screening of pepper accessions for resistance against two thrips species (*Frankliniella occidentalis* and *Thrips parvispinus*)", Euphytica, vol. 177, Issue 3, Oct. 15, 2010, pp. 401-410.
Rebecca W. Doerge, "Mapping and analysis of quantitative trait loci in experimental populations", Nature Reviews Genetics, vol. 3, Issue 1, Jan. 1, 2002, pp. 43-52.
Visschers, et al., "Resistance to three thrips species in *Capsicum* spp. depends on site conditions and geographic regions", Journal of Applied Entomology, vol. 143, Issue 9, Aug. 6, 2019, pp. 929-941.

* cited by examiner

Primary Examiner — Bratislav Stankovic
(74) Attorney, Agent, or Firm — ArentFox Schiff LLP

(57) ABSTRACT

The present invention relates to a *Capsicum annuum* plant comprising an introgression fragment on chromosome 8 comprising Quantitative Trait Locus QTL8, wherein said QTL8 confers an improved resistance to *Frankliniella occidentalis*. The present invention further relates to a seed produced by the plant according to the present invention, a seed from which a plant according to present invention can be grown, a fruit produced by a plant according to the present invention and a part of a plant according to the present invention. The present invention further relates to a method of identifying and/or selecting a plant or plant part according to the present invention. The present invention further relates to a method for producing a *Capsicum annuum* plant having the improved resistance to *Frankliniella occidentalis* according to the present invention. The present invention further relates to a method for improving the resistance of a *Capsicum annuum* plant to *Frankliniella occidentalis*, the use of QTL8 according to the present invention for improving the resistance of a *Capsicum annuum* plant to *Frankliniella occidentalis*. The present invention further relates to genetic markers specific for QTL8 according to the present invention and the use thereof for selecting a *Capsicum annuum* plant having an improved resistance to *Frankliniella occidentalis*.

17 Claims, 1 Drawing Sheet
Specification includes a Sequence Listing.

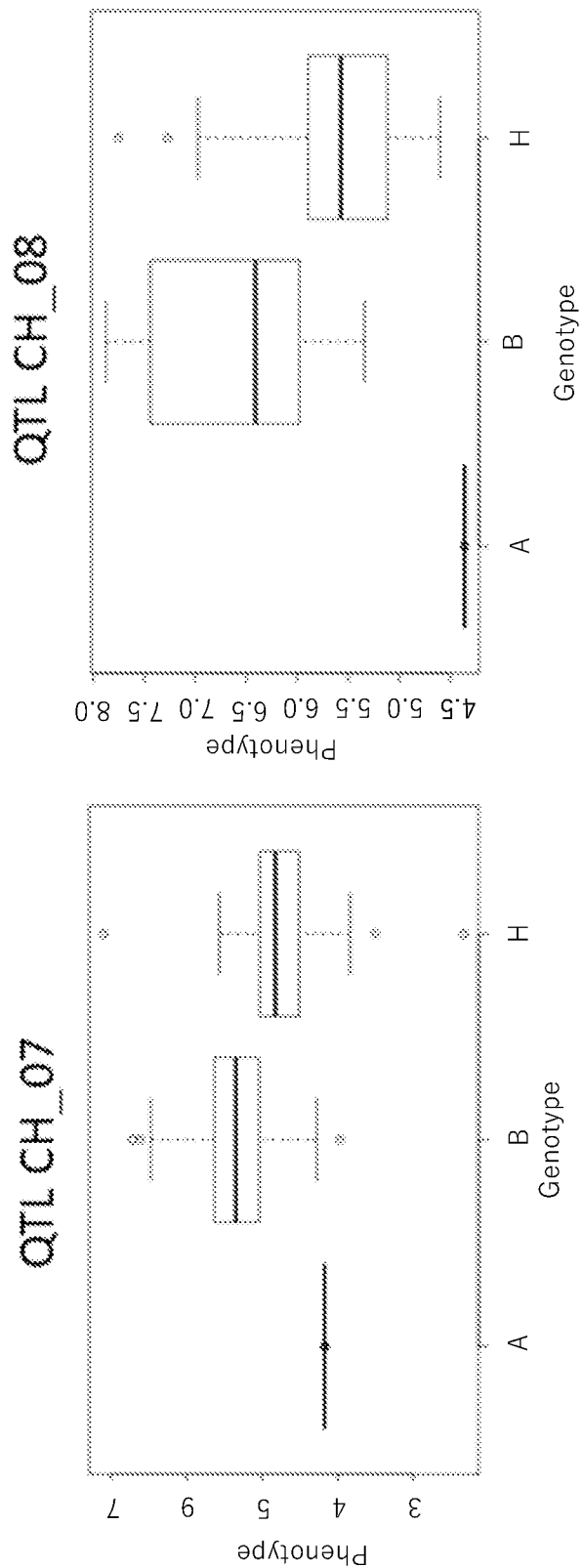

```
                              SEQUENCE LISTING

<160> NUMBER OF SEQ ID NOS: 81

<210> SEQ ID NO 1
<211> LENGTH: 101
<212> TYPE: DNA
<213> ORGANISM: Capsicum annuum

<400> SEQUENCE: 1
aggcacggac gaagccagcc actattgtca ttaagcatat ttcatgagtt taatatctgt      60
tggattaaga aacatacccca ttcaagtact gctcctttct g                        101

<210> SEQ ID NO 2
<211> LENGTH: 101
<212> TYPE: DNA
<213> ORGANISM: Capsicum annuum

<400> SEQUENCE: 2
aggcacggac gaagccagcc actattgtca ttaagcatat ttcatgagtt caatatctgt      60
tggattaaga aacatacccca ttcaagtact gctcctttct g                        101

<210> SEQ ID NO 3
<211> LENGTH: 101
<212> TYPE: DNA
<213> ORGANISM: Capsicum annuum

<400> SEQUENCE: 3
tatggttcag cgtttaagat ttgatcaaat tttagtgttg tttgcatgta tatattgttc      60
cctttttaaa gatactagtt caattgaacg ctcatagatt g                        101

<210> SEQ ID NO 4
<211> LENGTH: 101
<212> TYPE: DNA
<213> ORGANISM: Capsicum annuum

<400> SEQUENCE: 4
tatggttcag cgtttaagat ttgatcaaat tttagtgttg tttgcatgta catattgttc      60
cctttttaaa gatactagtt caattgaacg ctcatagatt g                        101

<210> SEQ ID NO 5
<211> LENGTH: 101
<212> TYPE: DNA
<213> ORGANISM: Capsicum annuum

<400> SEQUENCE: 5
gaataacaaa tatatagaag taggagactt atcaatttta ctccttttta ataaaaaaat      60
aaataaataa atattatagt aacttcatta atgatactga t                        101

<210> SEQ ID NO 6
<211> LENGTH: 101
<212> TYPE: DNA
<213> ORGANISM: Capsicum annuum

<400> SEQUENCE: 6
gaataacaaa tatatagaag taggagactt atcaatttta ctccttttta gtaaaaaaat      60
aaataaataa atattatagt aacttcatta atgatactga t                        101
```

<210> SEQ ID NO 7
<211> LENGTH: 101
<212> TYPE: DNA
<213> ORGANISM: Capsicum annuum

<400> SEQUENCE: 7
gttactcccg ccgtttgctt ttacttgtca ctaatttcct aattgtattt ctatttttac    60
ttatcatttt tgacatatca agaaaagaca acttctttttt t                       101

<210> SEQ ID NO 8
<211> LENGTH: 101
<212> TYPE: DNA
<213> ORGANISM: Capsicum annuum

<400> SEQUENCE: 8
gttactcccg ccgtttgctt ttacttgtca ctaatttcct aattgtattt ttatttttac    60
ttatcatttt tgacatatca agaaaagaca acttctttttt t                       101

<210> SEQ ID NO 9
<211> LENGTH: 101
<212> TYPE: DNA
<213> ORGANISM: Capsicum annuum

<400> SEQUENCE: 9
tataagaagt gtcctgttac tgtccttcat caggtcatat gtgttgatct aattgagata    60
gatatagttg attttgatgt cattctgggt atagattggt t                        101

<210> SEQ ID NO 10
<211> LENGTH: 101
<212> TYPE: DNA
<213> ORGANISM: Capsicum annuum

<400> SEQUENCE: 10
tataagaagt gtcctgttac tgtccttcat caggtcatat gtgttgatct gattgagata    60
gatatagttg attttgatgt cattctgggt atagattggt t                        101

<210> SEQ ID NO 11
<211> LENGTH: 101
<212> TYPE: DNA
<213> ORGANISM: Capsicum annuum

<400> SEQUENCE: 11
gttctgaaca tattatacac ataaattgaa ttattcttgc attggtctct atcttctcaa    60
tgaacaaaga aagaaggtat taagggatca tttggtagta g                        101

<210> SEQ ID NO 12
<211> LENGTH: 101
<212> TYPE: DNA
<213> ORGANISM: Capsicum annuum

<400> SEQUENCE: 12
gttctgaaca tattatacac ataaattgaa ttattcttgc attggtctct gtcttctcaa    60
tgaacaaaga aagaaggtat taagggatca tttggtagta g                        101

<210> SEQ ID NO 13
<211> LENGTH: 101
<212> TYPE: DNA
<213> ORGANISM: Capsicum annuum

<400> SEQUENCE: 13

```
aaaatggact gttcacgcac aaacaatcat gcaaatggcc aaccacataa gcatcgtcga    60
tcaacgatcg cagaatttgc tgttatcggg gtatcatacg c                       101

<210> SEQ ID NO 14
<211> LENGTH: 101
<212> TYPE: DNA
<213> ORGANISM: Capsicum annuum

<400> SEQUENCE: 14
aaaatggact gttcacgcac aaacaatcat gcaaatggcc aaccacataa ccatcgtcga    60
tcaacgatcg cagaatttgc tgttatcggg gtatcatacg c                       101

<210> SEQ ID NO 15
<211> LENGTH: 101
<212> TYPE: DNA
<213> ORGANISM: Capsicum annuum

<400> SEQUENCE: 15
caagtctagt agatcctttt gatcctcaag ttcaactgaa ctactaccca ggtccttcaa    60
caatccactc tctttcatca gtgttcgaat tttctctgca t                       101

<210> SEQ ID NO 16
<211> LENGTH: 101
<212> TYPE: DNA
<213> ORGANISM: Capsicum annuum

<400> SEQUENCE: 16
caagtctagt agatcctttt gatcctcaag ttcaactgaa ctactaccca agtccttcaa    60
caatccactc tctttcatca gtgttcgaat tttctctgca t                       101

<210> SEQ ID NO 17
<211> LENGTH: 101
<212> TYPE: DNA
<213> ORGANISM: Capsicum annuum

<400> SEQUENCE: 17
cattaaccga attaccataa caagaatcat cattctcatg aaatgaaaca caaacttcca    60
acaatgctct atacacattt tgtgaaatct tgaaatcttt t                       101

<210> SEQ ID NO 18
<211> LENGTH: 101
<212> TYPE: DNA
<213> ORGANISM: Capsicum annuum

<400> SEQUENCE: 18
cattaaccga attaccataa caagaatcat cattctcatg aaatgaaaca taaacttcca    60
acaatgctct atacacattt tgtgaaatct tgaaatcttt t                       101

<210> SEQ ID NO 19
<211> LENGTH: 101
<212> TYPE: DNA
<213> ORGANISM: Capsicum annuum

<400> SEQUENCE: 19
acgcaaatga aagatttgat gatttcgagg tcggaaatgt ggccaagaat gttgcagatc    60
atatctacaa atatttcccw caagctgctt tacttctggt a                       101

<210> SEQ ID NO 20
```

<211> LENGTH: 101
<212> TYPE: DNA
<213> ORGANISM: Capsicum annuum

<400> SEQUENCE: 20
acgcaaatga aagatttgat gatttcgagg tcggaaatgt ggccaagaat attgcagatc    60
atatctacaa atatttcccw caagctgctt tacttctggt a                        101

<210> SEQ ID NO 21
<211> LENGTH: 101
<212> TYPE: DNA
<213> ORGANISM: Capsicum annuum

<400> SEQUENCE: 21
tagtgttacc aggcctggaa ctatgaatgc tcaagcacga acaaaacatc gacaacgtgt    60
gcyagatgaa tcatccacat tggagctgtc ctctacatct g                        101

<210> SEQ ID NO 22
<211> LENGTH: 101
<212> TYPE: DNA
<213> ORGANISM: Capsicum annuum

<400> SEQUENCE: 22
tagtgttacc aggcctggaa ctatgaatgc tcaagcacga acaaaacatc aacaacgtgt    60
gcyagatgaa tcatccacat tggagctgtc ctctacatct g                        101

<210> SEQ ID NO 23
<211> LENGTH: 101
<212> TYPE: DNA
<213> ORGANISM: Capsicum annuum

<400> SEQUENCE: 23
ataaaatata aagggtgta aaataaaaga accccataaa gcaagaaaa tgaatttgcc      60 tcagaatcaa caagatttcc agaaagtcca gggccaccag g                        101

<210> SEQ ID NO 24
<211> LENGTH: 101
<212> TYPE: DNA
<213> ORGANISM: Capsicum annuum

<400> SEQUENCE: 24
ataaaatata aagggtgta aaataaaaga accccataaa gcaagaaaa ggaatttgcc      60 tcagaatcaa caagatttcc agaaagtcca gggccaccag g                        101

<210> SEQ ID NO 25
<211> LENGTH: 101
<212> TYPE: DNA
<213> ORGANISM: Capsicum annuum

<400> SEQUENCE: 25
gagattgagg tctatgtaga tgatgtgatt caaagagtca ggctgaccat attaaagatt    60
taaaaaagtt ctttgaaagg cttcgcaggt ataatctcaa a                        101

<210> SEQ ID NO 26
<211> LENGTH: 101
<212> TYPE: DNA
<213> ORGANISM: Capsicum annuum

<400> SEQUENCE: 26
gagattgagg tctatgtaga tgatgtgatt caaagagtca ggctgaccat gttaaagatt    60

```
taaaaaagtt ctttgaaagg cttcgcaggt ataatctcaa a                          101
```

<210> SEQ ID NO 27
<211> LENGTH: 101
<212> TYPE: DNA
<213> ORGANISM: Capsicum annuum

<400> SEQUENCE: 27

```
ttattcagtt ccttagattt cccttgtgtc ttgcaaaaca gaagcttaac taactcttca      60
tgtccatcaa gaatgtgaag taggctttcc tccaagtacg g                         101
```

<210> SEQ ID NO 28
<211> LENGTH: 101
<212> TYPE: DNA
<213> ORGANISM: Capsicum annuum

<400> SEQUENCE: 28

```
ttattcagtt ccttagattt cccttgtgtc ttgcaaaaca gaagcttaac caactcttca     60
tgtccatcaa gaatgtgaag taggctttcc tccaagtacg g                        101
```

<210> SEQ ID NO 29
<211> LENGTH: 101
<212> TYPE: DNA
<213> ORGANISM: Capsicum annuum

<400> SEQUENCE: 29

```
tgaagaggag gaccgcagag ctgagcattg ccactatagg atgatctatc gaaactctgg     60
agttgagtgc ttgttggaat tctccctgat aagtggttgt t                        101
```

<210> SEQ ID NO 30
<211> LENGTH: 101
<212> TYPE: DNA
<213> ORGANISM: Capsicum annuum

<400> SEQUENCE: 30

```
tgaagaggag gaccgcagag ctgagcattg ccactatagg atgatctatc aaaactctgg     60
agttgagtgc ttgttggaat tctccctgat aagtggttgt t                        101
```

<210> SEQ ID NO 31
<211> LENGTH: 101
<212> TYPE: DNA
<213> ORGANISM: Capsicum annuum

<400> SEQUENCE: 31

```
gccggtgctg agatggacgg cgtcagccat ggatgccgat ggggtcgtt gggttggtcg      60
ctggtgaagt ttgttgagag agagagtgag agtctagaga g                        101
```

<210> SEQ ID NO 32
<211> LENGTH: 101
<212> TYPE: DNA
<213> ORGANISM: Capsicum annuum

<400> SEQUENCE: 32

```
gccggtgctg agatggacgg cgtcagccat ggatgccgat ggggtcgtt tggttggtcg      60
ctggtgaagt ttgttgagag agagagtgag agtctagaga g                        101
```

<210> SEQ ID NO 33
<211> LENGTH: 101
<212> TYPE: DNA

<213> ORGANISM: Capsicum annuum

<400> SEQUENCE: 33
aatatgtgga tagcttgaca tgtgctattt ctcagagagc acggagttgt tggtgatatg    60
agagatgctt ggccaaacgc tcgtgtgagg aaaaatgtat c                        101

<210> SEQ ID NO 34
<211> LENGTH: 101
<212> TYPE: DNA
<213> ORGANISM: Capsicum annuum

<400> SEQUENCE: 34
aatatgtgga tagcttgaca tgtgctattt ctcagagagc acggagttgt cggtgatatg    60
agagatgctt ggccaaacgc tcgtgtgagg aaaaatgtat c                        101

<210> SEQ ID NO 35
<211> LENGTH: 101
<212> TYPE: DNA
<213> ORGANISM: Capsicum annuum

<400> SEQUENCE: 35
ggtcatgtcc tcagtcagct gtaactgctc catgtcacgt ttaatcactt tcctccagta    60
tttcttcggt ctacccctgc cccgcttgaa accgtccaag g                        101

<210> SEQ ID NO 36
<211> LENGTH: 101
<212> TYPE: DNA
<213> ORGANISM: Capsicum annuum

<400> SEQUENCE: 36
ggtcatgtcc tcagtcagct gtaactgctc catgtcacgt ttaatcactt ccctccagta    60
tttcttcggt ctacccctgc cccgcttgaa accgtccaag g                        101

<210> SEQ ID NO 37
<211> LENGTH: 101
<212> TYPE: DNA
<213> ORGANISM: Capsicum annuum

<400> SEQUENCE: 37
gaataatatt attatttttt ggtagaaagg acatgcatta atataaaga aaacgcagtt     60 taagtttcaa ttttttgacga ttagtcaggg ttcaaaaagg a                       101

<210> SEQ ID NO 38
<211> LENGTH: 101
<212> TYPE: DNA
<213> ORGANISM: Capsicum annuum

<400> SEQUENCE: 38
gaataatatt attatttttt ggtagaaagg acatgcatta atataaaga gaacgcagtt     60 taagtttcaa ttttttgacga ttagtcaggg ttcaaaaagg a                       101

<210> SEQ ID NO 39
<211> LENGTH: 101
<212> TYPE: DNA
<213> ORGANISM: Capsicum annuum

<400> SEQUENCE: 39
agactgagtt ggggaaagta aaatcaagag ggctgttctg taaatgagtc gtcgtttccg    60
ttgaactatc ttgaggcaaa tggctgctaa tgaaggattg a                        101

<210> SEQ ID NO 40
<211> LENGTH: 101
<212> TYPE: DNA
<213> ORGANISM: Capsicum annuum

<400> SEQUENCE: 40
agactgagtt ggggaaagta aaatcaagag ggctgttctg taaatgagtc atcgtttccg    60
ttgaactatc ttgaggcaaa tggctgctaa tgaaggattg a                       101

<210> SEQ ID NO 41
<211> LENGTH: 101
<212> TYPE: DNA
<213> ORGANISM: Capsicum annuum

<400> SEQUENCE: 41
aagggccgaa ctgcaaggat ctatcatgca cggtcatacc ctgcatttct acgagagact    60
gtttcatttc ctgcatttct gcaagagatt gtatccacac c                       101

<210> SEQ ID NO 42
<211> LENGTH: 101
<212> TYPE: DNA
<213> ORGANISM: Capsicum annuum

<400> SEQUENCE: 42
aagggccgaa ctgcaaggat ctatcatgca cggtcatacc ctgcatttct gcgagagact    60
gtttcatttc ctgcatttct gcaagagatt gtatccacac c                       101

<210> SEQ ID NO 43
<211> LENGTH: 101
<212> TYPE: DNA
<213> ORGANISM: Capsicum annuum

<400> SEQUENCE: 43
cccctgcctc rtactagtag agtaattata cgtacctctt tgctatgatt tctttggaag    60
taagtcacca gtaatttgat cacaatccgc ctgtatatca c                       101

<210> SEQ ID NO 44
<211> LENGTH: 101
<212> TYPE: DNA
<213> ORGANISM: Capsicum annuum

<400> SEQUENCE: 44
cccctgcctc rtactagtag agtaattata cgtacctctt tgctatgatt cctttggaag    60
taagtcacca gtaatttgat cacaatccgc ctgtatatca c                       101

<210> SEQ ID NO 45
<211> LENGTH: 101
<212> TYPE: DNA
<213> ORGANISM: Capsicum annuum

<400> SEQUENCE: 45
cgaggcaagt tgccacttat ctttggaaca acttcttggg gggacggtca gcaaatcgtc    60
cacttggtga tgccgtttta gatggaatag actttgatat t                       101

<210> SEQ ID NO 46
<211> LENGTH: 101
<212> TYPE: DNA
<213> ORGANISM: Capsicum annuum

<400> SEQUENCE: 46
cgaggcaagt tgccacttat ctttggaaca acttcttggg gggacggtca acaaatcgtc    60
cacttggtga tgccgtttta gatggaatag actttgatat t                        101

<210> SEQ ID NO 47
<211> LENGTH: 101
<212> TYPE: DNA
<213> ORGANISM: Capsicum annuum

<400> SEQUENCE: 47
atatggacag agatcatcac tgttgtggtt gtccaaatca tctatctagt ggtaagaaag    60
gagggagcag tgtcaagata gawgaacatg accaggataa c                       101

<210> SEQ ID NO 48
<211> LENGTH: 101
<212> TYPE: DNA
<213> ORGANISM: Capsicum annuum

<400> SEQUENCE: 48
atatggacag agatcatcac tgttgtggtt gtccaaatca tctatctagt agtaagaaag    60
gagggagcag tgtcaagata gawgaacatg accaggataa c                       101

<210> SEQ ID NO 49
<211> LENGTH: 101
<212> TYPE: DNA
<213> ORGANISM: Capsicum annuum

<400> SEQUENCE: 49
atgataagag gctgcaacct gttggaacag taaacctkct agcaagagtc gacaattctg    60
gttcctccga tagaacaaat gaggagggtg aagtttatga g                       101

<210> SEQ ID NO 50
<211> LENGTH: 101
<212> TYPE: DNA
<213> ORGANISM: Capsicum annuum

<400> SEQUENCE: 50
atgataagag gctgcaacct gttggaacag taaacctkct agcaagagtc aacaattctg    60
gttcctccga tagaacaaat gaggagggtg aagtttatga g                       101

<210> SEQ ID NO 51
<211> LENGTH: 101
<212> TYPE: DNA
<213> ORGANISM: Capsicum annuum

<400> SEQUENCE: 51
gataactgtt gctggtggga gatgacaggt atctcgtaga gttggtcgag atgcgcaagc    60
tggccccgat accatggtta tcaaaagaaa tagaagctag a                       101

<210> SEQ ID NO 52
<211> LENGTH: 101
<212> TYPE: DNA
<213> ORGANISM: Capsicum annuum

<400> SEQUENCE: 52
gataactgtt gctggtggga gatgacaggt atctcgtaga gttggtcgag gtgcgcaagc    60
tggccccgat accatggtta tcaaaagaaa tagaagctag a                       101

<210> SEQ ID NO 53
<211> LENGTH: 101
<212> TYPE: DNA
<213> ORGANISM: Capsicum annuum

<400> SEQUENCE: 53
ataatatcag gataacttat cccagaacaa ctaatcccag cataactaat tccggtataa    60
tttcagggta aaataacagt cccgggataa actttcaaaa a                        101

<210> SEQ ID NO 54
<211> LENGTH: 101
<212> TYPE: DNA
<213> ORGANISM: Capsicum annuum

<400> SEQUENCE: 54
ataatatcag gataacttat cccagaacaa ctaatcccag cataactaat cccggtataa    60
tttcagggta aaataacagt cccgggataa actttcaaaa a                        101

<210> SEQ ID NO 55
<211> LENGTH: 101
<212> TYPE: DNA
<213> ORGANISM: Capsicum annuum

<400> SEQUENCE: 55
tctgttaatg gagctcggaa gattcaatgt ccatgaagct attcaatctt acgttaatgg    60
aactcggaag attcaatttc cattaatgga actcgggatt a                        101

<210> SEQ ID NO 56
<211> LENGTH: 101
<212> TYPE: DNA
<213> ORGANISM: Capsicum annuum

<400> SEQUENCE: 56
tctgttaatg gagctcggaa gattcaatgt ccatgaagct attcaatctt ccgttaatgg    60
aactcggaag attcaatttc cattaatgga actcgggatt a                        101

<210> SEQ ID NO 57
<211> LENGTH: 101
<212> TYPE: DNA
<213> ORGANISM: Capsicum annuum

<400> SEQUENCE: 57
ggaagctgaa atcaaattat tagacgggtt taggccaacg cgatctcaaa tattccagtc    60
attttcttgg acaaaattta aaatgacaat gcaagcttga t                        101

<210> SEQ ID NO 58
<211> LENGTH: 101
<212> TYPE: DNA
<213> ORGANISM: Capsicum annuum

<400> SEQUENCE: 58
ggaagctgaa atcaaattat tagacgggtt taggccaacg cgatctcaaa gattccagtc    60
attttcttgg acaaaattta aaatgacaat gcaagcttga t                        101

<210> SEQ ID NO 59
<211> LENGTH: 101
<212> TYPE: DNA
<213> ORGANISM: Capsicum annuum

<400> SEQUENCE: 59

```
ctatccagaa aataattcaa agttcaaatg tgaatcggag caaaaaggac ggaaaagctg    60
tagaaattgg tactgtagaa cttccttgtg tgattatata c                      101
```

<210> SEQ ID NO 60
<211> LENGTH: 101
<212> TYPE: DNA
<213> ORGANISM: Capsicum annuum

<400> SEQUENCE: 60

```
ctatccagaa aataattcaa agttcaaatg tgaatcggag caaaaaggac agaaaagctg    60
tagaaattgg tactgtagaa cttccttgtg tgattatata c                      101
```

<210> SEQ ID NO 61
<211> LENGTH: 101
<212> TYPE: DNA
<213> ORGANISM: Capsicum annuum

<400> SEQUENCE: 61

```
aagaatagtt gctccatcaa crcgtacctr catgttgcca ataagagagg caaacagaaa    60
cagcccataa atgcagatta agatggctaa gagaatctcc c                      101
```

<210> SEQ ID NO 62
<211> LENGTH: 101
<212> TYPE: DNA
<213> ORGANISM: Capsicum annuum

<400> SEQUENCE: 62

```
aagaatagtt gctccatcaa crcgtacctr catgttgcca ataagagagg taaacagaaa    60
cagcccataa atgcagatta agatggctaa gagaatctcc c                      101
```

<210> SEQ ID NO 63
<211> LENGTH: 101
<212> TYPE: DNA
<213> ORGANISM: Capsicum annuum

<400> SEQUENCE: 63

```
atcaaatgat ttataagcca aatgaaaaag aaaagcagga ccatacacct gaaatttcgc    60
agcccccacc agaagcaata taagagtttg gaccaaaagt t                      101
```

<210> SEQ ID NO 64
<211> LENGTH: 101
<212> TYPE: DNA
<213> ORGANISM: Capsicum annuum

<400> SEQUENCE: 64

```
atcaaatgat ttataagcca aatgaaaaag aaaagcagga ccatacacct taaatttcgc    60
agcccccacc agaagcaata taagagtttg gaccaaaagt t                      101
```

<210> SEQ ID NO 65
<211> LENGTH: 101
<212> TYPE: DNA
<213> ORGANISM: Capsicum annuum

<400> SEQUENCE: 65

```
atagctgctt aaaagtattt tttaaatcga ttagttgaac ttgaacacaa acacaaacta    60
attctaatca agctgatttt aaaatcttgg ccaaataaac a                      101
```

<210> SEQ ID NO 66
<211> LENGTH: 101

```
<212> TYPE: DNA
<213> ORGANISM: Capsicum annuum

<400> SEQUENCE: 66
atagctgctt aaaagtattt tttaaatcga ttagttgaac ttgaacacaa gcacaaacta    60
attctaatca agctgatttt aaaatcttgg ccaaataaac a                       101

<210> SEQ ID NO 67
<211> LENGTH: 101
<212> TYPE: DNA
<213> ORGANISM: Capsicum annuum

<400> SEQUENCE: 67
ctttcagatt cagagacaac atcttaatca ttcagatgtg cattcagttt tagacctctg    60
aatcttaaaa aaaacaaat gcagccgaac atattgttat t                        101

<210> SEQ ID NO 68
<211> LENGTH: 101
<212> TYPE: DNA
<213> ORGANISM: Capsicum annuum

<400> SEQUENCE: 68
ctttcagatt cagagacaac atcttaatca ttcagatgtg cattcagttt cagacctctg    60
aatcttaaaa aaaacaaat gcagccgaac atattgttat t                        101

<210> SEQ ID NO 69
<211> LENGTH: 101
<212> TYPE: DNA
<213> ORGANISM: Capsicum annuum

<400> SEQUENCE: 69
aggttgatct agaccagcta gaaactttat atagacctct tattgcaaat gtccttgcaa    60
aaagacattg ttcacatcaa attgggaaat atcccacctt t                       101

<210> SEQ ID NO 70
<211> LENGTH: 101
<212> TYPE: DNA
<213> ORGANISM: Capsicum annuum

<400> SEQUENCE: 70
aggttgatct agaccagcta gaaactttat atagacctct tattgcaaat ttccttgcaa    60
aaagacattg ttcacatcaa attgggaaat atcccacctt t                       101

<210> SEQ ID NO 71
<211> LENGTH: 101
<212> TYPE: DNA
<213> ORGANISM: Capsicum annuum

<400> SEQUENCE: 71
ggagaaggtt tcattgaaat caatcccttc cttttgaatg tcacctcgaa ccaccaatct    60
agcctttagt ctctcaagag taccatttgc atgttgttta a                       101

<210> SEQ ID NO 72
<211> LENGTH: 101
<212> TYPE: DNA
<213> ORGANISM: Capsicum annuum

<400> SEQUENCE: 72
ggagaaggtt tcattgaaat caatcccttc cttttgaatg tcacctcgaa tcaccaatct    60
```

```
agcctttagt ctctcaagag taccatttgc atgttgttta a                        101
```

<210> SEQ ID NO 73
<211> LENGTH: 101
<212> TYPE: DNA
<213> ORGANISM: Capsicum annuum

<400> SEQUENCE: 73

```
acacactgct ggaaattact cgacgacttg attgcatcag aggataatga tattggtgtt    60
caggtgagag tgatggatcc acggtgtaaa ttccatgaca t                        101
```

<210> SEQ ID NO 74
<211> LENGTH: 101
<212> TYPE: DNA
<213> ORGANISM: Capsicum annuum

<400> SEQUENCE: 74

```
acacactgct ggaaattact cgacgacttg attgcatcag aggataatga cattggtgtt    60
caggtgagag tgatggatcc acggtgtaaa ttccatgaca t                        101
```

<210> SEQ ID NO 75
<211> LENGTH: 101
<212> TYPE: DNA
<213> ORGANISM: Capsicum annuum

<400> SEQUENCE: 75

```
tgtcattaac tttaattctt atgcaaaatt tggtaggtga gggcaggaaa aacaaaggag    60
caacagagaa aaccaataat ctcccttgca acrtaagact t                        101
```

<210> SEQ ID NO 76
<211> LENGTH: 101
<212> TYPE: DNA
<213> ORGANISM: Capsicum annuum

<400> SEQUENCE: 76

```
tgtcattaac tttaattctt atgcaaaatt tggtaggtga gggcaggaaa gacaaaggag    60
caacagagaa aaccaataat ctcccttgca acrtaagact t                        101
```

<210> SEQ ID NO 77
<211> LENGTH: 101
<212> TYPE: DNA
<213> ORGANISM: Capsicum annuum

<400> SEQUENCE: 77

```
ggaatgcaaa agctatgcag gcatcctgta tttcaactga gtaagccagt caagaagagc    60
agacttatcg ggattgtaaa tagtaggaga ggaggcggag a                        101
```

<210> SEQ ID NO 78
<211> LENGTH: 101
<212> TYPE: DNA
<213> ORGANISM: Capsicum annuum

<400> SEQUENCE: 78

```
ggaatgcaaa agctatgcag gcatcctgta tttcaactga gtaagccagt gaagaagagc    60
agacttatcg ggattgtaaa tagtaggaga ggaggcggag a                        101
```

<210> SEQ ID NO 79
<211> LENGTH: 101
<212> TYPE: DNA
<213> ORGANISM: Capsicum annuum

<400> SEQUENCE: 79
ctggcagaga agattcagag aaatgtgtga cactgaaacc agattagatc agcctacaca    60
tctaccataa ttagtgcaag atatggcctt tcaaacaatc t                       101

<210> SEQ ID NO 80
<211> LENGTH: 101
<212> TYPE: DNA
<213> ORGANISM: Capsicum annuum

<400> SEQUENCE: 80
ctggcagaga agattcagag aaatgtgtga cactgaaacc agattagatc ggcctacaca    60
tctaccataa ttagtgcaag atatggcctt tcaaacaatc t                       101

<210> SEQ ID NO 81
<211> LENGTH: 440
<212> TYPE: PRT
<213> ORGANISM: Capsicum annuum

<400> SEQUENCE: 81

Met Ala Phe Ala Leu Pro Ser Ser Leu Val Ser Val Cys Asn Lys Ser
1               5                   10                  15

Phe Ile Lys Pro Ser Ser Leu Thr Pro Ser Thr Leu Arg Phe His Lys
            20                  25                  30

Leu Ser Phe Ile Asp Gln Ser Leu Ser Asn Met Tyr Ile Pro Cys Ala
        35                  40                  45

Phe Phe Tyr Pro Lys Val Gln Gln Arg Leu Glu Asp Ser Lys Asn Ser
    50                  55                  60

Asp Glu Leu Ser His Ile Ala His Leu Leu Gln Thr Ser Leu Ser Gln
65                  70                  75                  80

Thr Leu Val Ser Tyr Tyr Pro Tyr Ala Gly Lys Leu Lys Asp Asn Ala
                85                  90                  95

Thr Val Asp Cys Asn Asp Met Gly Ala Glu Phe Leu Ser Val Arg Ile
            100                 105                 110

Lys Cys Ser Met Ser Glu Ile Leu Asp His Pro His Ala Ser Leu Ala
        115                 120                 125

Glu Ser Ile Val Leu Pro Lys Asp Leu Pro Trp Ala Asn Asn Cys Glu
    130                 135                 140

Gly Gly Asn Leu Leu Val Val Gln Val Ser Lys Phe Asp Cys Gly Gly
145                 150                 155                 160

Ile Ala Ile Ser Val Cys Phe Ser His Lys Ile Gly Asp Gly Cys Ser
                165                 170                 175

Leu Leu Asn Phe Leu Asn Asp Trp Ser Ser Val Thr Arg Asp His Thr
            180                 185                 190

Thr Thr Thr Leu Val Pro Ser Pro Arg Phe Val Gly Asp Ser Val Phe
        195                 200                 205

Ser Thr Gln Lys Tyr Gly Ser Leu Ile Thr Pro Gln Ile Leu Ser Asp
    210                 215                 220

Leu Asn Gln Cys Val Gln Lys Arg Leu Ile Phe Pro Thr Asp Lys Leu
225                 230                 235                 240

Asp Ala Leu Arg Ala Lys Val Ala Glu Glu Ser Gly Val Lys Asn Pro
                245                 250                 255

Thr Arg Ala Glu Val Val Ser Ala Leu Leu Phe Lys Cys Ala Thr Lys
            260                 265                 270

Ala Ser Ser Ser Met Leu Pro Ser Lys Leu Val His Phe Leu Asn Ile

```
            275                 280                 285
Arg Thr Met Ile Lys Pro Arg Leu Pro Arg Asn Ala Ile Gly Asn Leu
    290                 295                 300

Ser Ser Ile Phe Ser Ile Glu Ala Thr Asn Met Gln Asp Met Glu Leu
305                 310                 315                 320

Pro Thr Leu Val Arg Asn Leu Arg Lys Glu Val Glu Val Ala Tyr Lys
                325                 330                 335

Lys Asp Gln Val Glu Gln Asn Glu Leu Ile Leu Glu Val Val Glu Ser
                340                 345                 350

Met Arg Glu Gly Lys Leu Pro Phe Glu Asn Met Asp Gly Tyr Lys Asn
            355                 360                 365

Val Tyr Thr Cys Ser Asn Leu Cys Lys Tyr Pro Tyr Tyr Thr Val Asp
        370                 375                 380

Phe Gly Trp Gly Arg Pro Glu Arg Val Cys Leu Gly Asn Gly Pro Ser
385                 390                 395                 400

Lys Asn Ala Phe Phe Leu Lys Asp Tyr Lys Ala Gly Gln Gly Val Glu
                405                 410                 415

Ala Arg Val Met Leu His Lys Gln Gln Met Ser Glu Phe Glu Arg Asn
                420                 425                 430

Glu Glu Leu Phe Glu Phe Ile Ala
            435                 440
```

CAPSICUM ANNUUM PLANTS HAVING IMPROVED THRIPS RESISTANCE

CROSS-REFERENCE TO RELATED APPLICATIONS

This application is a National Stage Entry of PCT/EP2021/064664, filed Jun. 1, 2021, which claims priority to European Application No. 20179345.2, filed Jun. 10, 2020, the disclosures of each of which are hereby incorporated by reference in their entireties.

FIELD OF THE INVENTION

The present invention relates to the field of plant breeding. Provided is a *Capsicum annuum* plant comprising an introgression fragment on chromosome 8 comprising Quantitative Trait Locus QTL8, wherein said QTL8 confers an improved resistance to *Frankliniella occidentalis*. The present invention further provides a seed produced by the plant according to the present invention, a seed from which a plant according to present invention can be grown, a fruit produced by a plant according to the present invention and a part of a plant according to the present invention. The present invention further provides a method of identifying and/or selecting a plant or plant part according to the present invention. The present invention further provides a method for producing a *Capsicum annuum* plant having the improved resistance to *Frankliniella occidentalis* according to the present invention. The present invention further provides a method for improving the resistance of a *Capsicum annuum* plant to *Frankliniella occidentalis*, QTL8 according to the present invention for improving the resistance of a *Capsicum annuum* plant to *Frankliniella occidentalis*. The present invention further provides genetic markers specific for QTL8 according to the present invention and the use thereof for selecting a *Capsicum annuum* plant having an improved resistance to *Frankliniella occidentalis*.

BACKGROUND

*Capsicum annuum* plants are herbaceous plants of the family Solanaceae. The plant reaches about 0.5-1.5 meters (20-60 in). Single white flowers bear the pepper fruit which is green when unripe, changing principally to red, although some varieties may ripen to brown or purple. While the species can tolerate most climates, they are especially productive in warm and dry climates. Cultivated pepper plants of the species *Capsicum annuum* include different types of peppers, such as bell peppers, cayenne peppers, paprika, and jalapeños.

One of the major pests in commercial pepper cultivation is the western flower thrips (*Frankliniella occidentalis*). Thrips infestation affects pepper production by causing direct damage to the plant and most importantly to the fruits by sucking the sap. *Frankliniella occidentalis* is also a natural vector of Tomato Spotted Wilt Virus (TSWV), a devastating virus disease of pepper. Sufficient control of thrips in pepper cultivation accordingly is also an important measure to control TSWV spreading, for instance as an alternative to the cultivation of TSWV resistant varieties that sometimes show a reduction in the overall agronomical performance.

*Capsicum annuum* plants having an improved resistance against insect pests, such as *Frankliniella occidentalis* have been described in the prior art.

WO 2008/135510 A1 describes a cultivated *Capsicum annuum* plant which is intermediately resistant to *Bemisia* and/or thrips infestation, wherein said plant contains a resistance QTL on chromosome 3 and/or a resistance QTL on chromosome 5. Said resistance QTLs are obtainable from a donor plant of which representative seeds were deposited under Accession No. NCIMB 41428.

WO 2015/000992 A1 describes a pepper plant that produces fruits with an increased total content of terpenoids as a result of the presence in the genome of the pepper plant of at least one QTL selected from QTL1 located on chromosome 1, QTL2 located on chromosome 10 and QTL3 also located on chromosome 10, wherein QTL1 is as obtainable from a donor plant of which representative seeds were deposited under Accession No. NCIMB 42138, QTL2 is as obtainable from a donor plant of which representative seeds were deposited under Accession No. NCIMB 42140 and QTL3 is also as obtainable from a donor plant of which representative seeds were deposited under Accession No. NCIMB 42138. WO 2015/000992 A1 states that plants having an increased total content of terpenoids have an advantage in relation to pathogen infestation in comparison to plants that do not have such increased terpenoid content.

A further major QTL for thrips resistance (*Frankliniella occidentalis*) on chromosome 7 of pepper (*Capsicum annuum*) has been disclosed on the IP.com prior art database under IP.com number IPCOM000247917D.

There is a constant need to develop new and improved resistance sources to increase the host plant's insect resistance as an environmentally friendly alternative for the use of pesticides. It is therefore an object of the invention to provide new thrips resistance QTLs that confer an improved resistance to *Frankliniella occidentalis*. It is a further object of the invention to provide a *Capsicum annuum* plant, and cells, tissues, fruits and other parts of such plant comprising in their genome one or more QTLs capable of conferring an improved resistance to *Frankliniella occidentalis*. It is a further object of the invention to provide a method of identifying and/or selecting a plant or plant part comprising in their genome one or more QTLs capable of conferring an improved resistance to *Frankliniella occidentalis*. It is a further object of the invention to provide a method for producing a *Capsicum annuum* plant having the improved resistance to *Frankliniella occidentalis*. It is a further object of the invention to provide a method for improving the resistance of a *Capsicum annuum* plant to *Frankliniella occidentalis*. It is a further object of the invention to provide genetic markers specific for QTLs capable of conferring an improved resistance to *Frankliniella occidentalis*.

SUMMARY OF THE INVENTION

The present invention provides a *Capsicum annuum* plant comprising an introgression fragment on chromosome 8 comprising Quantitative Trait Locus QTL8, wherein said confers an improved resistance to *Frankliniella occidentalis*, wherein QTL8 is located on chromosome 8 between SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79, and wherein the *Capsicum annuum* plant is a non-pungent *Capsicum annuum* plant when QTL8 is present in heterozygous form. The present invention further provides a method for enhancing the *Frankliniella occidentalis* resistance phenotype of a *Capsicum annuum* plant, said method comprising introgressing QTL8 as defined herein into said *Capsicum annuum* plant. The present invention further provides the use of QTL8 as defined herein for enhancing the *Frankliniella occidentalis* resistance phenotype in a *Capsicum annuum* plant.

In addition, the present invention provides a seed produced by the *Capsicum annuum* plant according to any of the preceding claims, wherein the seed comprises QTL8 as described herein. The present invention further provides a seed from which the *Capsicum annuum* plant according the present invention can be grown. The present invention further provides a plant cell, tissue or plant part of the *Capsicum annuum* plant according to the present invention or of the seed according to the present invention, comprising QTL8 as described herein.

In addition, the present invention provides a method for identifying and/or selecting a *Capsicum annuum* plant or plant part comprising determining whether said plant or plant part comprises in its genome QTL8 as described herein.

In addition, the present invention provides a method for producing a *Capsicum annuum* plant having a *Frankliniella occidentalis* resistance phenotype, said method comprising the step(s) of: (i) crossing a first *Capsicum annuum* plant and a second plant, wherein the first *Capsicum annuum* plant comprises in its genome QTL8 as described herein; (ii) optionally harvesting seed from the crossing of (i) and selecting seed comprising QTL8 in its genome.

In addition, the present invention provides a marker for determining the presence or absence of a QTL conferring an improved resistance to *Frankliniella occidentalis* in a *Capsicum annuum* plant or plant part, whereby the marker is linked to a *Frankliniella occidentalis* conferring QTL located on chromosome 8 between SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79. The present invention further provides use of a marker according to the present invention for determining the presence or absence of one or more QTLs conferring an improved resistance to *Frankliniella occidentalis* in a *Capsicum annuum* plant or plant part. The present invention further provides a method for identifying and/or selecting a *Capsicum annuum* plant or plant part comprising determining in said plant or plant part the presence or absence of one or more markers according to present invention.

In addition, the present invention provides an isolated nucleic acid comprising the nucleotide sequence selected from the group consisting of: SEQ ID NO: 1 or a fragment thereof consisting of at least 15 nucleotides comprising nucleotide 51 of SEQ ID NO: 1; SEQ ID NO: 3 or a fragment thereof consisting of at least 15 nucleotides comprising nucleotide 51 of SEQ ID NO: 3; SEQ ID NO: 5 or a fragment thereof consisting of at least 15 nucleotides comprising nucleotide 51 of SEQ ID NO: 5; SEQ ID NO: 7 or a fragment thereof consisting of at least 15 nucleotides comprising nucleotide 51 of SEQ ID NO: 7; SEQ ID NO: 9 or a fragment thereof consisting of at least 15 nucleotides comprising nucleotide 51 of SEQ ID NO: 9; SEQ ID NO: 11 or a fragment thereof consisting of at least 15 nucleotides comprising nucleotide 51 of SEQ ID NO: 11; SEQ ID NO: 13 or a fragment thereof consisting of at least 15 nucleotides comprising nucleotide 51 of SEQ ID NO: 13; SEQ ID NO: 15 or a fragment thereof consisting of at least 15 nucleotides comprising nucleotide 51 of SEQ ID NO: 15; SEQ ID NO: 17 or a fragment thereof consisting of at least 15 nucleotides comprising nucleotide 51 of SEQ ID NO: 17; SEQ ID NO: 19 or a fragment thereof consisting of at least 15 nucleotides comprising nucleotide 51 of SEQ ID NO: 19; SEQ ID NO: 21 or a fragment thereof consisting of at least 15 nucleotides comprising nucleotide 51 of SEQ ID NO: 21; SEQ ID NO: 23 or a fragment thereof consisting of at least 15 nucleotides comprising nucleotide 51 of SEQ ID NO: 23; SEQ ID NO: 25 or a fragment thereof consisting of at least 15 nucleotides comprising nucleotide 51 of SEQ ID NO: 25; SEQ ID NO: 27 or a fragment thereof consisting of at least 15 nucleotides comprising nucleotide 51 of SEQ ID NO: 27; SEQ ID NO: 29 or a fragment thereof consisting of at least 15 nucleotides comprising nucleotide 51 of SEQ ID NO: 29; SEQ ID NO: 31 or a fragment thereof consisting of at least 15 nucleotides comprising nucleotide 51 of SEQ ID NO: 31; SEQ ID NO: 33 or a fragment thereof consisting of at least 15 nucleotides comprising nucleotide 51 of SEQ ID NO: 33; SEQ ID NO: 35 or a fragment thereof consisting of at least 15 nucleotides comprising nucleotide 51 of SEQ ID NO: 35; SEQ ID NO: 37 or a fragment thereof consisting of at least 15 nucleotides comprising nucleotide 51 of SEQ ID NO: 37; SEQ ID NO: 39 or a fragment thereof consisting of at least 15 nucleotides comprising nucleotide 51 of SEQ ID NO: 39; SEQ ID NO: 41 or a fragment thereof consisting of at least 15 nucleotides comprising nucleotide 51 of SEQ ID NO: 41; EQ ID NO: 43 or a fragment thereof consisting of at least 15 nucleotides comprising nucleotide 51 of SEQ ID NO: 43; SEQ ID NO: 45 or a fragment thereof consisting of at least 15 nucleotides comprising nucleotide 51 of SEQ ID NO: 45; SEQ ID NO: 47 or a fragment thereof consisting of at least 15 nucleotides comprising nucleotide 51 of SEQ ID NO: 47; SEQ ID NO: 49 or a fragment thereof consisting of at least 15 nucleotides comprising nucleotide 51 of SEQ ID NO: 49; SEQ ID NO: 51 or a fragment thereof consisting of at least 15 nucleotides comprising nucleotide 51 of SEQ ID NO: 51; SEQ ID NO: 53 or a fragment thereof consisting of at least 15 nucleotides comprising nucleotide 51 of SEQ ID NO: 53; SEQ ID NO: 55 or a fragment thereof consisting of at least 15 nucleotides comprising nucleotide 51 of SEQ ID NO: 55; SEQ ID NO: 57 or a fragment thereof consisting of at least 15 nucleotides comprising nucleotide 51 of SEQ ID NO: 57; SEQ ID NO: 59 or a fragment thereof consisting of at least 15 nucleotides comprising nucleotide 51 of SEQ ID NO: 59; SEQ ID NO: 61 or a fragment thereof consisting of at least 15 nucleotides comprising nucleotide 51 of SEQ ID NO: 61; SEQ ID NO: 63 or a fragment thereof consisting of at least 15 nucleotides comprising nucleotide 51 of SEQ ID NO: 63; SEQ ID NO: 65 or a fragment thereof consisting of at least 15 nucleotides comprising nucleotide 51 of SEQ ID NO: 65; SEQ ID NO: 67 or a fragment thereof consisting of at least 15 nucleotides comprising nucleotide 51 of SEQ ID NO: 67; SEQ ID NO: 69 or a fragment thereof consisting of at least 15 nucleotides comprising nucleotide 51 of SEQ ID NO: 69; SEQ ID NO: 71 or a fragment thereof consisting of at least 15 nucleotides comprising nucleotide 51 of SEQ ID NO: 71; SEQ ID NO: 73 or a fragment thereof consisting of at least 15 nucleotides comprising nucleotide 51 of SEQ ID NO: 73; SEQ ID NO: 75 or a fragment thereof consisting of at least 15 nucleotides comprising nucleotide 51 of SEQ ID NO: 75; SEQ ID NO: 77 or a fragment thereof consisting of at least 15 nucleotides comprising nucleotide 51 of SEQ ID NO: 77; and SEQ ID NO: 79 or a fragment thereof consisting of at least 15 nucleotides comprising nucleotide 51 of SEQ ID NO: 79; or comprising the complementary nucleotide sequence thereof. The present invention further provides the use of one or more of the nucleotide sequences selected from the group consisting of SEQ ID NOs: 1-80 or a fragment thereof for marker assisted selection of a *Capsicum annuum* plant or plant part, wherein said fragment consists of at least 15 nucleotides comprising nucleotide 51 of said nucleotide sequences selected from the group consisting of SEQ ID NOs: 1-80 or a complementary sequence of said one or more of the nucleotide sequences.

BRIEF DESCRIPTION OF THE FIGURES

FIG. 1: F4 recombinant resistant level to thrips. Phenotype (1=Susceptible, 9=Resistant). Genotypes, A, B and H refers to the susceptible, resistant or heterozygous allelic state based on the flanking and peak markers for QTL on Ch_07 (Left) and QTL on Ch_08 (Right).

DETAILED DESCRIPTION OF THE INVENTION

General Definitions

It is to be understood that this invention is not limited to the particular methodology or protocols. It is also to be understood that the terminology used herein is for the purpose of describing particular embodiments only and is not intended to limit the scope of the present invention which will be limited only by the appended claims. It must be noted that as used herein and in the appended claims, the singular forms "a," "and," and "the" include plural reference unless the context clearly dictates otherwise. Thus, for example, reference to "a vector" is a reference to one or more vectors and includes equivalents thereof known to those skilled in the art, and so forth. The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent, preferably 10 percent up or down (higher or lower). As used herein, the word or means any one member of a particular list and also includes any combination of members of that list. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. For clarity, certain terms used in the specification are defined and used as follows:

The term "genome" relates to the genetic material of an organism. It consists of DNA. The genome includes both the genes and the non-coding sequences of the DNA.

The term "gene" means a (genomic) DNA sequence comprising a region (transcribed region), which is transcribed into a messenger RNA molecule (mRNA) in a cell, and an operably linked regulatory region (also described herein as regulatory sequence, e.g. a promoter). A gene may thus comprise several operably linked sequences, such as a promoter, a 5' leader sequence comprising e.g. sequences involved in translation initiation, a (protein) coding region (cDNA or genomic DNA) and a 3' non-translated sequence comprising e.g. transcription termination sites. Different alleles of a gene are thus different alternative forms of the gene, which may be in the form of e.g. differences in one or more nucleotides of the genomic DNA sequence (e.g. in the promoter sequence, the exon sequences, intron sequences, etc.), mRNA and/or amino acid sequence of the encoded protein. A gene may be an endogenous gene (in the species of origin) or a chimeric gene (e.g. a transgene or cis-gene). The "promoter" of a gene sequence is defined as a region of DNA that initiates transcription of a particular gene. Promoters are located near the genes they transcribe, on the same strand and upstream on the DNA. Promoters can be about 100-1000 base pairs long. In one aspect the promoter is defined as the region of about 1000 base pairs or more e.g. about 1500 or 2000, upstream of the start codon (i.e. ATG) of the protein encoded by the gene.

"Expression of a gene" refers to a process wherein a DNA region, which is operably linked to appropriate regulatory regions, particularly a promoter, is transcribed into an RNA, which is biologically active, i.e. which is capable of being translated into a biologically active protein or peptide or which is active itself (e.g. in posttranscriptional gene silencing or RNAi). The coding sequence may be in sense-orientation and encodes a desired, biologically active protein or peptide.

The terms "protein" and "polypeptide" are used interchangeably and refer to molecules consisting of a chain of amino acids, without reference to a specific mode of action, size, 3-dimensional structure or origin. A "fragment" or "portion" of a protein may thus still be referred to as a "protein". An "isolated protein" is used to refer to a protein which is no longer in its natural environment, for example in vitro or in a recombinant bacterial or plant host cell.

The terms "peptide sequence" and "amino acid sequence" refer to the primary amino acid sequence of a protein or polypeptide.

The term "locus" (plural loci) means a specific place or places or a site on a chromosome where for example a gene or genetic marker is found.

As is used herein, a QTL (quantitative trait locus) is a hereditary unit (often indicated by one or more molecular genomic markers) that occupies a specific location on a chromosome and that contains the genetic instruction for a particular phenotypic characteristics or trait in a plant. In contrast to a gene, the exact boundaries of a QTL are not known, but can be found without undue burden by a person skilled in the art by using fine mapping techniques well known in the art of genetic mapping and subsequent DNA sequencing routines. The QTL encodes at least one gene of which the expression, alone or in combination with other genes, results in the phenotypic trait being expressed, or that encodes at least one regulatory region that controls the expression of at least one gene the expression of which, alone or in combination with other genes, results in the phenotypic trait being expressed. A QTL may be defined by indicating its genetic location in the genome of the donor of the introgression that contains the QTL using one or more molecular genomic markers. These one or more markers, in turn, indicate a specific locus.

Distances between loci are usually measured by frequency of crossing-over between loci on the same chromosome. The further apart two loci are, the more likely that a crossover will occur between them. Conversely, if two loci are close together, a crossover is less likely to occur between them. As a rule, one centimorgan (cM) is equal to 1% recombination between loci (markers). When a QTL can be indicated by multiple markers the genetic distance between the end-point markers is indicative of the size of the QTL. Markers that define the QTL may be markers that are linked to the QTL or markers that are in linkage disequilibrium with the QTL. As used herein, the term "linked to" or "genetically linked" when used in the context of markers and/or genomic regions means that the two linked loci (e.g. a marker and a QTL) are separated on a genetic map by 10 cM or less (i.e meiotic recombination between the two linked loci occurs with a frequency of equal to or less than 10%), more preferably by 9 cM or less, 8 cM or less, 7 cM or less, 6 cM or less, 5 cM or less, 4 cM or less, 3 cM or less, 2 cM or less, 1 cM or less, 0.75 cM or less, 0.5 cM or less, or even 0.25 cM or less. As used herein, the term "linkage disequilibrium" describes a non-random segregation of genetic loci or traits (or both).

The term "allele(s)" means any of one or more alternative forms of a gene at a particular locus, all of which alleles relate to one trait or characteristic at a specific locus. In a diploid cell of an organism, alleles of a given gene are located at a specific location, or locus (loci plural) on a chromosome. One allele is present on each chromosome of the pair of homologous chromosomes. A diploid plant species may comprise a large number of different alleles at a particular locus. These may be identical alleles of the gene (homozygous) or two different alleles (heterozygous).

An allelism test is a test known in the art that can be used to identify whether two genes conferring the same trait are located at the same locus.

The word "trait" in the context of this application refers to the phenotype of the plant. When a plant shows the traits of the invention, its genome comprises the mutant allele causing the trait of the invention, particularly in the present invention when the mutant allele is in homozygous form. The plant, thus, has the genetic determinant of the invention. It is understood that when referring to a plant comprising the trait of the plant of the invention, reference is made to a *Capsicum annuum* plant comprising the trait of improved resistance to *Frankliniella occidentalis*.

"Average" refers herein to the arithmetic mean.

As used herein, the term "molecular genomic marker" or short "marker" refers to an indicator that is used in methods for visualizing differences in characteristics of nucleic acid sequences. Examples of such indicators are restriction fragment length polymorphism (RFLP) markers, amplified fragment length polymorphism (AFLP) markers, single nucleotide polymorphisms (SNPs), insertion mutations, microsatellite markers (SSRs), sequence-characterized amplified regions (SCARs), cleaved amplified polymorphic sequence (CAPS) markers or isozyme markers or combinations of the markers described herein which defines a specific genetic and chromosomal location.

"Sequence identity" and "sequence similarity" can be determined by alignment of two peptide or two nucleotide sequences using global or local alignment algorithms. Sequences may then be referred to as "substantially identical" or "essentially similar" when they share at least a certain minimal percentage of sequence identity (as defined further below) after optimally alignment by, for example, the program GAP or BESTFIT or the Emboss program "Needle" (using default parameters, see below). These programs use the Needleman and Wunsch global alignment algorithm to align two sequences over their entire length, maximizing the number of matches and minimizing the number of gaps. Generally, the default parameters are used, with a gap creation penalty=10 and gap extension penalty =0.5 (both for nucleotide and protein alignments). For nucleotides the default scoring matrix used is DNAFULL and for proteins the default scoring matrix is Blosum62 (Henikoff & Henikoff, 1992, PNAS 89, 10915-10919). Sequence alignments and scores for percentage sequence identity may for example be determined using computer programs, such as EMBOSS world wide web at ebi.ac.uk/Tools/psa/emboss_needle/). Alternatively, sequence similarity or identity may be determined by searching against databases such as FASTA, BLAST®, etc. Hits are preferably aligned pairwise to compare sequence identity, preferably over the full length of the sequences.

As used herein, two nucleotide sequences have "substantial sequence identity" if the percentage sequence identity is at least 83%, 85%, 90%, 95%, 98%, 99% or more, preferably 90%, 95%, 98%, 99%, or more, preferably as determined over their entire lengths (as determined by Emboss "needle" using default parameters, i.e. gap creation penalty=10, gap extension penalty=0.5, using scoring matrix DNAFULL for nucleic acids).

The term "hybridisation" as used herein is used to indicate hybridisation of nucleic acids at appropriate conditions of stringency as would be readily evident to those skilled in the art depending upon the nature of the probe sequence and target sequences. Conditions of hybridisation and washing are well known in the art, and the adjustment of conditions depending upon the desired stringency by varying incubation time, temperature and/or ionic strength of the solution are readily accomplished. See, for example, Sambrook, J. et al., Molecular Cloning: A Laboratory Manual, 2nd edition, Cold Spring Harbor Press, Cold Spring Harbor, N.Y., 1989. The choice of conditions is dictated by the length of the sequences being hybridised, in particular, the length of the probe sequence, the relative G-C content of the nucleic acids and the amount of mismatches to be permitted. Low stringency conditions are preferred when partial hybridisation between strands that have lesser degrees of complementarity is desired. When perfect or near perfect complementarity is desired, high stringency conditions are preferred. When reference is made to a nucleic acid sequence (e.g. DNA or genomic DNA) having "substantial sequence identity to" a reference sequence or having a sequence identity of at least 80%, e.g. at least 85%, 90%, 95%, 98%, 99%, 99.2%, 99.5%, 99.9% nucleic acid sequence identity to a reference sequence, in one embodiment said nucleotide sequence is considered substantially identical to the given nucleotide sequence and can be identified using stringent hybridisation conditions. In another embodiment, the nucleic acid sequence comprises one or more mutations compared to the given nucleotide sequence but still can be identified using stringent hybridization conditions.

"Stringent hybridisation conditions" can be used to identify nucleotide sequences, which are substantially identical to a given nucleotide sequence. Stringent conditions are sequence dependent and will be different in different circumstances. Generally, stringent conditions are selected to be about 5° C. lower than the thermal melting point (Tm) for the specific sequences at a defined ionic strength and pH. The Tm is the temperature (under defined ionic strength and pH) at which 50% of the target sequence hybridises to a perfectly matched probe. Typically stringent conditions will be chosen in which the salt concentration is about 0.02 molar at pH 7 and the temperature is at least 60° C. Lowering the salt concentration and/or increasing the temperature increases stringency. Stringent conditions for RNA-DNA hybridisations (Northern blots using a probe of e.g. 100 nucleotides) are for example those which include at least one wash in 0.2×SSC at 63° C. for 20 min, or equivalent conditions. Stringent conditions for DNA-DNA hybridisation (Southern blots using a probe of e.g. 100 nucleotides) are for example those which include at least one wash (usually 2) in 0.2×SSC at a temperature of at least 50° C., usually about 55° C., for 20 min, or equivalent conditions. See also Sambrook et al. (1989) and Sambrook and Russell (2001).

As used herein, the phrase "hybridizes" to a DNA or RNA molecule is used to indicate that a molecule recognizes and hybridizes to another nucleic acid molecule by base pairing, meaning that there is enough sequence similarity between the two nucleic acid molecules to effect hybridization under appropriate conditions.

As used herein, the terms "introgression", "introgressed" and "introgressing" refer to both a natural and artificial process whereby a genomic fragment of one species, variety or cultivar, termed donor parent, is transduced into the genome of another species, variety or cultivar, termed recipient parent, for example by crossing the donor and recipient parent. The process may optionally be completed by backcrossing the resulting plants to the recipient parent, which is than termed recurrent parent. An introgression fragment is present outside of its natural genomic context, meaning that a plant harbouring an introgression fragment from e.g. *Capsicum chinense* is not a *C. chinense* plant.

As used herein, the term "plant" includes the whole plant or any parts or derivatives thereof, such as plant organs (e.g., harvested or non-harvested fruits, leaves, seed, flowers, etc.), plant cells, plant protoplasts, plant cell or tissue cultures from which whole plants can be regenerated, plant calli, plant cell clumps, and plant cells that are intact in plants, or parts of plants, such as embryos, pollen, ovules, ovaries, fruits (e.g., harvested tissues or organs, such as harvested pepper fruits or parts thereof), flowers, leaves, seeds, clonally propagated plants, roots, root-stocks, stems, root tips and the like. Also, any developmental stage is included, such as seedlings, immature and mature, etc.

A "plant line" or "breeding line" refers to a plant and its progeny. As used herein, the term "inbred line" refers to a plant line which has been repeatedly selfed, preferably more than three time, more preferably more than 6 times.

The term "cultivar" (or "cultivated" plant) is used herein to denote a plant having a biological status other than a "wild" status, which "wild" status indicates the original non-cultivated, non-domesticated, or natural state of a plant or accession, and the term cultivated does not include such wild, or weedy plants. The term cultivar does include material with good agronomic characteristics, such as breeding material, research material, breeding lines, elite breeding lines, synthetic population, hybrid, founder stock/base population, inbred lines, cultivars (open pollinated of hybrid cultivar), segregating population, mutant/genetic stock, and advanced/improved cultivar. The so-called heirloom varieties or cultivars, i.e. open pollinated varieties or cultivars commonly grown during earlier periods in human history and often adapted to specific geographic regions, are in one aspect of the invention encompassed herein as cultivated plants. In one embodiment the term cultivar also includes landraces, i.e. plants (or populations) selected and cultivated locally by humans over many years and adapted to a specific geographic environment and sharing a common gene pool.

"Plant variety" is a group of plants within the same botanical taxon of the lowest grade known, which (irrespective of whether the conditions for the recognition of plant breeder's rights are fulfilled or not) can be defined on the basis of the expression of characteristics that result from a certain genotype or a combination of genotypes, can be distinguished from any other group of plants by the expression of at least one of those characteristics, and can be regarded as an entity, because it can be multiplied without any change. Therefore, the term "plant variety" cannot be used to denote a group of plants, even if they are of the same kind, if they are all characterized by the presence of one locus or gene (or a series of phenotypical characteristics due to this single locus or gene), but which can otherwise differ from one another enormously as regards the other loci or genes.

"Backcrossing" refers to a breeding method by which a (single) trait, such as the capability for stenospermocarpic fruit formation, can be transferred from one genetic background (also referred to as "donor" generally, but not necessarily, this is an inferior genetic background) into another genetic background (also referred to as "recurrent parent"; generally, but not necessarily, this is a superior genetic background). An offspring of a cross (e.g. an F1 plant obtained by crossing a first plant of a certain plant species comprising the mutant allele of the present invention with a second plant of the same plant species or of a different plant species that can be crossed with said first plant species wherein said second plant species does not comprise the mutant allele of the present invention; or an F2 plant or F3 plant, etc., obtained by selfing the F1) is "backcrossed" to a parent plant of said second plant species. After repeated backcrossing, the trait of the donor genetic background, e.g. the mutant allele conferring the stenospermocarpic fruit formation trait, will have been incorporated into the recurrent genetic background. The terms "gene converted" or "conversion plant" or "single locus conversion" in this context refer to plants which are developed by backcrossing wherein essentially all of the desired morphological and/or physiological characteristics of the recurrent parent are recovered in addition to the one or more genes transferred from the donor parent. The plants grown from the seeds produced by backcrossing of the F1 plants with the second parent plant line is referred to as the "BC1 generation". Plants from the BC1 population may be selfed resulting in the BC1F2 generation or backcrossed again with the cultivated parent plant line to provide the BC2 generation. An "M1 population" is a plurality of mutagenized seeds/plants of a certain plant line. "M2, M3, M4, etc." refers to the consecutive generations obtained following selfing of a first mutagenized seed/plant (M1).

The term Solanaceae refers to a family of plants, which include genera (especially the genus *Solanum* and the genus *Capsicum*) that comprise fruit and vegetable species which are cultivated and bred by humans, such as e.g. *Solanum lycopersicum* (tomato), *Capsicum annuum* (pepper), *Solanum melongena* (eggplant) and *Solanum muricatum* (pepino). "Solanaceous plants" or "plants of the family Solanaceae" are plants of the botanical family Solanaceae, i.e. any plant of the family Solanaceae, including wild solanaceous plants and cultivated solanaceous plants. The botanical family Solanaceae consists about 98 genera of which the genera *Solanum* and *Capsicum* are the commercially most relevant as they comprise many domesticated species that are widely cultivated and used as food crops with high economic importance.

The genus *Capsicum* consists of 20 to 27 species, five of which are domesticated: *C. annuum, C. baccatum, C. chinense, C. frutescens*, and *C. pubescens*. Phylogenetic relationships between species have been investigated using bio-geographical, morphological, chemosystematic, hybridization, and genetic data. Fruits of *Capsicum*, often named as "peppers" or "pepper fruits", can vary tremendously in colour, shape, and size both between and within species. Chemosystematic studies helped distinguish the difference between varieties and species.

*Capsicum annuum* L. plants are herbaceous plants of the family Solanaceae that are of particular relevance in the context of the present invention. *Capsicum annuum* plants reach about 0.5-1.5 meters (about 20-60 inches). Single white flowers bear the pepper fruit which is green when unripe, changing principally to red, although some varieties may ripen to brown or purple. While the species can tolerate most climates, they are especially productive in warm and dry climates. Cultivated plants of the species *Capsicum annuum* include different types of peppers, such as bell peppers, cayenne peppers, paprika, and jalapeños. "*Capsicum annuum* chromosome 7" refers to the *Capsicum annuum* chromosome 7, as known in the art (see *Capsicum annuum* cv CM334 genome chromosomes (release 1.55) and *Capsicum annuum* UCD10X genome chromosomes (v1.0) and *Capsicum annuum* zunla genome chromosomes (v2.0). "Orthologous chromosome 7" refers to the corresponding chromosome of relatives of *Capsicum annuum*. Analogous, "*Capsicum annuum* chromosome 8" refers to the *Capsicum annuum* chromosome 8, as known in the art (see *Capsicum annuum* cv CM334 genome chromosomes (release 1.55) and *Capsicum annuum* UCD10X genome chromosomes (v1.0) and *Capsicum annuum* zunla genome chromosomes (v2.0).

As used herein the term "non-pungent *Capsicum annuum* plant" refers to a *Capsicum annuum* plant producing fruits having an average total capsaicinoid content (preferably capsaicin and dihydrocapsaicin content) of less than 150 µg/g FW (fresh weight), more preferably of less than 100 µg/g FW, most preferably of less than 50 µg/g FW. Preferably, the capsaicin of the fruit is determined using HPLC analysis using standard methods. Preferably, the non-pungent *Capsicum annuum* plant according to the present invention comprises a mutant allele of the Pun1 gene, wherein said mutant allele results in a reduced expression or no expression of the wild type Pun1 gene and/or wherein the mutant allele encodes a protein having a decreased function or loss-of-function when compared to the wild type protein and wherein the wild type Pun1 gene encodes a protein comprising at least 95% sequence amino acid sequence identity to SEQ ID NO: 81. As used herein the term "pungent *Capsicum annuum* plant" refers to a *Capsicum annuum* plant producing fruits having a higher average total capsaicinoid content than that of a non-pungent *Capsicum annuum* plant as defined herein. Accordingly, the term "pungent *Capsicum annuum* plant" as used herein preferably refers to a *Capsicum annuum* plant producing fruits having an average total capsaicinoid content (preferably capsaicin and dihydrocapsaicin content) of at least 150 µg/g FW (fresh weight), more preferably of at least 100 µg/g FW, most preferably of at least 50 µg/g FW.

The term "food" is any substance consumed to provide nutritional support for the body. It is usually of plant or animal origin, and contains essential nutrients, such as carbohydrates, fats, proteins, vitamins, or minerals. The substance is ingested by an organism and assimilated by the organism's cells in an effort to produce energy, maintain life, or stimulate growth. The term food includes both substance consumed to provide nutritional support for the human and animal body.

"Vegetative propagation" or "clonal propagation" refers to propagation of plants from vegetative tissue, e.g. by propagating plants from cuttings or by in vitro propagation. In vitro propagation involves in vitro cell or tissue culture and regeneration of a whole plant from the in vitro culture. Clones (i.e. genetically identical vegetative propagations) of the original plant can thus be generated by in vitro culture. "Cell culture" or "tissue culture" refers to the in vitro culture of cells or tissues of a plant. "Regeneration" refers to the development of a plant from cell culture or tissue culture or vegetative propagation. "Non-propagating cell" refers to a cell which cannot be regenerated into a whole plant.

The terms "F1, F2, etc." refer to the consecutive related generations following a cross between two parent plants or parent lines. The plants grown from the seeds produced by crossing two plants or lines is called the F1 generation. Selfing the F1 plants results in the F2 generation, etc. The term "hybrid" plant (or hybrid seed) refers to a plant or seed obtained from crossing two inbred parent lines. The term "F1 hybrid" plant (or "F1 hybrid" seed or "F1 seed") refers to a first-generation plant or seed obtained from crossing two inbred parent lines.

The terms "progeny", "progenies" and "descendants", as used herein, refer to any and all offspring that are derivable from or obtainable from a plant of the invention that comprises the improved *Frankliniella occidentalis* resistance phenotype described herein. Progeny may be derived by cell culture or by tissue culture, or by producing seeds of a plant. The term progeny may also encompass plants derived from crossing of at least one resistant parent plant with another plant of the same or another variety or (breeding) line. A progeny is directly derived from, obtained from, obtainable from or derivable from the parent plant by, e.g., traditional breeding methods (selfing and/or crossing) or regeneration or transformation. However, the term "progeny" generally encompasses further generations such as second, third, fourth, fifth, sixth, seventh or more generations, i.e., generations of plants which are derived from, obtained from, obtainable from or derivable from the former generation by, e.g., traditional breeding methods, regeneration or genetic transformation techniques. For example, a second-generation progeny can be produced from a first generation progeny by any of the methods mentioned above.

The western flower thrips *Frankliniella occidentalis* is an invasive plant pest that is native to North America and which has spread to other continents including South-America, Europe and Australia. *Frankliniella occidentalis* has been documented to feed on over 500 different species of host plants, including a large number of fruit, vegetable, and ornamental crops. The major damage is caused by the adult ovipositing in the plant tissue. The plant is also injured by feeding, which causes holes and areas of silvery discoloration when the plant reacts to the insect's saliva. Nymphs feed heavily on new fruit just beginning to develop from the flower. *Frankliniella occidentalis* is also the major vector of plant viruses such as tomato spotted wilt virus.

A plant is said to have an improved resistance to *Frankliniella occidentalis* if the plant damage symptoms that are typical for thrips colonization are reduced after exposure to *Frankliniella occidentalis*, when compared to a control plant and/or if the plant remains free of said typical plant damage symptoms. Evaluation of *Frankliniella occidentalis* resistance is preferably performed by visual observation, looking at plant damage symptomatology as described in the Examples herein below. Various thrips resistance assays are possible, e.g. as described in the thrips resistance test in the Examples of this document. In general, a *Frankliniella occidentalis* resistance test may involve subjecting a plurality of adult pepper plants to *Frankliniella occidentalis*, wherein adult pepper plants are plants that have started to flower. Plants are subjected to *Frankliniella occidentalis* by releasing a specific number of insects into the greenhouse (e.g. a plastic tunnel), optionally followed by a one or more subsequent exposures e.g. 1 week later, 2 week later, or 3 weeks later. The plants are subsequently grown for a specific time period, e.g. for at least 2 weeks (e.g. at least 3, 4, 5, or even at least 6 weeks) under suitable conditions. The presence of any other insect into the greenhouse as well as temperatures above 40° C. must be avoided. The evaluation phase starts when the first thrips plant damage symptoms appear, which is about 4 weeks after the first release. The evaluation is done by assessing the whole plant for plant damage symptoms caused by *Frankliniella occidentalis*, such as leaf silvering. The evaluation preferably comprises more than one evaluation, for instance 2 evaluations, wherein the second evaluation is performed 2 weeks after the first evaluation. For instance, the *Frankliniella occidentalis* test comprises three evaluations at 50, 65 and 75 days after first release. The susceptible control should be highly susceptible for the test to be successful, wherein the susceptible control plants should account for at least 20% of the total number of plants comprised in the test. Preferably at least 5 e.g. at least 10, 20, 30, 40, 50 or even more than 200 plants per genotype are included in each replicate and preferably several replicates are carried out. In one aspect, when testing resistance, a line or variety is considered "resistant" if at least 90%, 95% or 100% of the plants of the line or variety shows less than 25% of leaf area showing leaf silvering (e.g. 20%, 15%, 10%, 5%, or even less than 5% or more preferably absence of symptoms (0%)), while at least 50%, 60%, 70%, 80%, 90% or more plants of the susceptible control line or variety shows more than 25% of leaf area showing leaf silvering (e.g. 30%, 45%, 50%, 55%, 60%, 65%, 70%, 75%, 80%, 85%, 90%, 95%, or even more than 95% or more preferably no resistance (100%)). In another aspect, a plant is considered to show a high level of resistance against *Frankliniella occidentalis* when it scores a 6 or higher e.g. 7, 8, or most preferably 9, in the *Frankliniella occidentalis* resistance test protocol as described herein. A plant is considered to have an intermediate level of *Frankliniella occidentalis* resistance when it scores a 4 or 5 in the *Frankliniella occidentalis* resistance test protocol as described herein. A plant is considered to have a low level of *Frankliniella occidentalis* resistance when it scores a 2 or 3 in the *Frankliniella occidentalis* resistance test protocol as described herein. A plant is considered to have no *Frankliniella occidentalis* resistance when it scores a 1 in the *Frankliniella occidentalis* resistance test protocol as described herein.

As used herein, a plant (or plant line or variety) having an "improved resistance to *Frankliniella occidentalis*" relates to a plant (or plant line or variety) showing an improved *Frankliniella occidentalis* resistance phenotype when compared to a suitable control plant (or plant line or variety) in a *Frankliniella occidentalis* resistance test. Such suitable (negative) control plants are plants that show plant damage symptoms that are typical for thrips colonization after exposure to *Frankliniella occidentalis*. For instance, a suitable (negative) control plant may be an isogenic plant derived from *Capsicum annuum* H19_020279-044 (NCIMB 43623) not comprising QTL7 and QTL8 as described herein. In general, it is understood that comparisons between different plants or plant lines or varieties involves growing a number of plants of a line (or variety) (e.g. at least 5 plants, preferably at least 10 plants per line) under the same conditions as the plants of one or more control plant lines (preferably wild type plants) and the determination of differences, preferably statistically significant differences, between the plant lines when grown under the same environmental conditions. Preferably the plants are of the same line or variety. More preferably, the control plants are isogenic plants. The term "isogenic plant" refers to two plants which are genetically identical except for the QTL of interest or causal gene of interest.

Plants of the Invention

The present invention provides a *Capsicum annuum* plant comprising an introgression fragment on chromosome 8 comprising Quantitative Trait Locus QTL8, wherein said QTL8 confers an improved resistance to *Frankliniella occidentalis*, wherein QTL8 is located on chromosome 8 between SNP_21 located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41 and SNP_40 located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79, and wherein the *Capsicum annuum* plant is a non-pungent *Capsicum annuum* plant when QTL8 is present in heterozygous form.

The inventors found that *Capsicum annuum* plants comprising an introgression fragment on chromosome 8 comprising QTL8 as further described herein show a markedly improved resistance to *Frankliniella occidentalis* when compared to *Capsicum annuum* plants not comprising said QTL8. Such insect resistance QTL on chromosome 8 has not been previously described in the prior art. Furthermore, it was found that the insect resistance QTLs as provided by the present invention are capable of conferring an increased resistance to *Frankliniella occidentalis* when compared to the insect resistance QTLs known from the prior art.

In one aspect, the *Capsicum annuum* plant according to the present invention further comprises an introgression fragment on chromosome 7 comprising Quantitative Trait Locus QTL7, wherein said QTL7 confers an improved resistance to *Frankliniella occidentalis*, wherein QTL7 is located on chromosome 7 between SNP_01 located at nucleotide 51 of SEQ ID NO: 1 or at nucleotide 51 of a sequence comprising at least 95% sequence identity to SEQ ID NO: 1 and SNP_20 located at nucleotide 51 of SEQ ID NO: 39 or at nucleotide 51 of a sequence comprising at least 95% sequence identity to SEQ ID NO: 39.

The inventors found that *Capsicum annuum* plants comprising an introgression fragment on chromosome 7 comprising QTL7 as further described herein in addition to the introgression fragment chromosome 8 comprising QTL8 as further described herein show an additionally improved resistance to *Frankliniella occidentalis* when compared to *Capsicum annuum* plants not comprising said QTL8 or when compared to *Capsicum annuum* plants comprising only said QTL8 or only said QTL7.

QTL7 as provided by the present invention and which is capable of conferring an improved resistance to *Frankliniella occidentalis* is located on chromosome 7 between SNP_01 located at nucleotide 51 of SEQ ID NO: 1 or at nucleotide 51 of a sequence comprising at least 95% sequence identity to SEQ ID NO: 1 and SNP_20 located at nucleotide 51 of SEQ ID NO: 39 or at nucleotide 51 of a sequence comprising at least 95% sequence identity to SEQ ID NO: 39. This means that in the context of the present invention it was possible to map the locus of the QTL having the effect of conferring an improved resistance to *Frankliniella occidentalis* as comprised on chromosome 7 to a specific region of said chromosome 7, wherein said region of chromosome 7 is defined by the flanking markers SNP_01 and SNP_20, wherein SNP_01 is located at nucleotide 51 of SEQ ID NO: 1 or at nucleotide 51 of a sequence comprising at least 95% sequence identity to SEQ ID NO: 1 and SNP_20 located at nucleotide 51 of SEQ ID NO: 39 or at nucleotide 51 of a sequence comprising at least 95% sequence identity to SEQ ID NO: 39.

QTL8 as provided by the present invention and which is capable of conferring an improved resistance to *Frankliniella occidentalis* is located on chromosome 8 between SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79. This means that in the context of the present invention it was possible to map the locus of the QTL having the effect of conferring an improved resistance to *Frankliniella occidentalis* as comprised on chromosome 8, wherein said region of chromosome 8 is defined by the flanking markers SNP_21 and SNP_40, wherein SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79.

The *Capsicum annuum* plant according to the present invention is a "non-pungent *Capsicum annuum* plant" as further defined herein when QTL8 is present in heterozygous form.

Accordingly, the *Capsicum annuum* plant according to the present invention is a non-pungent *Capsicum annuum* plant when QTL8 is present in heterozygous form. The *Capsicum annuum* plant according to the present invention may be a pungent *Capsicum annuum* plant or a non-pungent *Capsicum annuum* plant when QTL8 is present in homozygous form. In one aspect, the *Capsicum annuum* plant according to the present invention is a non-pungent *Capsicum annuum* plant as further defined herein.

The resistance QTLs QTL7 and QTL8 according to the present invention thus confer a *Frankliniella occidentalis* resistance phenotype when said QTL7 and/or QTL8 are present in in the genome of a *Capsicum annuum* plant. A representative sample of *Capsicum annuum* seeds comprising QTL7 and QTL8 as described herein has been deposited and from the deposit, or from descendants of this deposit, QTL7 and/or QTL8 of the present invention can be easily transferred into any other plant that can be crossed with the *Capsicum annuum* plant, or descendants thereof, grown from the deposited seeds. Alternatively, other donors can be identified which comprise the same QTL7 and/or QTL8, e.g. comprising the same SNP haplotypes for QTL7 and/or QTL8. In one aspect, the present invention provides a *Capsicum annuum* plant, wherein QTL7 and QTL8 as described herein are as present in, or as obtainable from, or as obtained from, or as comprised in the genome of a *Capsicum annuum* plant designated H19_020279-044 of which a representative number of seeds have been deposited under deposit number NCIMB 43623. In one aspect, the present invention provides a *Capsicum annuum* plant, wherein the introgression fragment on chromosome 7 and/or chromosome 8 is the fragment as found on chromosome 7 and/or chromosome 8 in seeds deposited under accession number NCIMB 43623, or a smaller fragment derived therefrom, which smaller fragment comprises QTL7 or QTL8 as described herein, respectively.

QTL7 as described herein comprises a haplotype that can be characterized by the presence of one or more of the SNP markers SNP_1 to SNP_20 as described herein in more detail. In one aspect, the introgression fragment comprising QTL7 as comprised in the *Capsicum annuum* plant according to the present invention comprises a haplotype of at least one marker selected from: SNP_01 comprising a Thymine located at nucleotide 51 of SEQ ID NO: 1 or at nucleotide 51 of a sequence comprising at least 95% (preferably at least 96%, at least 97%, at least 98% and most preferably at least 99%) identity to SEQ ID NO: 1; SNP_02 comprising a Thymine located at nucleotide 51 of SEQ ID NO: 3 or at nucleotide 51 of a sequence comprising at least 95% (preferably at least 96%, at least 97%, at least 98% and most preferably at least 99%) identity to SEQ ID NO: 3; SNP_03 comprising an Adenine located at nucleotide 51 of SEQ ID NO: 5 or at nucleotide 51 of a sequence comprising at least 95% (preferably at least 96%, at least 97%, at least 98% and most preferably at least 99%) sequence identity to SEQ ID NO: 5; SNP_04 comprising a Cytosine located at nucleotide 51 of SEQ ID NO: 7 or at nucleotide 51 of a sequence comprising at least 95% (preferably at least 96%, at least 97%, at least 98% and most preferably at least 99%) sequence identity to SEQ ID NO: 7; SNP_05 comprising an Adenine located at nucleotide 51 of SEQ ID NO: 9 or at nucleotide 51 of a sequence comprising at least 95% (preferably at least 96%, at least 97%, at least 98% and most preferably at least 99%) sequence identity to SEQ ID NO: 9; SNP_06 comprising an Adenine located at nucleotide 51 of SEQ ID NO: 11 or at nucleotide 51 of a sequence comprising at least 95% (preferably at least 96%, at least 97%, at least 98% and most preferably at least 99%) sequence identity to SEQ ID NO: 11; SNP_07 comprising a Guanine located at nucleotide 51 of SEQ ID NO: 13 or at nucleotide 51 of a sequence comprising at least 95% (preferably at least 96%, at least 97%, at least 98% and most preferably at least 99%) sequence identity to SEQ ID NO: 13; SNP_08 comprising a Guanine located at nucleotide 51 of SEQ ID NO: 15 or at nucleotide 51 of a sequence comprising at least 95% (preferably at least 96%, at least 97%, at least 98% and most preferably at least 99%) sequence identity to SEQ ID NO: 15; SNP_09 comprising a Cytosine located at nucleotide 51 of SEQ ID NO: 17 or at nucleotide 51 of a sequence comprising at least 95% (preferably at least 96%, at least 97%, at least 98% and most preferably at least 99%) sequence identity to SEQ ID NO: 17; SNP_10 comprising a Guanine located at nucleotide 51 of SEQ ID NO: 19 or at nucleotide 51 of a sequence comprising at least 95% (preferably at least 96%, at least 97%, at least 98% and most preferably at least 99%) sequence identity to SEQ ID NO: 19; SNP_11 comprising a Guanine located at nucleotide 51 of SEQ ID NO: 21 or at nucleotide 51 of a sequence comprising at least 95% (preferably at least 96%, at least 97%, at least 98% and most preferably at least 99%) sequence identity to SEQ ID NO: 21; SNP_12 comprising a Thymine located at nucleotide 51 of SEQ ID NO: 23 or at nucleotide 51 of a sequence comprising at least 95% (preferably at least 96%, at least 97%, at least 98% and most preferably at least 99%) sequence identity to SEQ ID NO: 23; SNP_13 comprising an Adenine located at nucleotide 51 of SEQ ID NO: 25 or at nucleotide 51 of a sequence comprising at least 95% (preferably at least 96%, at least 97%, at least 98% and most preferably at least 99%) sequence identity to SEQ ID NO: 25; SNP_14 comprising a Thymine located at nucleotide 51 of SEQ ID NO: 27 or at nucleotide 51 of a sequence comprising at least 95% (preferably at least 96%, at least 97%, at least 98% and most preferably at least 99%) sequence identity to SEQ ID NO: 27; SNP_15 comprising a Thymine located at nucleotide 51 of SEQ ID NO: 29 or at nucleotide 51 of a sequence comprising at least 95% (preferably at least 96%, at least 97%, at least 98% and most preferably at least 99%) sequence identity to SEQ ID NO: 29; SNP_16 comprising a Guanine located at nucleotide 51 of SEQ ID NO: 31 or at nucleotide 51 of a sequence comprising at least 95% (preferably at least 96%, at least 97%, at least 98% and most preferably at least 99%) sequence identity to SEQ ID NO: 31; SNP_17 comprising a Thymine located at nucleotide 51 of SEQ ID NO: 33 or at nucleotide 51 of a sequence comprising at least 95% (preferably at least 96%, at least 97%, at least 98% and most preferably at least 99%) sequence identity to SEQ ID NO: 33; SNP_18 comprising a Thymine located at nucleotide 51 of SEQ ID NO: 35 or at nucleotide 51 of a sequence comprising at least 95% (preferably at least 96%, at least 97%, at least 98% and most preferably at least 99%) sequence identity to SEQ ID NO: 35; SNP_19 comprising an Adenine located at nucleotide 51 of SEQ ID NO: 37 or at nucleotide 51 of a sequence comprising at least 95% (preferably at least 96%, at least 97%, at least 98% and most preferably at least 99%) sequence identity to SEQ ID NO: 37; and SNP_20 comprising a Guanine located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39. Preferably, QTL7 as described herein comprises a haplotype that can be characterized by the presence of 2 or more of the SNP markers SNP_1 to SNP_20 as described herein, more preferably 3 or more of the SNP markers SNP_1 to SNP_20 as described herein, even more preferably 4 or more of the SNP markers SNP_1 to SNP_20 as described herein, and particularly preferably 5 or more of the SNP markers SNP_1 to SNP_20 as described herein.

QTL8 as described herein comprises a haplotype that can be characterized by the presence of one or more of the SNP markers SNP_21 to SNP_40 as described herein in more detail. The introgression fragment comprising QTL8 as comprised in the *Capsicum annuum* plant according to the present invention comprises a haplotype of at least one marker selected from: SNP_21 comprising an Adenine located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41; SNP_22 comprising a Thymine located at nucleotide 51 of SEQ ID NO: 43 or at nucleotide 51 of a sequence comprising at least 95% (preferably at least 96%, at least 97%, at least 98% and most preferably at least 99%) sequence identity to SEQ ID NO: 43; SNP_23 comprising a Guanine located at nucleotide 51 of SEQ ID NO: 45 or at nucleotide 51 of a sequence comprising at least 95% (preferably at least 96%, at least 97%, at least 98% and most preferably at least 99%) sequence identity to SEQ ID NO: 45; SNP_24 comprising a Guanine located at nucleotide 51 of SEQ ID NO: 47 or at nucleotide 51 of a sequence comprising at least 95% (preferably at least 96%, at least 97%, at least 98% and most preferably at least 99%) sequence identity to SEQ ID NO: 47; SNP_25 comprising a Guanine located at nucleotide 51 of SEQ ID NO: 49 or at nucleotide 51 of a sequence comprising at least 95% (preferably at least 96%, at least 97%, at least 98% and most preferably at least 99%) sequence identity to SEQ ID NO: 49; SNP_26 comprising a Adenine located at nucleotide 51 of SEQ ID NO: 51 or at nucleotide 51 of a sequence comprising at least 95% (preferably at least 96%, at least 97%, at least 98% and most preferably at least 99%) sequence identity to SEQ ID NO: 51; SNP_27 comprising a Thymine located at nucleotide 51 of SEQ ID NO: 53 or at nucleotide 51 of a sequence comprising at least 95% (preferably at least 96%, at least 97%, at least 98% and most preferably at least 99%) sequence identity to SEQ ID NO: 53; SNP_28 comprising an Adenine located at nucleotide 51 of SEQ ID NO: 55 or at nucleotide 51 of a sequence comprising at least 95% (preferably at least 96%, at least 97%, at least 98% and most preferably at least 99%) sequence identity to SEQ ID NO: 55; SNP_29 comprising a Thymine located at nucleotide 51 of SEQ ID NO: 57 or at nucleotide 51 of a sequence comprising at least 95% (preferably at least 96%, at least 97%, at least 98% and most preferably at least 99%) sequence identity to SEQ ID NO: 57; SNP_30 comprising a Guanine located at nucleotide 51 of SEQ ID NO: 59 or at nucleotide 51 of a sequence comprising at least 95% (preferably at least 96%, at least 97%, at least 98% and most preferably at least 99%) sequence identity to SEQ ID NO: 59; SNP_31 comprising a Cytosine located at nucleotide 51 of SEQ ID NO: 61 or at nucleotide 51 of a sequence comprising at least 95% (preferably at least 96%, at least 97%, at least 98% and most preferably at least 99%) sequence identity to SEQ ID NO: 61; SNP_32 comprising a Guanine located at nucleotide 51 of SEQ ID NO: 63 or at nucleotide 51 of a sequence comprising at least 95% (preferably at least 96%, at least 97%, at least 98% and most preferably at least 99%) sequence identity to SEQ ID NO: 63; SNP_33 comprising an Adenine located at nucleotide 51 of SEQ ID NO: 65 or at nucleotide 51 of a sequence comprising at least 95% (preferably at least 96%, at least 97%, at least 98% and most preferably at least 99%) sequence identity to SEQ ID NO: 65; SNP_34 comprising a Thymine located at nucleotide 51 of SEQ ID NO: 67 or at nucleotide 51 of a sequence comprising at least 95% (preferably at least 96%, at least 97%, at least 98% and most preferably at least 99%) sequence identity to SEQ ID NO: 67; SNP_35 comprising a Guanine located at nucleotide 51 of SEQ ID NO: 69 or at nucleotide 51 of a sequence comprising at least 95% (preferably at least 96%, at least 97%, at least 98% and most preferably at least 99%) sequence identity to SEQ ID NO: 69; SNP_36 comprising a Cytosine located at nucleotide 51 of SEQ ID NO: 71 or at nucleotide 51 of a sequence comprising at least 95% (preferably at least 96%, at least 97%, at least 98% and most preferably at least 99%) sequence identity to SEQ ID NO: 71; SNP_37 comprising a Thymine located at nucleotide 51 of SEQ ID NO: 73 or at nucleotide 51 of a sequence comprising at least 95% (preferably at least 96%, at least 97%, at least 98% and most preferably at least 99%) sequence identity to SEQ ID NO: 73; SNP_38 comprising an Adenine located at nucleotide 51 of SEQ ID NO: 75 or at nucleotide 51 of a sequence comprising at least 95% (preferably at least 96%, at least 97%, at least 98% and most preferably at least 99%) sequence identity to SEQ ID NO: 75; SNP_39 comprising a Cytosine located at nucleotide 51 of SEQ ID NO: 77 or at nucleotide 51 of a sequence comprising at least 95% (preferably at least 96%, at least 97%, at least 98% and most preferably at least 99%) sequence identity to SEQ ID NO: 77; and SNP_40 comprising an Adenine located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79. Preferably, QTL8 as described herein comprises a haplotype that can be characterized by the presence of 2 or more of the SNP markers SNP_21 to SNP_40 as described herein, more preferably 3 or more of the SNP markers SNP_21 to SNP_40 as described herein, even more preferably 4 or more of the SNP markers SNP_21 to SNP_40 as described herein, and particularly preferably 5 or more of the SNP markers SNP_21 to SNP_40 as described herein.

The plant according to the present invention comprising QTL8 as described herein accordingly comprises at least one copy of QTL8 and optionally in addition thereto at least one copy of QTL7. Such a plant thus may be heterozygous for QTL8 or homozygous for QTL8. QTL8 as described herein is dominant. This means that at least one copy of QTL8 needs to be comprised in the genome of a *Capsicum annuum* plant in order to achieve the *Frankliniella occidentalis* resistance phenotype conferred by said QTL8. A plant according to the present invention further may be heterozygous for QTL7 or homozygous for QTL7. QTL7 as described herein is dominant. This means that at least one copy of QTL7 needs to be comprised in the genome of a *Capsicum annuum* plant in order to achieve the *Frankliniella occidentalis* resistance phenotype conferred by said QTL7. In one aspect, QTL8 and optionally also QTL7 comprised in the *Capsicum annuum* plant according to present invention are present in homozygous form. In one aspect, the *Capsicum annuum* plant according to present invention comprises both QTL7 and QTL8. In one aspect, the *Capsicum annuum* plant according to present invention comprises QTL7 in homozygous form and QTL8 in heterozygous form. In one aspect, the *Capsicum annuum* plant according to present invention comprises QTL7 in heterozygous form and QTL8 in homozygous form. In one aspect, the *Capsicum annuum* plant according to present invention comprises QTL7 in homozygous form and QTL8 in homozygous form.

In one aspect, the *Capsicum annuum* plant according to the present invention is an inbred plant, a dihaploid plant or a hybrid plant. In one embodiment, the present invention provides a plant as described herein that further is an inbred plant, a dihaploid plant or a hybrid plant. In one aspect, accordingly, the present invention provides that the plant of the present invention is an inbred plant. Such an inbred plant is highly homozygous, for instance by repeated selfing crossing steps. Such an inbred plant may be very useful as a parental plant for the production of F1 hybrid seed. In one aspect, the disclosure provides for haploid plants and/or dihaploid (double haploid) plants of plant of the invention are encompassed herein, which comprise QTL8 and optionally QTL7 as described herein. Haploid and dihaploid plants can for example be produced by anther or microspore culture and regeneration into a whole plant. For dihaploid production chromosome doubling may be induced using known methods, such as colchicine treatment or the like. So, in one aspect a *Capsicum annuum* plant is provided, comprising QTL8 and optionally QTL7 as described, wherein the plant is a dihaploid plant. The present invention further provides hybrid plants, which may have advantages such as improved uniformity, vitality and/or disease tolerance. the *Capsicum annuum* plant according to the present invention preferably is a F1 hybrid plant, more preferably a single cross F1 hybrid plant.

The plants provided by the present invention accordingly may be used to produce fruits. The present invention thus provides the use of a *Capsicum annuum* plant as provided herein as a crop for consumption. Particularly the fruits produced by the plants of the present invention can be advantageously used as a crop for consumption since these fruits are less likely to show disease symptoms that typically develop after infestation with thrips such as *Frankliniella occidentalis*.

The plants provided by the present invention may be used to produce propagation material. Such propagation material comprises propagation material suitable for and/or resulting from sexual reproduction, such as pollen and seeds. Such propagation material comprises propagation material suitable for and/or resulting from asexual or vegetative reproduction including, but not limited to cuttings, grafts, tubers, cell culture and tissue culture. The present invention thus further provides the use of a *Capsicum annuum* plant as provided herein as a source of propagation material.

In one aspect, the present invention provides a seed produced by the *Capsicum annuum* plant as described herein, wherein the seed comprises QTL8 and optionally QTL7 as described herein.

In one aspect, the present invention provides a seed from which the *Capsicum annuum* plant according to the present invention can be grown.

Furthermore, the invention provides a plurality of seed according to the present invention. A seed of the invention can be distinguished from other seeds due to the presence of QTL8 and/or as described herein, either phenotypically (based on the *Frankliniella occidentalis* resistance phenotype of the present invention) and/or using molecular methods to detect the presence of QTL8 and optionally QTL7 in the cells or tissues, such as molecular genotyping methods to detect QTL8 and optionally QTL7 of the present invention or sequencing. Seeds include for example seeds produced by a plant of the invention which is heterozygous for the mutant allele after self-pollination and optionally selection of those seeds which comprise one or two copies of the mutant allele (e.g. by non-destructive seed sampling methods and analysis of the presence of the QTL8 and optionally QTL7, or seed produced after cross-pollination, e.g. pollination of a plant of the invention with pollen from another pepper plant, preferably from another *Capsicum annuum* plant, or pollination of another *Capsicum annuum* plant with pollen of a plant of the invention.

The present invention further provides seeds obtained from the methods of producing plants as described herein.

In one aspect, a plurality of seed is packaged into a container (e.g. a bag, a carton, a can etc.). Containers may be any size. The seeds may be pelleted prior to packing (to form pills or pellets) and/or treated with various compounds, including seed coatings.

In a further aspect a plant part, obtained from (obtainable from) a plant of the invention is provided herein, and a container or a package comprising said plant part. In one aspect, the present invention provides a plant cell, tissue or plant part of the *Capsicum annuum* plant according to present invention or of the seed according to present invention, wherein said plant cell, tissue or plant part comprises QTL8 and optionally QTL7 as described herein.

In a further aspect, the plant part is a plant cell. In still a further aspect, the plant part is a non-regenerable cell or a regenerable cell. In another aspect the plant cell is a somatic cell.

A non-regenerable cell is a cell which cannot be regenerated into a whole plant through in vitro culture. The non-regenerable cell may be in a plant or plant part (e.g. leaves) of the invention. The non-regenerable cell may be a cell in a seed, or in the seed-coat of said seed. Mature plant organs, including a mature leaf, a mature stem or a mature root, contain at least one nonregenerable cell.

In a further aspect the plant cell is a reproductive cell, such as an ovule or a cell which is part of a pollen. In an aspect, the pollen cell is the vegetative (non-reproductive) cell, or the sperm cell (Tiezzi, Electron Microsc. Review, 1991). Such a reproductive cell is haploid. When it is regenerated into whole a plant, it comprises the haploid genome of the starting plant. If chromosome doubling occurs (e.g. through chemical treatment), a double haploid plant can be regenerated. In one aspect the plant of the invention comprising QTL8 and optionally QTL7 as described herein is a haploid or a double haploid *Capsicum annuum* plant according to the present invention.

Moreover, there is provided an in vitro cell culture or tissue culture of the *Capsicum annuum* plant of the invention in which the cell- or tissue culture is derived from a plant part described herein, such as, for example and without limitation, a leaf, a pollen, an embryo, cotyledon, hypocotyls, callus, a root, a root tip, an anther, a flower, a seed or a stem, or a part of any of them, or a meristematic cell, a somatic cell, or a reproductive cell.

The present invention further provides a vegetatively propagated plant, wherein said plant is propagated from a plant part according to the present invention.

Further, isolated cells, in vitro cell cultures and tissue cultures, protoplast cultures, plant parts, harvested material (e.g. harvested pepper fruits), pollen, ovaries, flowers, seeds, stamen, flower parts, etc. comprising in each cell at least one copy of the QTL8 and optionally QTL7 as described herein are provided. Thus, when said cells or tissues are regenerated or grown into a whole *Capsicum annuum* plant, the plant comprises QTL8 and optionally QTL7 capable of conferring a *Frankliniella occidentalis* resistance phenotype.

Thus, also an in vitro cell culture and/or tissue culture of cells or tissues of plants of the invention is provided. The cell or tissue culture can be treated with shooting and/or rooting media to regenerate a *Capsicum annuum* plant.

Also, vegetative or clonal propagation of plants according to the invention is encompassed herein. Many different vegetative propagation techniques exist. Cuttings (nodes, shoot tips, stems, etc.) can for example be used for in vitro culture as described above. Also, other vegetative propagation techniques exist and can be used, such as grafting, or air layering. In air layering a piece of stem is allowed to develop roots while it is still attached to the parent plant and once enough roots have developed the clonal plant is separated from the parent.

Thus, in one aspect a method is provided comprising:
(a) obtaining a part of a plant of the invention (e.g. cells or tissues, e.g. cuttings),
(b) vegetatively propagating said plant part to generate an identical plant from the plant part.

Thus, also the use of vegetative plant parts of plants of the invention for clonal/vegetative propagation is an aspect of the invention. In one aspect a method is provided for vegetatively reproducing a *Capsicum annuum* plant of the invention comprising QTL8 and optionally QTL7 as described herein is provided. Also, a vegetatively produced *Capsicum annuum* plant comprising QTL8 and optionally QTL7 as described herein is provided.

In another aspect a *Capsicum annuum* plant according to the invention, comprising QTL8 and optionally QTL7 as described herein, is propagated by somatic embryogenesis techniques.

Also provided is a *Capsicum annuum* plant regenerated from any of the above-described plant parts or regenerated from the above-described cell or tissue cultures, said regenerated plant comprising in its genome QTL8 and optionally QTL7 as described herein. This plant can also be referred to as a vegetative propagation of plants of the invention.

The invention also relates to a food or feed product comprising or consisting of a plant part described herein. The food or feed product may be fresh or processed, e.g., canned, steamed, boiled, fried, blanched and/or frozen etc. Examples are sandwiches, salads, juices, sauces, fruit pastes or other food products comprising a fruit or a part of a fruit of a plant of the invention.

In one aspect plants, plant parts and cells according to the present invention are obtained by a technical method such as a marker assisted selection method as described herein. In one aspect plants, plant parts and cells according to the present invention are not exclusively obtained by means of an essentially biological process as defined by Rule 28(2) EPC. Preferably, a process for the production of plants or animals is essentially biological if it consists entirely of natural phenomena such as crossing or selection as defined by Rule 26(5) EPC.

Methods of Producing or of Identifying and/or Selecting a Plant or Plant Part

The present invention further provides methods wherein a *Capsicum annuum* plant as described herein comprising QTL8 and optionally QTL7 of the present invention is used and/or obtained. QTL8 and the optional QTL7 of the invention are described in detail in the context of the plants provided by the present invention. In one aspect, accordingly, the present invention provides a method for producing a *Capsicum annuum* plant having a *Frankliniella occidentalis* resistance phenotype, said method comprising the step(s) of: (i) crossing a first *Capsicum annuum* plant and a second plant, wherein the first *Capsicum annuum* plant comprises in its genome QTL8 and optionally QTL7 as described herein; (ii) optionally harvesting seed from the crossing of (i) and selecting seed comprising QTL8 and optionally QTL7 in its genome. Accordingly, the present invention further provides a method for producing a *Capsicum annuum* plant having a *Frankliniella occidentalis* resistance phenotype said method comprising the step(s) of: (i) crossing a first *Capsicum annuum* plant and a second plant, wherein the first *Capsicum annuum* plant comprises an introgression fragment on chromosome 8 comprising Quantitative Trait Locus QTL8 and optionally further comprises an introgression fragment on chromosome 7 comprising Quantitative Trait Locus QTL7, wherein said QTL7 and QTL8 confer an improved resistance to *Frankliniella occidentalis*, wherein QTL7 is located on chromosome 7 between SNP_01 located at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1 and SNP_20 located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39; and QTL8 is located on chromosome 8 between SNP_21 located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41 and SNP_40 located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79; (ii) optionally harvesting seed from the crossing of (i) and selecting seed comprising QTL7 and/or QTL8 in its genome.

In one aspect, the present invention provides a method for producing a *Capsicum annuum* plant having a *Frankliniella occidentalis* resistance phenotype as described herein, wherein in step (i) both the first *Capsicum annuum* plant and the second plant are plants according to the present invention. More preferably, both the first *Capsicum annuum* plant and the second *Capsicum annuum* plant in step (i) of the method of producing the *Capsicum annuum* plant as provided herein are plants according to the present invention comprising QTL8 and optionally QTL7 as described herein in their genome.

In one aspect, the present invention provides a method for identifying and/or selecting a *Capsicum annuum* plant or plant part comprising determining whether said plant or plant part comprises in its genome QTL8 and optionally QTL7 as described herein. Accordingly, the present invention provides a method for identifying and/or selecting a *Capsicum annuum* plant or plant part comprising determining whether said plant or plant part comprises in its genome an introgression fragment on chromosome 8 comprising Quantitative Trait Locus QTL8, wherein said QTL8 confers an improved resistance to *Frankliniella occidentalis*, wherein QTL8 is located on chromosome 8 between SNP_21 located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41 and SNP_40 located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79. The method for identifying and/or selecting a *Capsicum annuum* plant or plant part according to the present invention may additionally comprise determining whether said plant or plant part comprises in its genome an introgression fragment on chromosome 7 comprising Quantitative Trait Locus TTL7, wherein said QTL7 is located on chromosome 7 between SNP_01 located at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1 and SNP_20 located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39. Preferably, the method according to the present invention for identifying and/or selecting an *Capsicum annuum* plant or plant part comprises determining in said plant or plant part the presence or absence of one or more (e.g. 2) peak marker(s), preferably one or more (e.g. 2) of the peak markers as described in Table 2. As used herein, the term "peak marker" describes a marker that is found to be as accurate as possible, preferably with a false-positive and/or false-negative rate of 0%.

The method may comprise screening at the DNA, RNA (or cDNA) or protein level using known methods, in order to detect the presence of QTL8 and optionally QTL7 according to the present invention. There are many methods to detect the presence of an introgression fragment comprising QTL8 and optionally QTL7 as described herein. For example, if there is a single nucleotide difference (single nucleotide polymorphism, SNP) between a plant comprising the gene of interest or the QTL of interest (such as QTL8 and optionally QTL7) a plant which does not comprise the gene or QTL of interest, a SNP genotyping assay can be used to detect whether a plant or plant part or cell comprises the gene or QTL of interest in its genome. For example, the SNP can easily be detected using a KASP-assay (see world wide web at kpbioscience.co.uk) or other SNP genotyping assays. For developing a KASP-assay, for example 70 base pairs upstream and 70 base pairs downstream of the SNP can be selected and two allele-specific forward primers and one allele specific reverse primer can be designed. See e.g. Allen et al. 2011, Plant Biotechnology J. 9, 1086-1099, especially p097-1098 for KASP-assay method. Equally other genotyping assays can be used. For example, a TaqMan SNP genotyping assay, a HighResolution Melting (HRM) assay, SNP-genotyping arrays (e.g. Fluidigm, Illumine, etc.) or DNA sequencing may equally be used.

[91] Molecular markers may also be used to aid in the identification of the plants (or plant parts or nucleic acids obtained therefrom) containing QTL8 and optionally QTL7 of the present invention. For example, one can develop one or more suitable molecular markers which are closely genetically (and preferably also physically) linked to QTL8 and optionally QTL7. Suitable molecular markers can be developed by crossing a *Capsicum annuum* plant according to the present invention (preferably having the *Frankliniella occidentalis* resistance phenotype) with a control plant, preferably an isogenic plant and developing a segregating population (e.g. F2 or backcross population) from that cross. The segregating population can then be phenotyped for the *Frankliniella occidentalis* resistance phenotype as described herein and genotyped using e.g. molecular markers such as SNPs (Single Nucleotide Polymorphisms), AFLPs (Amplified Fragment Length Polymorphisms; see, e.g., EP 534 858), or others, and by software analysis molecular markers which co-segregate with the *Frankliniella occidentalis* resistance phenotype of the present invention in the segregating population can be identified and their order and genetic distance (centimorgan distance, cM) to the locus of the QTL of interest (or the causal gene) can be identified. Molecular markers which are closely linked to gene or QTL of interest, e.g. markers at a 5 cM distance or less, can then be used in detecting and/or selecting plants (e.g. plants of the invention or progeny of a plant of the invention) or plant parts comprising or retaining the gene or QTL of interest (e.g. in an introgression fragment). Such closely linked molecular markers can replace phenotypic selection (or be used in addition to phenotypic selection) in breeding programs, i.e. in Marker Assisted Selection (MAS). Preferably, linked markers are used in MAS. More preferably, flanking markers are used in MAS, i.e. one marker on either side of the locus of the QTL of interest.

In one aspect, the present invention provides a marker for determining the presence or absence of a QTL conferring an improved resistance to *Frankliniella occidentalis* in a *Capsicum annuum* plant or plant part, whereby the marker is selected from the group consisting of: a marker linked to a *Frankliniella occidentalis* conferring QTL located on chromosome 7 between SNP_01 located at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1 and SNP_20 located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39; and a marker linked to a *Frankliniella occidentalis* conferring QTL located on chromosome 8 between SNP_21 located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41 and SNP_40 located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79.

In one aspect, the marker for determining the presence or absence of a QTL conferring an improved resistance to *Frankliniella occidentalis* in a *Capsicum annuum* plant or plant part according to the present invention is a SNP marker.

In one aspect, the marker linked to a *Frankliniella occidentalis* conferring QTL located on chromosome 7 according to the present invention is selected from the group consisting of: SNP_01 located at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1; SNP_02 located at nucleotide 51 of SEQ ID NO: 3 or at nucleotide 51 of a sequence comprising at least 95% (preferably at least 96%, at least 97%, at least 98% and most preferably at least 99%) sequence identity to SEQ ID NO: 3; SNP_03 located at nucleotide 51 of SEQ ID NO: 5 or at nucleotide 51 of a sequence comprising at least 95% (preferably at least 96%, at least 97%, at least 98% and most preferably at least 99%) sequence identity to SEQ ID NO: 5; SNP_04 located at nucleotide 51 of SEQ ID NO: 7 or at nucleotide 51 of a sequence comprising at least 95% (preferably at least 96%, at least 97%, at least 98% and most preferably at least 99%) sequence identity to SEQ ID NO: 7; SNP_05 located at nucleotide 51 of SEQ ID NO: 9 or at nucleotide 51 of a sequence comprising at least 95% (preferably at least 96%, at least 97%, at least 98% and most preferably at least 99%) sequence identity to SEQ ID NO: 9; SNP_06 located at nucleotide 51 of SEQ ID NO: 11 or at nucleotide 51 of a sequence comprising at least 95% (preferably at least 96%, at least 97%, at least 98% and most preferably at least 99%) sequence identity to SEQ ID NO: 11; SNP_07 located at nucleotide 51 of SEQ ID NO: 13 or at nucleotide 51 of a sequence comprising at least 95% (preferably at least 96%, at least 97%, at least 98% and most preferably at least 99%) sequence identity to SEQ ID NO: 13; SNP_08 located at nucleotide 51 of SEQ ID NO: 15 or at nucleotide 51 of a sequence comprising at least 95% (preferably at least 96%, at least 97%, at least 98% and most preferably at least 99%) sequence identity to SEQ ID NO: 15; SNP_09 located at nucleotide 51 of SEQ ID NO: 17 or at nucleotide 51 of a sequence comprising at least 95% (preferably at least 96%, at least 97%, at least 98% and most preferably at least 99%) sequence identity to SEQ ID NO: 17; SNP_10 located at nucleotide 51 of SEQ ID NO: 19 or at nucleotide 51 of a sequence comprising at least 95% (preferably at least 96%, at least 97%, at least 98% and most preferably at least 99%) sequence identity to SEQ ID NO: 19; SNP_11 located at nucleotide 51 of SEQ ID NO: 21 or at nucleotide 51 of a sequence comprising at least 95% (preferably at least 96%, at least 97%, at least 98% and most preferably at least 99%) sequence identity to SEQ ID NO: 21; SNP_12 located at nucleotide 51 of SEQ ID NO: 23 or at nucleotide 51 of a sequence comprising at least 95% (preferably at least 96%, at least 97%, at least 98% and most preferably at least 99%) sequence identity to SEQ ID NO: 23; SNP_13 located at nucleotide 51 of SEQ ID NO: 25 or at nucleotide 51 of a sequence comprising at least 95% (preferably at least 96%, at least 97%, at least 98% and most preferably at least 99%) sequence identity to SEQ ID NO: 25; SNP_14 located at nucleotide 51 of SEQ ID NO: 27 or at nucleotide 51 of a sequence comprising at least 95% (preferably at least 96%, at least 97%, at least 98% and most preferably at least 99%) sequence identity to SEQ ID NO: 27; SNP_15 located at nucleotide 51 of SEQ ID NO: 29 or at nucleotide 51 of a sequence comprising at least 95% (preferably at least 96%, at least 97%, at least 98% and most preferably at least 99%) sequence identity to SEQ ID NO: 29; SNP_16 located at nucleotide 51 of SEQ ID NO: 31 or at nucleotide 51 of a sequence comprising at least 95% (preferably at least 96%, at least 97%, at least 98% and most preferably at least 99%) sequence identity to SEQ ID NO: 31; SNP_17 located at nucleotide 51 of SEQ ID NO: 33 or at nucleotide 51 of a sequence comprising at least 95% (preferably at least 96%, at least 97%, at least 98% and most preferably at least 99%) sequence identity to SEQ ID NO: 33; SNP_18 located at nucleotide 51 of SEQ ID NO: 35 or at nucleotide 51 of a sequence comprising at least 95% (preferably at least 96%, at least 97%, at least 98% and most preferably at least 99%) sequence identity to SEQ ID NO: 35; SNP_19 located at nucleotide 51 of SEQ ID NO: 37 or at nucleotide 51 of a sequence comprising at least 95% (preferably at least 96%, at least 97%, at least 98% and most preferably at least 99%) sequence identity to SEQ ID NO: 37; and SNP_20 located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39.

In one aspect, the marker linked to a *Frankliniella occidentalis* conferring QTL located on chromosome 7 according to the present invention is suitable for determining the presence of a QTL conferring an improved resistance to *Frankliniella occidentalis* and wherein: SNP_01 comprises a Thymine located at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1; SNP_02 comprises a Thymine located at nucleotide 51 of SEQ ID NO: 3 or at nucleotide 51 of a sequence comprising at least 95% (preferably at least 96%, at least 97%, at least 98% and most preferably at least 99%) sequence identity to SEQ ID NO: 3; SNP_03 comprises an Adenine located at nucleotide 51 of SEQ ID NO: 5 or at nucleotide 51 of a sequence comprising at least 95% (preferably at least 96%, at least 97%, at least 98% and most preferably at least 99%) sequence identity to SEQ ID NO: 5; SNP_04 comprises a Cytosine located at nucleotide 51 of SEQ ID NO: 7 or at nucleotide 51 of a sequence comprising at least 95% (preferably at least 96%, at least 97%, at least 98% and most preferably at least 99%) sequence identity to SEQ ID NO: 7; SNP_05 comprises an Adenine located at nucleotide 51 of SEQ ID NO: 9 or at nucleotide 51 of a sequence comprising at least 95% (preferably at least 96%, at least 97%, at least 98% and most preferably at least 99%) sequence identity to SEQ ID NO: 9; SNP_06 comprises an Adenine located at nucleotide 51 of SEQ ID NO: 11 or at nucleotide 51 of a sequence comprising at least 95% (preferably at least 96%, at least 97%, at least 98% and most preferably at least 99%) sequence identity to SEQ ID NO: 11; SNP_07 comprises a Guanine located at nucleotide 51 of SEQ ID NO: 13 or at nucleotide 51 of a sequence comprising at least 95% (preferably at least 96%, at least 97%, at least 98% and most preferably at least 99%) sequence identity to SEQ ID NO: 13; SNP_08 comprises a Guanine located at nucleotide 51 of SEQ ID NO: 15 or at nucleotide 51 of a sequence comprising at least 95% (preferably at least 96%, at least 97%, at least 98% and most preferably at least 99%) sequence identity to SEQ ID NO: 15; SNP_09 comprises a Cytosine located at nucleotide 51 of SEQ ID NO: 17 or at nucleotide 51 of a sequence comprising at least 95% (preferably at least 96%, at least 97%, at least 98% and most preferably at least 99%) sequence identity to SEQ ID NO: 17; SNP_10 comprises a Guanine located at nucleotide 51 of SEQ ID NO: 19 or at nucleotide 51 of a sequence comprising at least 95% (preferably at least 96%, at least 97%, at least 98% and most preferably at least 99%) sequence identity to SEQ ID NO: 19; SNP_11 comprises a Guanine located at nucleotide 51 of SEQ ID NO: 21 or at nucleotide 51 of a sequence comprising at least 95% (preferably at least 96%, at least 97%, at least 98% and most preferably at least 99%) sequence identity to SEQ ID NO: 21; SNP_12 comprises a Thymine located at nucleotide 51 of SEQ ID NO: 23 or at nucleotide 51 of a sequence comprising at least 95% (preferably at least 96%, at least 97%, at least 98% and most preferably at least 99%) sequence identity to SEQ ID NO: 23; SNP_13 comprises an Adenine located at nucleotide 51 of SEQ ID NO: 25 or at nucleotide 51 of a sequence comprising at least 95% (preferably at least 96%, at least 97%, at least 98% and most preferably at least 99%) sequence identity to SEQ ID NO: 25; SNP_14 comprises a Thymine located at nucleotide 51 of SEQ ID NO: 27 or at nucleotide 51 of a sequence comprising at least 95% (preferably at least 96%, at least 97%, at least 98% and most preferably at least 99%) sequence identity to SEQ ID NO: 27; SNP_15 comprises a Thymine located at nucleotide 51 of SEQ ID NO: 29 or at nucleotide 51 of a sequence comprising at least 95% (preferably at least 96%, at least 97%, at least 98% and most preferably at least 99%) sequence identity to SEQ ID NO: 29; SNP_16 comprises a Guanine located at nucleotide 51 of SEQ ID NO: 31 or at nucleotide 51 of a sequence comprising at least 95% (preferably at least 96%, at least 97%, at least 98% and most preferably at least 99%) sequence identity to SEQ ID NO: 31; SNP_17 comprises a Thymine located at nucleotide 51 of SEQ ID NO: 33 or at nucleotide 51 of a sequence comprising at least 95% (preferably at least 96%, at least 97%, at least 98% and most preferably at least 99%) sequence identity to SEQ ID NO: 33; SNP_18 comprises a Thymine located at nucleotide 51 of SEQ ID NO: 35 or at nucleotide 51 of a sequence comprising at least 95% (preferably at least 96%, at least 97%, at least 98% and most preferably at least 99%) sequence identity to SEQ ID NO: 35; SNP_19 comprises an Adenine located at nucleotide 51 of SEQ ID NO: 37 or at nucleotide 51 of a sequence comprising at least 95% (preferably at least 96%, at least 97%, at least 98% and most preferably at least 99%) sequence identity to SEQ ID NO: 37; and SNP_20 comprises a Guanine located at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39.

In one aspect, the marker linked to a *Frankliniella occidentalis* conferring QTL located on chromosome 8 according to the present invention is selected from the group consisting of: SNP_21 located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41; SNP_22 located at nucleotide 51 of SEQ ID NO: 43 or at nucleotide 51 of a sequence comprising at least 95% (preferably at least 96%, at least 97%, at least 98% and most preferably at least 99%) sequence identity to SEQ ID NO: 43; SNP_23 located at nucleotide 51 of SEQ ID NO: 45 or at nucleotide 51 of a sequence comprising at least 95% (preferably at least 96%, at least 97%, at least 98% and most preferably at least 99%) sequence identity to SEQ ID NO: 45; SNP_24 located at nucleotide 51 of SEQ ID NO: 47 or at nucleotide 51 of a sequence comprising at least 95% (preferably at least 96%, at least 97%, at least 98% and most preferably at least 99%) sequence identity to SEQ ID NO: 47; SNP_25 located at nucleotide 51 of SEQ ID NO: 49 or at nucleotide 51 of a sequence comprising at least 95% (preferably at least 96%, at least 97%, at least 98% and most preferably at least 99%) sequence identity to SEQ ID NO: 49; SNP_26 located at nucleotide 51 of SEQ ID NO: 51 or at nucleotide 51 of a sequence comprising at least 95% (preferably at least 96%, at least 97%, at least 98% and most preferably at least 99%) sequence identity to SEQ ID NO: 51; SNP_27 located at nucleotide 51 of SEQ ID NO: 53 or at nucleotide 51 of a sequence comprising at least 95% (preferably at least 96%, at least 97%, at least 98% and most preferably at least 99%) sequence identity to SEQ ID NO: 53; SNP_28 located at nucleotide 51 of SEQ ID NO: 55 or at nucleotide 51 of a sequence comprising at least 95% (preferably at least 96%, at least 97%, at least 98% and most preferably at least 99%) sequence identity to SEQ ID NO: 55; SNP_29 located at nucleotide 51 of SEQ ID NO: 57 or at nucleotide 51 of a sequence comprising at least 95% (preferably at least 96%, at least 97%, at least 98% and most preferably at least 99%) sequence identity to SEQ ID NO: 57; SNP_30 located at nucleotide 51 of SEQ ID NO: 59 or at nucleotide 51 of a sequence comprising at least 95% (preferably at least 96%, at least 97%, at least 98% and most preferably at least 99%) sequence identity to SEQ ID NO: 59; SNP_31 located at nucleotide 51 of SEQ ID NO: 61 or at nucleotide 51 of a sequence comprising at least 95% (preferably at least 96%, at least 97%, at least 98% and most preferably at least 99%) sequence identity to SEQ ID NO: 61; SNP_32 located at nucleotide 51 of SEQ ID NO: 63 or at nucleotide 51 of a sequence comprising at least 95% (preferably at least 96%, at least 97%, at least 98% and most preferably at least 99%) sequence identity to SEQ ID NO: 63; SNP_33 located at nucleotide 51 of SEQ ID NO: 65 or at nucleotide 51 of a sequence comprising at least 95% (preferably at least 96%, at least 97%, at least 98% and most preferably at least 99%) sequence identity to SEQ ID NO: 65; SNP_34 located at nucleotide 51 of SEQ ID NO: 67 or at nucleotide 51 of a sequence comprising at least 95% (preferably at least 96%, at least 97%, at least 98% and most preferably at least 99%) sequence identity to SEQ ID NO: 67; SNP_35 located at nucleotide 51 of SEQ ID NO: 69 or at nucleotide 51 of a sequence comprising at least 95% (preferably at least 96%, at least 97%, at least 98% and most preferably at least 99%) sequence identity to SEQ ID NO: 69; SNP_36 located at nucleotide 51 of SEQ ID NO: 71 or at nucleotide 51 of a sequence comprising at least 95% (preferably at least 96%, at least 97%, at least 98% and most preferably at least 99%) sequence identity to SEQ ID NO: 71; SNP_37 located at nucleotide 51 of SEQ ID NO: 73 or at nucleotide 51 of a sequence comprising at least 95% (preferably at least 96%, at least 97%, at least 98% and most preferably at least 99%) sequence identity to SEQ ID NO: 73; SNP_38 located at nucleotide 51 of SEQ ID NO: 75 or at nucleotide 51 of a sequence comprising at least 95% (preferably at least 96%, at least 97%, at least 98% and most preferably at least 99%) sequence identity to SEQ ID NO: 75; SNP_39 located at nucleotide 51 of SEQ ID NO: 77 or at nucleotide 51 of a sequence comprising at least 95% (preferably at least 96%, at least 97%, at least 98% and most preferably at least 99%) sequence identity to SEQ ID NO: 77; and SNP_40 located at nucleotide 51 of SEQ ID NO: 79 or at nucleotide 51 of a sequence comprising at least 95%

(preferably at least 96%, at least 97%, at least 98% and most preferably at least 99%) sequence identity to SEQ ID NO: 79.

In one aspect, the marker linked to a *Frankliniella occidentalis* conferring QTL located on chromosome 8 according to the present invention is suitable for determining the presence of a QTL conferring an improved resistance to *Frankliniella occidentalis* and wherein: SNP_21 comprises an Adenine located at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41; SNP_22 comprises a Thymine located at nucleotide 51 of SEQ ID NO: 43 or at nucleotide 51 of a sequence comprising at least 95% (preferably at least 96%, at least 97%, at least 98% and most preferably at least 99%) sequence identity to SEQ ID NO: 43; SNP_23 comprises a Guanine located at nucleotide 51 of SEQ ID NO: 45 or at nucleotide 51 of a sequence comprising at least 95% (preferably at least 96%, at least 97%, at least 98% and most preferably at least 99%) sequence identity to SEQ ID NO: 45; SNP_24 comprises a Guanine located at nucleotide 51 of SEQ ID NO: 47 or at nucleotide 51 of a sequence comprising at least 95% (preferably at least 96%, at least 97%, at least 98% and most preferably at least 99%) sequence identity to SEQ ID NO: 47; SNP_25 comprises a Guanine located at nucleotide 51 of SEQ ID NO: 49 or at nucleotide 51 of a sequence comprising at least 95% (preferably at least 96%, at least 97%, at least 98% and most preferably at least 99%) sequence identity to SEQ ID NO: 49; SNP_26 comprises a Adenine located at nucleotide 51 of SEQ ID NO: 51 or at nucleotide 51 of a sequence comprising at least 95% (preferably at least 96%, at least 97%, at least 98% and most preferably at least 99%) sequence identity to SEQ ID NO: 51; SNP_27 comprises a Thymine located at nucleotide 51 of SEQ ID NO: 53 or at nucleotide 51 of a sequence comprising at least 95% (preferably at least 96%, at least 97%, at least 98% and most preferably at least 99%) sequence identity to SEQ ID NO: 53; SNP_28 comprises an Adenine located at nucleotide 51 of SEQ ID NO: 55 or at nucleotide 51 of a sequence comprising at least 95% (preferably at least 96%, at least 97%, at least 98% and most preferably at least 99%) sequence identity to SEQ ID NO: 55; SNP_29 comprises a Thymine located at nucleotide 51 of SEQ ID NO: 57 or at nucleotide 51 of a sequence comprising at least 95% (preferably at least 96%, at least 97%, at least 98% and most preferably at least 99%) sequence identity to SEQ ID NO: 57; SNP_30 comprises a Guanine located at nucleotide 51 of SEQ ID NO: 59 or at nucleotide 51 of a sequence comprising at least 95% (preferably at least 96%, at least 97%, at least 98% and most preferably at least 99%) sequence identity to SEQ ID NO: 59; SNP_31 comprises a Cytosine located at nucleotide 51 of SEQ ID NO: 61 or at nucleotide 51 of a sequence comprising at least 95% (preferably at least 96%, at least 97%, at least 98% and most preferably at least 99%) sequence identity to SEQ ID NO: 61; SNP_32 comprises a Guanine located at nucleotide 51 of SEQ ID NO: 63 or at nucleotide 51 of a sequence comprising at least 95% (preferably at least 96%, at least 97%, at least 98% and most preferably at least 99%) sequence identity to SEQ ID NO: 63; SNP_33 comprises an Adenine located at nucleotide 51 of SEQ ID NO: 65 or at nucleotide 51 of a sequence comprising at least 95% (preferably at least 96%, at least 97%, at least 98% and most preferably at least 99%) sequence identity to SEQ ID NO: 65; SNP_34 comprises a Thymine located at nucleotide 51 of SEQ ID NO: 67 or at nucleotide 51 of a sequence comprising at least 95% (preferably at least 96%, at least 97%, at least 98% and most preferably at least 99%) sequence identity to SEQ ID NO: 67; SNP_35 comprises a Guanine located at nucleotide 51 of SEQ ID NO: 69 or at nucleotide 51 of a sequence comprising at least 95% (preferably at least 96%, at least 97%, at least 98% and most preferably at least 99%) sequence identity to SEQ ID NO: 69; SNP_36 comprises a Cytosine located at nucleotide 51 of SEQ ID NO: 71 or at nucleotide 51 of a sequence comprising at least 95% (preferably at least 96%, at least 97%, at least 98% and most preferably at least 99%) sequence identity to SEQ ID NO: 71; SNP_37 comprises a Thymine located at nucleotide 51 of SEQ ID NO: 73 or at nucleotide 51 of a sequence comprising at least 95% (preferably at least 96%, at least 97%, at least 98% and most preferably at least 99%) sequence identity to SEQ ID NO: 73; SNP_38 comprises an Adenine located at nucleotide 51 of SEQ ID NO: 75 or at nucleotide 51 of a sequence comprising at least 95% (preferably at least 96%, at least 97%, at least 98% and most preferably at least 99%) sequence identity to SEQ ID NO: 75; SNP_39 comprises a Cytosine located at nucleotide 51 of SEQ ID NO: 77 or at nucleotide 51 of a sequence comprising at least 95% (preferably at least 96%, at least 97%, at least 98% and most preferably at least 99%) sequence identity to SEQ ID NO: 77; and SNP_40 comprises an Adenine located at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79.

In one aspect, the present invention provides the use of a marker according to the present invention for determining the presence or absence of one or more QTLs conferring an improved resistance to *Frankliniella occidentalis* in a *Capsicum annuum* plant or plant part, wherein said one or more QTLs preferably is QTL7 and/or QTL8 as described herein.

In one aspect, the present invention provides a method for identifying and/or selecting a *Capsicum annuum* plant or plant part comprising determining in said plant or plant part the presence or absence of one or more markers according to the present invention.

In one aspect, the marker used in the method for identifying and/or selecting a *Capsicum annuum* plant or plant part according to the present invention is a SNP marker linked to one or more QTLs conferring an improved resistance to *Frankliniella occidentalis* selected from the group consisting of: SNP_01 comprising a Thymine at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1 on chromosome 7; SNP_01 comprising a Thymine at nucleotide 51 of SEQ ID NO: 1 or at nucleotide 51 of a sequence comprising at least 95% (preferably at least 96%, at least 97%, at least 98% and most preferably at least 99%) sequence identity to SEQ ID NO: 1 on chromosome 7; SNP_02 comprising a Thymine at nucleotide 51 of SEQ ID NO: 3 or at nucleotide 51 of a sequence comprising at least 95% (preferably at least 96%, at least 97%, at least 98% and most preferably at least 99%) sequence identity to SEQ ID NO: 3 on chromosome 7; SNP_03 comprising an Adenine at nucleotide 51 of SEQ ID NO: 5 or at nucleotide 51 of a sequence comprising at least 95% (preferably at least 96%, at least 97%, at least 98% and most preferably at least 99%) sequence identity to SEQ ID NO: 5 on chromosome 7; SNP_04 comprising a Cytosine at nucleotide 51 of SEQ ID NO: 7 or at nucleotide 51 of a sequence comprising at least 95% (preferably at least 96%, at least 97%, at least 98% and most preferably at least 99%) sequence identity to SEQ ID NO: 7 on chromosome 7; SNP_05 comprising an Adenine at nucleotide 51 of SEQ ID NO: 9 or at nucleotide 51 of a sequence comprising at least 95% (preferably at least 96%, at least 97%, at least 98% and most preferably at least 99%) sequence identity to SEQ ID NO: 9 on chromosome 7; SNP_06 comprising an Adenine at nucleotide 51 of SEQ ID NO: 11 or at nucleotide 51 of a sequence comprising at least 95% (preferably at least 96%, at least 97%, at least 98% and most preferably at least 99%) sequence identity to SEQ ID NO: 11 on chromosome 7; SNP_07 comprising a Guanine at nucleotide 51 of SEQ ID NO: 13 or at nucleotide 51 of a sequence comprising at least 95% (preferably at least 96%, at least 97%, at least 98% and most preferably at least 99%) sequence identity to SEQ ID NO: 13 on chromosome 7; SNP_08 comprising a Guanine at nucleotide 51 of SEQ ID NO: 15 or at nucleotide 51 of a sequence comprising at least 95% (preferably at least 96%, at least 97%, at least 98% and most preferably at least 99%) sequence identity to SEQ ID NO: 15 on chromosome 7; SNP_09 comprising a Cytosine at nucleotide 51 of SEQ ID NO: 17 or at nucleotide 51 of a sequence comprising at least 95% (preferably at least 96%, at least 97%, at least 98% and most preferably at least 99%) sequence identity to SEQ ID NO: 17 on chromosome 7; SNP_10 comprising a Guanine at nucleotide 51 of SEQ ID NO: 19 or at nucleotide 51 of a sequence comprising at least 95% (preferably at least 96%, at least 97%, at least 98% and most preferably at least 99%) sequence identity to SEQ ID NO: 19 on chromosome 7; SNP_11 comprising a Guanine at nucleotide 51 of SEQ ID NO: 21 or at nucleotide 51 of a sequence comprising at least 95% (preferably at least 96%, at least 97%, at least 98% and most preferably at least 99%) sequence identity to SEQ ID NO: 21 on chromosome 7; SNP_12 comprising a Thymine at nucleotide 51 of SEQ ID NO: 23 or at nucleotide 51 of a sequence comprising at least 95% (preferably at least 96%, at least 97%, at least 98% and most preferably at least 99%) sequence identity to SEQ ID NO: 23 on chromosome 7; SNP_13 comprising an Adenine at nucleotide 51 of SEQ ID NO: 25 or at nucleotide 51 of a sequence comprising at least 95% (preferably at least 96%, at least 97%, at least 98% and most preferably at least 99%) sequence identity to SEQ ID NO: 25 on chromosome 7; SNP_14 comprising a Thymine at nucleotide 51 of SEQ ID NO: 27 or at nucleotide 51 of a sequence comprising at least 95% (preferably at least 96%, at least 97%, at least 98% and most preferably at least 99%) sequence identity to SEQ ID NO: 27 on chromosome 7; SNP_15 comprising a Thymine at nucleotide 51 of SEQ ID NO: 29 or at nucleotide 51 of a sequence comprising at least 95% (preferably at least 96%, at least 97%, at least 98% and most preferably at least 99%) sequence identity to SEQ ID NO: 29 on chromosome 7; SNP_16 comprising a Guanine at nucleotide 51 of SEQ ID NO: 31 or at nucleotide 51 of a sequence comprising at least 95% (preferably at least 96%, at least 97%, at least 98% and most preferably at least 99%) sequence identity to SEQ ID NO: 31 on chromosome 7; SNP_17 comprising a Thymine at nucleotide 51 of SEQ ID NO: 33 or at nucleotide 51 of a sequence comprising at least 95% (preferably at least 96%, at least 97%, at least 98% and most preferably at least 99%) sequence identity to SEQ ID NO: 33 on chromosome 7; SNP_18 comprising a Thymine at nucleotide 51 of SEQ ID NO: 35 or at nucleotide 51 of a sequence comprising at least 95% (preferably at least 96%, at least 97%, at least 98% and most preferably at least 99%) sequence identity to SEQ ID NO: 35 on chromosome 7; SNP_19 comprising an Adenine at nucleotide 51 of SEQ ID NO: 37 or at nucleotide 51 of a sequence comprising at least 95% (preferably at least 96%, at least 97%, at least 98% and most preferably at least 99%) sequence identity to SEQ ID NO: 37 on chromosome 7; SNP_20 comprising a Guanine at nucleotide 51 of SEQ ID NO: 39 or at nucleotide 51 of a sequence comprising at least 95% (preferably at least 96%, at least 97%, at least 98% and most preferably at least 99%) sequence identity to SEQ ID NO: 39 on chromosome 7; SNP_21 comprising an Adenine at nucleotide 51 of SEQ ID NO: 41 or at nucleotide 51 of a sequence comprising at least 95% (preferably at least 96%, at least 97%, at least 98% and most preferably at least 99%) sequence identity to SEQ ID NO: 41 on chromosome 8; SNP_22 comprising a Thymine at nucleotide 51 of SEQ ID NO: 43 or at nucleotide 51 of a sequence comprising at least 95% (preferably at least 96%, at least 97%, at least 98% and most preferably at least 99%) sequence identity to SEQ ID NO: 43 on chromosome 8; SNP_23 comprising a Guanine at nucleotide 51 of SEQ ID NO: 45 or at nucleotide 51 of a sequence comprising at least 95% (preferably at least 96%, at least 97%, at least 98% and most preferably at least 99%) sequence identity to SEQ ID NO: 45 on chromosome 8; SNP_24 comprising a Guanine at nucleotide 51 of SEQ ID NO: 47 or at nucleotide 51 of a sequence comprising at least 95% (preferably at least 96%, at least 97%, at least 98% and most preferably at least 99%) sequence identity to SEQ ID NO: 47 on chromosome 8; SNP_25 comprising a Guanine at nucleotide 51 of SEQ ID NO: 49 or at nucleotide 51 of a sequence comprising at least 95% (preferably at least 96%, at least 97%, at least 98% and most preferably at least 99%) sequence identity to SEQ ID NO: 49 on chromosome 8; SNP_26 comprising a Adenine at nucleotide 51 of SEQ ID NO: 51 or at nucleotide 51 of a sequence comprising at least 95% (preferably at least 96%, at least 97%, at least 98% and most preferably at least 99%) sequence identity to SEQ ID NO: 51 on chromosome 8; SNP_27 comprising a Thymine at nucleotide 51 of SEQ ID NO: 53 or at nucleotide 51 of a sequence comprising at least 95% (preferably at least 96%, at least 97%, at least 98% and most preferably at least 99%) sequence identity to SEQ ID NO: 53 on chromosome 8; SNP_28 comprising an Adenine at nucleotide 51 of SEQ ID NO: 55 or at nucleotide 51 of a sequence comprising at least 95% (preferably at least 96%, at least 97%, at least 98% and most preferably at least 99%) sequence identity to SEQ ID NO: 55 on chromosome 8; SNP_29 comprising a Thymine at nucleotide 51 of SEQ ID NO: 57 or at nucleotide 51 of a sequence comprising at least 95% (preferably at least 96%, at least 97%, at least 98% and most preferably at least 99%) sequence identity to SEQ ID NO: 57 on chromosome 8; SNP_30 comprising a Guanine at nucleotide 51 of SEQ ID NO: 59 or at nucleotide 51 of a sequence comprising at least 95% (preferably at least 96%, at least 97%, at least 98% and most preferably at least 99%) sequence identity to SEQ ID NO: 59 on chromosome 8; SNP_31 comprising a Cytosine at nucleotide 51 of SEQ ID NO: 61 or at nucleotide 51 of a sequence comprising at least 95% (preferably at least 96%, at least 97%, at least 98% and most preferably at least 99%) sequence identity to SEQ ID NO: 61 on chromosome 8; SNP_32 comprising a Guanine at nucleotide 51 of SEQ ID NO: 63 or at nucleotide 51 of a sequence comprising at least 95% (preferably at least 96%, at least 97%, at least 98% and most preferably at least 99%) sequence identity to SEQ ID NO: 63 on chromosome 8; SNP_33 comprising an Adenine at nucleotide 51 of SEQ ID NO: 65 or at nucleotide 51 of a sequence comprising at least 95% (preferably at least 96%, at least 97%, at least 98% and most preferably at least 99%) sequence identity to SEQ ID NO: 65 on chromosome 8; SNP_34 comprising a Thymine at nucleotide 51 of SEQ ID NO: 67 or at nucleotide 51 of a sequence comprising at least 95% (preferably at least 96%, at least 97%, at least 98% and most preferably at least 99%) sequence identity to SEQ ID NO: 67 on chromosome 8; SNP_35 comprising a Guanine at nucleotide 51 of SEQ ID NO: 69 or at nucleotide 51 of a sequence comprising at least 95% (preferably at least 96%, at least 97%, at least 98% and most preferably at least 99%) sequence identity to SEQ ID NO: 69 on chromosome 8; SNP_36 comprising a Cytosine at nucleotide 51 of SEQ ID NO: 71 or at nucleotide 51 of a sequence comprising at least 95% (preferably at least 96%, at least 97%, at least 98% and most preferably at least 99%) sequence identity to SEQ ID NO: 71 on chromosome 8; SNP_37 comprising a Thymine at nucleotide 51 of SEQ ID NO: 73 or at nucleotide 51 of a sequence comprising at least 95% (preferably at least 96%, at least 97%, at least 98% and most preferably at least 99%) sequence identity to SEQ ID NO: 73 on chromosome 8; SNP_38 comprising an Adenine at nucleotide 51 of SEQ ID NO: 75 or at nucleotide 51 of a sequence comprising at least 95% (preferably at least 96%, at least 97%, at least 98% and most preferably at least 99%) sequence identity to SEQ ID NO: 75 on chromosome 8; SNP_39 comprising a Cytosine at nucleotide 51 of SEQ ID NO: 77 or at nucleotide 51 of a sequence comprising at least 95% (preferably at least 96%, at least 97%, at least 98% and most preferably at least 99%) sequence identity to SEQ ID NO: 77 on chromosome 8; and SNP_40 comprising an Adenine at nucleotide 51 of SEQ ID NO: 79 or at nucleotide 51 of a sequence comprising at least 95% (preferably at least 96%, at least 97%, at least 98% and most preferably at least 99%) sequence identity to SEQ ID NO: 79 on chromosome 8.

In one aspect, the method for identifying and/or selecting a *Capsicum annuum* plant or plant part according to the present invention comprises determining in said plant or plant part the presence or absence of at least one marker linked to an improved resistance to *Frankliniella occidentalis* conferring QTL located on chromosome 7 and/or at least one marker linked to an improved resistance to *Frankliniella occidentalis* conferring QTL on chromosome 8.

In one aspect, the present invention provides a method for identifying and/or selecting a *Capsicum annuum* plant or plant part, wherein the marker on chromosome 7 is SNP_02 comprising an Thymine at nucleotide 51 of SEQ ID NO: 3 or at nucleotide 51 of a sequence comprising at least 95% (preferably at least 96%, at least 97%, at least 98% and most preferably at least 99%) sequence identity to SEQ ID NO: 3; and the marker on chromosome 8 is SNP_37 comprising a Thymine at nucleotide 51 of SEQ ID NO: 73 or at nucleotide 51 of a sequence comprising at least 95% (preferably at least 96%, at least 97%, at least 98% and most preferably at least 99%) sequence identity to SEQ ID NO: 73.

In one aspect, the present invention provides an isolated nucleic acid comprising the nucleotide sequence selected from the group consisting of: SEQ ID NO: 1 or a fragment thereof consisting of at least 15 nucleotides comprising nucleotide 51 of SEQ ID NO: 1; SEQ ID NO: 3 or a fragment thereof consisting of at least 15 nucleotides comprising nucleotide 51 of SEQ ID NO: 3; SEQ ID NO: 5 or a fragment thereof consisting of at least 15 nucleotides comprising nucleotide 51 of SEQ ID NO: 5; SEQ ID NO: 7 or a fragment thereof consisting of at least 15 nucleotides comprising nucleotide 51 of SEQ ID NO: 7; SEQ ID NO: 9 or a fragment thereof consisting of at least 15 nucleotides comprising nucleotide 51 of SEQ ID NO: 9; SEQ ID NO: 11 or a fragment thereof consisting of at least 15 nucleotides comprising nucleotide 51 of SEQ ID NO: 11; SEQ ID NO: 13 or a fragment thereof consisting of at least 15 nucleotides comprising nucleotide 51 of SEQ ID NO: 13; SEQ ID NO: 15 or a fragment thereof consisting of at least 15 nucleotides comprising nucleotide 51 of SEQ ID NO: 15; SEQ ID NO: 17 or a fragment thereof consisting of at least 15 nucleotides comprising nucleotide 51 of SEQ ID NO: 17; SEQ ID NO: 19 or a fragment thereof consisting of at least 15 nucleotides comprising nucleotide 51 of SEQ ID NO: 19; SEQ ID NO: 21 or a fragment thereof consisting of at least 15 nucleotides comprising nucleotide 51 of SEQ ID NO: 21; SEQ ID NO: 23 or a fragment thereof consisting of at least 15 nucleotides comprising nucleotide 51 of SEQ ID NO: 23; SEQ ID NO: 25 or a fragment thereof consisting of at least 15 nucleotides comprising nucleotide 51 of SEQ ID NO: 25; SEQ ID NO: 27 or a fragment thereof consisting of at least 15 nucleotides comprising nucleotide 51 of SEQ ID NO: 27; SEQ ID NO: 29 or a fragment thereof consisting of at least 15 nucleotides comprising nucleotide 51 of SEQ ID NO: 29; SEQ ID NO: 31 or a fragment thereof consisting of at least 15 nucleotides comprising nucleotide 51 of SEQ ID NO: 31; SEQ ID NO: 33 or a fragment thereof consisting of at least 15 nucleotides comprising nucleotide 51 of SEQ ID NO: 33; SEQ ID NO: 35 or a fragment thereof consisting of at least 15 nucleotides comprising nucleotide 51 of SEQ ID NO: 35; SEQ ID NO: 37 or a fragment thereof consisting of at least 15 nucleotides comprising nucleotide 51 of SEQ ID NO: 37; SEQ ID NO: 39 or a fragment thereof consisting of at least 15 nucleotides comprising nucleotide 51 of SEQ ID NO: 39; SEQ ID NO: 41 or a fragment thereof consisting of at least 15 nucleotides comprising nucleotide 51 of SEQ ID NO: 41; SEQ ID NO: 43 or a fragment thereof consisting of at least 15 nucleotides comprising nucleotide 51 of SEQ ID NO: 43; SEQ ID NO: 45 or a fragment thereof consisting of at least 15 nucleotides comprising nucleotide 51 of SEQ ID NO: 45; SEQ ID NO: 47 or a fragment thereof consisting of at least 15 nucleotides comprising nucleotide 51 of SEQ ID NO: 47; SEQ ID NO: 49 or a fragment thereof consisting of at least 15 nucleotides comprising nucleotide 51 of SEQ ID NO: 49; SEQ ID NO: 51 or a fragment thereof consisting of at least 15 nucleotides comprising nucleotide 51 of SEQ ID NO: 51; SEQ ID NO: 53 or a fragment thereof consisting of at least 15 nucleotides comprising nucleotide 51 of SEQ ID NO: 53; SEQ ID NO: 55 or a fragment thereof consisting of at least 15 nucleotides comprising nucleotide 51 of SEQ ID NO: 55; SEQ ID NO: 57 or a fragment thereof consisting of at least 15 nucleotides comprising nucleotide 51 of SEQ ID NO: 57; SEQ ID NO: 59 or a fragment thereof consisting of at least 15 nucleotides comprising nucleotide 51 of SEQ ID NO: 59; SEQ ID NO: 61 or a fragment thereof consisting of at least 15 nucleotides comprising nucleotide 51 of SEQ ID NO: 61; SEQ ID NO: 63 or a fragment thereof consisting of at least 15 nucleotides comprising nucleotide 51 of SEQ ID NO: 63; SEQ ID NO: 65 or a fragment thereof consisting of at least 15 nucleotides comprising nucleotide 51 of SEQ ID NO: 65; SEQ ID NO: 67 or a fragment thereof consisting of at least 15 nucleotides comprising nucleotide 51 of SEQ ID NO: 67; SEQ ID NO: 69 or a fragment thereof consisting of at least 15 nucleotides comprising nucleotide 51 of SEQ ID NO: 69; SEQ ID NO: 71 or a fragment thereof consisting of at least 15 nucleotides comprising nucleotide 51 of SEQ ID NO: 71; SEQ ID NO: 73 or a fragment thereof consisting of at least 15 nucleotides comprising nucleotide 51 of SEQ ID NO: 73; SEQ ID NO: 75 or a fragment thereof consisting of at least 15 nucleotides comprising nucleotide 51 of SEQ ID NO: 75; SEQ ID NO: 77 or a fragment thereof consisting of at least 15 nucleotides comprising nucleotide 51 of SEQ ID NO: 77; and SEQ ID NO: 79 or a fragment thereof consisting of at least 15 nucleotides comprising nucleotide 51 of SEQ ID NO: 79; or comprising the complementary nucleotide sequence thereof.

In one aspect, the present invention provides the use of one or more of the nucleotide sequences selected from the group consisting of SEQ ID NOs: 1-80 or a fragment thereof for marker assisted selection of a *Capsicum annuum* plant or plant part, wherein said fragment consists of at least 15 nucleotides comprising nucleotide 51 of said nucleotide sequences selected from the group consisting of SEQ ID NOs: 1-80 or a complementary sequence of said one or more of the nucleotide sequences.

In one aspect, the present invention provides the use of one or more of the nucleotide sequences selected from the group consisting of SEQ ID NOs: 1-80 or a fragment thereof for developing a marker suitable for marker assisted selection of a *Capsicum annuum* plant or plant part comprising QTL7 and/or QTL8 as described herein, wherein said fragment consists of at least 15 nucleotides comprising nucleotide 51 of said nucleotide sequences selected from the group consisting of SEQ ID NOs: 1-80 or a complementary sequence of said one or more of the nucleotide sequences.

In one aspect, the present invention provides a method for enhancing the *Frankliniella occidentalis* resistance phenotype of a *Capsicum annuum* plant, said method comprising introgressing QTL7 and/or QTL8 as described herein into said *Capsicum annuum* plant.

In one aspect, the present invention provides the use of QTL7 and/or QTL8 as described herein for enhancing the *Frankliniella occidentalis* resistance phenotype in a *Capsicum annuum* plant.

Other embodiments of the invention relate to the following embodiments, which are not to be seen in isolation but can be combined with any of the other embodiments described herein. Preferably, the herein-below described cell or cells is a non-regenerable cell as defined herein above. Alternatively, the herein-below described cell or cells is a non-propagating cell. As used herein, the term "non-propagating plant cell" is a plant cell which is unable to maintain its life by synthesizing carbohydrate and protein from the inorganic substance, such as water, carbon dioxide and mineral salt and so on through photosynthesis.

In one embodiment the present invention provides a cell of a *Capsicum annuum* plant comprising an introgression fragment on chromosome 7 comprising Quantitative Trait Locus QTL7 and/or comprising an introgression fragment on chromosome 8 comprising Quantitative Trait Locus QTL8, wherein said QTL7 and QTL8 confer an improved resistance to *Frankliniella occidentalis*, wherein
QTL7 is located on chromosome 7 between SNP_01 located at nucleotide 51 of SEQ ID NO: 1 or at nucleotide 51 of a sequence comprising at least 95% sequence identity to SEQ ID NO: 1 and SNP_20 located at nucleotide 51 of SEQ ID NO: 39 or at nucleotide 51 of a sequence comprising at least 95% sequence identity to SEQ ID NO: 39; and
QTL8 is located on chromosome 8 between SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79, and
wherein the cell is of a non-pungent *Capsicum annuum* plant when QTL7 and/or QTL8 are present in heterozygous form and QTL7 or QTL8 are not present in homozygous form.

The cell of a *Capsicum annuum* plant according to the present invention accordingly is a cell of a "non-pungent *Capsicum annuum* plant" as further defined herein when: QTL7 and/or QTL8 are present in heterozygous form; and QTL7 or QTL8 are not present in homozygous form.

Accordingly, the cell of a *Capsicum annuum* plant according to the present invention is of a non-pungent *Capsicum annuum* plant when: QTL7 is present in heterozygous form and QTL8 is not present; QTL7 is present in heterozygous form and QTL8 is present in heterozygous form; and QTL7 is not present and QTL8 is present in heterozygous form. The cell of a *Capsicum annuum* plant according to the present invention may be of a pungent *Capsicum annuum* plant or of a non-pungent *Capsicum annuum* plant when: QTL 7 is present in homozygous form and QTL8 is present in heterozygous form; QTL 7 is present in homozygous form and QTL8 is not present; QTL 7 is not present and QTL8 is present in homozygous form; QTL 7 is present in heterozygous form and QTL8 is present in homozygous form; and QTL7 is present in homozygous form and QTL8 is present in homozygous form. In one aspect, the cell of a *Capsicum annuum* plant according to the present invention is of a non-pungent *Capsicum annuum* plant as further defined herein.

The cell of the preceding embodiment, wherein QTL7 and QTL8 are as present in, or as obtainable from, or as obtained from, or as comprised in the genome of a *Capsicum annuum* plant designated H19_020279-044 of which a representative number of seeds have been deposited under deposit number NCIMB 43623.

The cell of the preceding embodiments, wherein the introgression fragment comprising QTL7 comprises a haplotype of at least one marker selected from:
SNP_01 comprising a Thymine located at nucleotide 51 of SEQ ID NO: 1 or at nucleotide 51 of a sequence comprising at least 95% sequence identity to SEQ ID NO: 1;
SNP_02 comprising a Thymine located at nucleotide 51 of SEQ ID NO: 3 or at nucleotide 51 of a sequence comprising at least 95% sequence identity to SEQ ID NO: 3;
SNP_03 comprising an Adenine located at nucleotide 51 of SEQ ID NO: 5 or at nucleotide 51 of a sequence comprising at least 95% sequence identity to SEQ ID NO: 5;
SNP_04 comprising a Cytosine located at nucleotide 51 of SEQ ID NO: 7 or at nucleotide 51 of a sequence comprising at least 95% sequence identity to SEQ ID NO: 7;
SNP_05 comprising an Adenine located at nucleotide 51 of SEQ ID NO: 9 or at nucleotide 51 of a sequence comprising at least 95% sequence identity to SEQ ID NO: 9;
SNP_06 comprising an Adenine located at nucleotide 51 of SEQ ID NO: 11 or at nucleotide 51 of a sequence comprising at least 95% sequence identity to SEQ ID NO: 11;
SNP_07 comprising a Guanine located at nucleotide 51 of SEQ ID NO: 13 or at nucleotide 51 of a sequence comprising at least 95% sequence identity to SEQ ID NO: 13;
SNP_08 comprising a Guanine located at nucleotide 51 of SEQ ID NO: 15 or at nucleotide 51 of a sequence comprising at least 95% sequence identity to SEQ ID NO: 15;
SNP_09 comprising a Cytosine located at nucleotide 51 of SEQ ID NO: 17 or at nucleotide 51 of a sequence comprising at least 95% sequence identity to SEQ ID NO: 17;
SNP_10 comprising a Guanine located at nucleotide 51 of SEQ ID NO: 19 or at nucleotide 51 of a sequence comprising at least 95% sequence identity to SEQ ID NO: 19;
SNP_11 comprising a Guanine located at nucleotide 51 of SEQ ID NO: 21 or at nucleotide 51 of a sequence comprising at least 95% sequence identity to SEQ ID NO: 21;
SNP_12 comprising a Thymine located at nucleotide 51 of SEQ ID NO: 23 or at nucleotide 51 of a sequence comprising at least 95% sequence identity to SEQ ID NO: 23;

SNP_13 comprising an Adenine located at nucleotide 51 of SEQ ID NO: 25 or at nucleotide 51 of a sequence comprising at least 95% sequence identity to SEQ ID NO: 25;
SNP_14 comprising a Thymine located at nucleotide 51 of SEQ ID NO: 27 or at nucleotide 51 of a sequence comprising at least 95% sequence identity to SEQ ID NO: 27;
SNP_15 comprising a Thymine located at nucleotide 51 of SEQ ID NO: 29 or at nucleotide 51 of a sequence comprising at least 95% sequence identity to SEQ ID NO: 29;
SNP_16 comprising a Guanine located at nucleotide 51 of SEQ ID NO: 31 or at nucleotide 51 of a sequence comprising at least 95% sequence identity to SEQ ID NO: 31;
SNP_17 comprising a Thymine located at nucleotide 51 of SEQ ID NO: 33 or at nucleotide 51 of a sequence comprising at least 95% sequence identity to SEQ ID NO: 33;
SNP_18 comprising a Thymine located at nucleotide 51 of SEQ ID NO: 35 or at nucleotide 51 of a sequence comprising at least 95% sequence identity to SEQ ID NO: 35;
SNP_19 comprising an Adenine located at nucleotide 51 of SEQ ID NO: 37 or at nucleotide 51 of a sequence comprising at least 95% sequence identity to SEQ ID NO: 37; and
SNP_20 comprising a Guanine located at nucleotide 51 of SEQ ID NO: 39 or at nucleotide 51 of a sequence comprising at least 95% sequence identity to SEQ ID NO: 39; and
wherein the introgression fragment comprising QTL8 comprises a haplotype of at least one marker selected from:
SNP_21 comprising an Adenine located at nucleotide 51 of SEQ ID NO: 41 or at nucleotide 51 of a sequence comprising at least 95% sequence identity to SEQ ID NO: 41;
SNP_22 comprising a Thymine located at nucleotide 51 of SEQ ID NO: 43 or at nucleotide 51 of a sequence comprising at least 95% sequence identity to SEQ ID NO: 43;
SNP_23 comprising a Guanine located at nucleotide 51 of SEQ ID NO: 45 or at nucleotide 51 of a sequence comprising at least 95% sequence identity to SEQ ID NO: 45;
SNP_24 comprising a Guanine located at nucleotide 51 of SEQ ID NO: 47 or at nucleotide 51 of a sequence comprising at least 95% sequence identity to SEQ ID NO: 47;
SNP_25 comprising a Guanine located at nucleotide 51 of SEQ ID NO: 49 or at nucleotide 51 of a sequence comprising at least 95% sequence identity to SEQ ID NO: 49;
SNP_26 comprising a Adenine located at nucleotide 51 of SEQ ID NO: 51 or at nucleotide 51 of a sequence comprising at least 95% sequence identity to SEQ ID NO: 51;
SNP_27 comprising a Thymine located at nucleotide 51 of SEQ ID NO: 53 or at nucleotide 51 of a sequence comprising at least 95% sequence identity to SEQ ID NO: 53;
SNP_28 comprising an Adenine located at nucleotide 51 of SEQ ID NO: 55 or at nucleotide 51 of a sequence comprising at least 95% sequence identity to SEQ ID NO: 55;
SNP_29 comprising a Thymine located at nucleotide 51 of SEQ ID NO: 57 or at nucleotide 51 of a sequence comprising at least 95% sequence identity to SEQ ID NO: 57;
SNP_30 comprising a Guanine located at nucleotide 51 of SEQ ID NO: 59 or at nucleotide 51 of a sequence comprising at least 95% sequence identity to SEQ ID NO: 59;
SNP_31 comprising a Cytosine located at nucleotide 51 of SEQ ID NO: 61 or at nucleotide 51 of a sequence comprising at least 95% sequence identity to SEQ ID NO: 61;
SNP_32 comprising a Guanine located at nucleotide 51 of SEQ ID NO: 63 or at nucleotide 51 of a sequence comprising at least 95% sequence identity to SEQ ID NO: 63;
SNP_33 comprising an Adenine located at nucleotide 51 of SEQ ID NO: 65 or at nucleotide 51 of a sequence comprising at least 95% sequence identity to SEQ ID NO: 65;
SNP_34 comprising a Thymine located at nucleotide 51 of SEQ ID NO: 67 or at nucleotide 51 of a sequence comprising at least 95% sequence identity to SEQ ID NO: 67;
SNP_35 comprising a Guanine located at nucleotide 51 of SEQ ID NO: 69 or at nucleotide 51 of a sequence comprising at least 95% sequence identity to SEQ ID NO: 69;
SNP_36 comprising a Cytosine located at nucleotide 51 of SEQ ID NO: 71 or at nucleotide 51 of a sequence comprising at least 95% sequence identity to SEQ ID NO: 71;
SNP_37 comprising a Thymine located at nucleotide 51 of SEQ ID NO: 73 or at nucleotide 51 of a sequence comprising at least 95% sequence identity to SEQ ID NO: 73;
SNP_38 comprising an Adenine located at nucleotide 51 of SEQ ID NO: 75 or at nucleotide 51 of a sequence comprising at least 95% sequence identity to SEQ ID NO: 75;
SNP_39 comprising a Cytosine located at nucleotide 51 of SEQ ID NO: 77 or at nucleotide 51 of a sequence comprising at least 95% sequence identity to SEQ ID NO: 77; and
SNP_40 comprising an Adenine located at nucleotide 51 of SEQ ID NO: 79 or at nucleotide 51 of a sequence comprising at least 95% sequence identity to SEQ ID NO: 79.

The cell of the preceding embodiments, wherein QTL7 and/or QTL8 are present in homozygous form.

The cell of the preceding embodiments, wherein the cell is of a non-pungent *Capsicum annuum* plant.

The cell of the preceding embodiments, wherein the cell is of an inbred plant, a dihaploid plant or a hybrid plant.

Seed Deposits

A representative sample of seeds of a *Capsicum annuum* line comprising comprising an introgression fragment on chromosome 7 comprising Quantitative Trait Locus QTL7 and comprising an introgression fragment on chromosome 8 comprising Quantitative Trait Locus QTL8 were deposited by Nunhems B.V. on 1 Jun. 2020 at the NCIMB Ltd. (Ferguson Building, Craibstone Estate, Bucksburn Aberdeen, Scotland AB21 9YA, UK) according to the Budapest Treaty, under the Expert Solution (EPC 2000, Rule 32(1)). Seeds were given the following deposit number: NCIMB 43623 (*Capsicum annuum* H19_020279-044).

The Applicant requests that samples of the biological material and any material derived therefrom be only released to a designated Expert in accordance with Rule 32(1) EPC or related legislation of countries or treaties having similar rules and regulation, until the mention of the grant of the patent, or for 20 years from the date of filing if the application is refused, withdrawn or deemed to be withdrawn.

Access to the deposit will be available during the pendency of this application to persons determined by the Director of the U.S. Patent Office to be entitled thereto upon request. Subject to 37 C.F.R. § 1.808(b), all restrictions imposed by the depositor on the availability to the public of the deposited material will be irrevocably removed upon the granting of the patent. The deposit will be maintained for a period of 30 years, or 5 years after the most recent request, or for the enforceable life of the patent whichever is longer and will be replaced if it ever becomes nonviable during that period. Applicant does not waive any rights granted under this patent on this application or under the Plant Variety Protection Act (7 USC 2321 et seq.).

The following non-limiting Examples describe how one can obtain plants according to the invention, comprising QTL7 and/or QTL8. Unless stated otherwise in the Examples, all recombinant DNA techniques are carried out according to standard protocols as described in Sambrook et al. (1989) Molecular Cloning: A Laboratory Manual, Second Edition, Cold Spring Harbor Laboratory Press, and Sambrook and Russell (2001) Molecular Cloning: A Laboratory Manual, Third Edition, Cold Spring Harbor Laboratory Press, NY; and in Volumes 1 and 2 of Ausubel et al. (1994) Current Protocols in Molecular Biology, Current Protocols, USA. Standard materials and methods for plant molecular work are described in Plant Molecular Biology Labfax (1993) by R. D. D. Croy, jointly published by BIOS Scientific Publications Ltd (UK) and Blackwell Scientific Publications, UK. Standard breeding methods are described in 'Principles of Plant breeding', Second Edition, Robert W. Allard (ISBN 0-471-02309-4).

EXAMPLES

Example 1

Thrips Resistance Test

The pepper resistance screening with *F. occidentalis* is performed with adult plants transplanted in plastic tunnels and managed in a standard way, with particular attention to chemical treatments, which were reduced to a minimum level. In particular, the use of insecticides and biological control was applied only if really necessary, while selecting methods having minimal impact on thrips. Specific care was taken to avoid the presence of any other insect into the greenhouse as well as to conduct the limit the temperature during screening to a maximum of 40° C.

Once plants start to flower, a specific number of *F. occidentalis* were released into the greenhouse, wherein the same number of insects are released for each of the susceptible plants (excluding the plants in susceptible plots). The release was repeated several times, until the plants looked colonized. The plant is considered as colonized when at least 3-4 insects are visible into the flowers.

In *F. occidentalis* screening, the evaluation phase starts when the first silvering symptoms appear, which was typically about one month after the first release. The evaluation was done by assessing the whole plant for plant damage caused by thrips. Two evaluations were performed, one at 56 DAT and one at 70 DAT.

For each genotype, at least 3 repetitions were performed. Each plot included 3 plants, wherein each plot is one repetition. One susceptible plant was included for every 6 tested plants. All the repetitions were completely randomized. Susceptible and resistant random plots were present for a total of 5% of the total number of plants. All susceptible plants accounted for 20% of the total plants. In case of F2 population, all the plants were planted in the same block of the greenhouse to avoid as much as possible position effects. All the results were statistically analysed in order to minimize the site effect and to emphasize the genetic differences between genotypes.

Scoring of the individual plants was realized using a scale from 1-9, where 1 stands for highly susceptible with full leaves damage and 9 stands for Highly resistant with no leaves damage.

TABLE 1

*Frankliniella occidentalis* resistance classification

| Resistance level | Description |
| --- | --- |
| 1 | Highly susceptible with full leaves damage |
| 2 | Silvering throughout the plant and, in the most affected parts, very heavy silvering (over 50% leaf surface) and/or defoliation |
| 3 | Silvering throughout the plant and heavy silvering (about 30% leaf surface) in the most affected leaves |
| 4 | Medium size silvering spots (2 mm in diameter) regularly distributed over the entire leaf (near the mid vein, edge, leaf surface) on the entire plant |
| 5 | Medium size silvering spots (2 mm in diameter) regularly distributed over the entire leaf (near the mid vein, edge, leaf surface) on some sections of the plant |
| 6 | Small silvering spots (<2 mm in diameter) regularly distributed over the entire leaf (near the mid vein, edge, leaf surface) in some sections of the plant |
| 7 | Small silvering spots near the mid vein or edge of the leaf in some sections of the plant |
| 8 | Tiny and scatter silvering spots on some leaves in the plant |
| 9 | Highly resistant with no leaves damage |

Example 2

Breeding of *Frankliniella occidentalis* Resistant Plants

Screening activities led to the identification of a pungent *C. annuum* pepper hybrid named herein as SOURCE01. The inventors were able to derive lines from SOURCE01 having a remarkable tolerance to western flower thrips (*F. occidentalis*). One F3 line named SOURCE03 and which was derived from SOURCE01, was then crossed with the proprietary line 82709-0, derived from a *C. annuum* "tepin" type line coming from an internal breeding program which is susceptible to *F. occidentalis*.

The generative cross named TPS50021 deriving from the breeding cross between the proprietary line 82709-0 and SOURCE03 was developed. TPS50021, together with several other derived inbred lines, represented the breeding starts for the thrips breeding project started in the sweet pepper program. The sweet pepper thrips program was leaded through conventional forward breeding supported by the thrips resistance in vivo choice screening. The 82709-0 and TPS50021 lines were evaluated in a in vivo thrips trials in four subsequent years, while SOURCE01 hybrid was evaluated in two subsequent years showing high tolerance to thrips damage. In the in vivo thrips trials, following the phytopathology protocol comprised of statistical correction, the plants were scored on the basis of their leaf silvering damages with values ranging from 1 (highly susceptible with full leaves damage) to 9 (highly resistant with no leaves damage) see Table 1.

Several introgressed lines obtained by crossing TPS500021, or its derived inbred lines, with breeding lines from different *C. annuum* hot/sweet breeding segments (Demre, Charliston, Waxy, Kapia, Anaheim, Jalapeno, Blocky Bell, Lamuyo, Dulce Italiano) were generated and some of them were evaluated in two subsequent years in in vivo thrips trials showing high level of tolerance. The non-pungent line named *Capsicum annuum* H19_020279-044, of which representative seeds have been deposited in the context of this invention under deposit number NCIMB 43623, were obtained from a cross between a TPS500021 derived inbred line with a proprietary non-pungent inbred line.

Example 3

QTL Mapping and SNP Marker Development

Molecular markers linked to thrips resistance were developed by linkage mapping (Doerge, 2002; Koornneef et al., 2004). Briefly, genome wide polymorphic SNP markers between the resistance and the susceptible parents were selected and screened on a F2 population of 600 individuals obtained by selfing an F1 plant from a cross between resistant and the susceptible parents.

Marker-trait associations were identified using interval mapping implemented in Rqtl (Doerge, 2002). First a Genome Wide Mapping (GW) was performed using a marker density of approximately 1 marker every 15 cM. Once QTLs were identified a second round of mapping or saturation mapping was performed by adding further SNP markers within the QTL intervals identified by GW mapping. Linkage mapping identified two regions associated with thrips resistance consistently over several evaluations on different seasons, one on ch7 and one on ch8 explaining 15% and 30% of the phenotypic variance respectively.

Two rounds of fine mapping were performed by evaluating 768 F3 and 185 F4 recombinants within the region on Ch7 and Ch8. Peak markers and flanking markers are summarized in Table 2. The flanking markers indicate 2 lod score drop, which represent 95% confidence interval for the location of a QTL.

TABLE 2

Names of peak and flanking markers for QTL7 and QTL8

| QTL | Flanking | Peak | Flanking |
|---|---|---|---|
| QTL7 | SNP_1 (SEQ ID NO: 1) | SNP_02 (SEQ ID NO: 3) | SNP_20 (SEQ ID NO: 39) |
| QTL8 | SNP_21 (SEQ ID NO: 41) | SNP_37 (SEQ ID NO: 73) | SNP_40 (SEQ ID NO: 79) |

Resistant and susceptible haplotypes at the QTL regions are also indicated in FIG. 1.

Based on the flanking and the peak markers it is possible to categorize plants as susceptible (A) and resistant (B). In FIG. 1, indicates the effect of the allelic state on the QTL on chromosome 7 and the QTL on chromosome 8. Plants displaying an allelic state of H are recombinants in the QTL region.

TABLE 3

SNP markers identified for QTL7

| SEQ ID NO | SNP | phenotype | SNP call | Sequence |
|---|---|---|---|---|
| SEQ ID NO: 1 | SNP_01 | resistant | TT | AGGCACGGACGAAGCCAGCCACTATTGTCATTAAGCATATTTCATGAGTTT AATATCTGTTGGATTAAGAAACATACCCATTCAAGTACTGCTCCTTTCTG |
| SEQ ID NO: 2 | SNP_01 | susceptible | CC | AGGCACGGACGAAGCCAGCCACTATTGTCATTAAGCATATTTCATGAGTTC AATATCTGTTGGATTAAGAAACATACCCATTCAAGTACTGCTCCTTTCTG |
| SEQ ID NO: 3 | SNP_02 | resistant | TT | TATGGTTCAGCGTTTAAGATTTGATCAAATTTTAGTGTTGTTTGCATGTAT ATATTGTTCCCTTTTTAAAGATACTAGTTCAATTGAACGCTCATAGATTG |
| SEQ ID NO: 4 | SNP_02 | susceptible | CC | TATGGTTCAGCGTTTAAGATTTGATCAAATTTTAGTGTTGTTTGCATGTAC ATATTGTTCCCTTTTTAAAGATACTAGTTCAATTGAACGCTCATAGATTG |
| SEQ ID NO: 5 | SNP_03 | resistant | AA | GAATAACAAATATATAGAAGTAGGAGACTTATCAATTTTACTCCTTTTTAA TAAAAAAATAAATAAATAAATATTATAGTAACTTCATTAATGATACTGAT |
| SEQ ID NO: 6 | SNP_03 | susceptible | GG | GAATAACAAATATATAGAAGTAGGAGACTTATCAATTTTACTCCTTTTTAG TAAAAAAATAAATAAATAAATATTATAGTAACTTCATTAATGATACTGAT |
| SEQ ID NO: 7 | SNP_04 | resistant | CC | GTTACTCCCGCCGTTTGCTTTTACTTGTCACTAATTTCCTAATTGTATTTC TATTTTTACTTATCATTTTTGACATATCAAGAAAAGACAACTTCTTTTTT |
| SEQ ID NO: 8 | SNP_04 | susceptible | TT | GTTACTCCCGCCGTTTGCTTTTACTTGTCACTAATTTCCTAATTGTATTTT TATTTTTACTTATCATTTTTGACATATCAAGAAAAGACAACTTCTTTTTT |
| SEQ ID NO: 9 | SNP_05 | resistant | AA | TATAAGAAGTGTCCTGTTACTGTCCTTCATCAGGTCATATGTGTTGATCTA ATTGAGATAGATATAGTTGATTTGATGTCATTCTGGGTATAGATTGGTT |
| SEQ ID NO: 10 | SNP_05 | susceptible | GG | TATAAGAAGTGTCCTGTTACTGTCCTTCATCAGGTCATATGTGTTGATCTG ATTGAGATAGATATAGTTGATTTGATGTCATTCTGGGTATAGATTGGTT |
| SEQ ID NO: 11 | SNP_06 | resistant | AA | GTTCTGAACATATTATACACATAAATTGAATTATTCTTGCATTGGTCTCTA TCTTCTCAATGAACAAAGAAAGAAGGTATTAAGGGATCATTTGGTAGTAG |
| SEQ ID NO: 12 | SNP_06 | susceptible | GG | GTTCTGAACATATTATACACATAAATTGAATTATTCTTGCATTGGTCTCTG TCTTCTCAATGAACAAAGAAAGAAGGTATTAAGGGATCATTTGGTAGTAG |
| SEQ ID NO: 13 | SNP_07 | resistant | GG | AAAATGGACTGTTCACGCACAAACAATCATGCAAATGGCCAACCACATAAG CATCGTCGATCAACGATCGCAGAATTTGCTGTTATCGGGGTATCATACGC |
| SEQ ID NO: 14 | SNP_07 | susceptible | CC | AAAATGGACTGTTCACGCACAAACAATCATGCAAATGGCCAACCACATAAC CATCGTCGATCAACGATCGCAGAATTTGCTGTTATCGGGGTATCATACGC |
| SEQ ID NO: 15 | SNP_08 | resistant | GG | CAAGTCTAGTAGATCCTTTTGATCCTCAAGTTCAACTGAACTACTACCCAG GTCCTTCAACAATCCACTCTCTTTCATCAGTGTTCGAATTTTCTCTGCAT |
| SEQ ID NO: 16 | SNP_08 | susceptible | AA | CAAGTCTAGTAGATCCTTTTGATCCTCAAGTTCAACTGAACTACTACCCAA GTCCTTCAACAATCCACTCTCTTTCATCAGTGTTCGAATTTTCTCTGCAT |

TABLE 3-continued

SNP markers identified for QTL7

| SEQ ID NO | SNP | phenotype | SNP call | Sequence |
|---|---|---|---|---|
| SEQ ID NO: 17 | SNP_09 | resistant | CC | CATTAACCGAATTACCATAACAAGAATCATCATTCTCATGAAATGAAACAC AAACTTCCAACAATGCTCTATACACATTTTGTGAAATCTTGAAATCTTTT |
| SEQ ID NO: 18 | SNP_09 | susceptible | TT | CATTAACCGAATTACCATAACAAGAATCATCATTCTCATGAAATGAAACAT AAACTTCCAACAATGCTCTATACACATTTTGTGAAATCTTGAAATCTTTT |
| SEQ ID NO: 19 | SNP_10 | resistant | GG | ACGCAAATGAAAGATTTGATGATTTCGAGGTCGGAAATGTGGCCAAGAATG TTGCAGATCATATCTACAAATATTTCCCWCAAGCTGCTTTACTTCTGGTA |
| SEQ ID NO: 20 | SNP_10 | susceptible | AA | ACGCAAATGAAAGATTTGATGATTTCGAGGTCGGAAATGTGGCCAAGAATA TTGCAGATCATATCTACAAATATTTCCCWCAAGCTGCTTTACTTCTGGTA |
| SEQ ID NO: 21 | SNP_11 | resistant | GG | TAGTGTTACCAGGCCTGGAACTATGAATGCTCAAGCACGAACAAAACATCG ACAACGTGTGCYAGATGAATCATCCACATTGGAGCTGTCCTCTACATCTG |
| SEQ ID NO: 22 | SNP_11 | susceptible | AA | TAGTGTTACCAGGCCTGGAACTATGAATGCTCAAGCACGAACAAAACATCA ACAACGTGTGCYAGATGAATCATCCACATTGGAGCTGTCCTCTACATCTG |
| SEQ ID NO: 23 | SNP_12 | resistant | TT | ATAAAATATAAAAGGGTGTAAAATAAAAGAACCCCATAAAGCAAAGAAAAT GAATTTGCCTCAGAATCAACAAGATTTCCAGAAAGTCCAGGGCCACCAGG |
| SEQ ID NO: 24 | SNP_12 | susceptible | GG | ATAAAATATAAAAGGGTGTAAAATAAAAGAACCCCATAAAGCAAAGAAAAG GAATTTGCCTCAGAATCAACAAGATTTCCAGAAAGTCCAGGGCCACCAGG |
| SEQ ID NO: 25 | SNP_13 | resistant | AA | GAGATTGAGGTCTATGTAGATGATGTGATTCAAAGAGTCAGGCTGACCATA TTAAAGATTTAAAAAAGTTCTTTGAAAGGCTTCGCAGGTATAATCTCAAA |
| SEQ ID NO: 26 | SNP_13 | susceptible | GG | GAGATTGAGGTCTATGTAGATGATGTGATTCAAAGAGTCAGGCTGACCATG TTAAAGATTTAAAAAAGTTCTTTGAAAGGCTTCGCAGGTATAATCTCAAA |
| SEQ ID NO: 27 | SNP_14 | resistant | TT | TTATTCAGTTCCTTAGATTTCCCTTGTGTCTTGCAAAACAGAAGCTTAACT AACTCTTCATGTCCATCAAGAATGTGAAGTAGGCTTTCCTCCAAGTACGG |
| SEQ ID NO: 28 | SNP_14 | susceptible | CC | TTATTCAGTTCCTTAGATTTCCCTTGTGTCTTGCAAAACAGAAGCTTAACC AACTCTTCATGTCCATCAAGAATGTGAAGTAGGCTTTCCTCCAAGTACGG |
| SEQ ID NO: 29 | SNP_15 | resistant | AA | TGAAGAGGAGGACCGCAGAGCTGAGCATTGCCACTATAGGATGATCTATCA AAACTCTGGAGTTGAGTGCTTGTTGGAATTCTCCCTGATAAGTGGTTGTT |
| SEQ ID NO: 30 | SNP_15 | susceptible | GG | TGAAGAGGAGGACCGCAGAGCTGAGCATTGCCACTATAGGATGATCTATCG AAACTCTGGAGTTGAGTGCTTGTTGGAATTCTCCCTGATAAGTGGTTGTT |
| SEQ ID NO: 31 | SNP_16 | resistant | GG | GCCGGTGCTGAGATGGACGGCGTCAGCCATGGATGCCGATGGGGGTCGTTG GGTTGGTCGCTGGTGAAGTTTGTTGAGAGAGAGAGTGAGAGTCTAGAGAG |
| SEQ ID NO: 32 | SNP_16 | susceptible | TT | GCCGGTGCTGAGATGGACGCGTCAGCCATGGATGCCGATGGGGGTCGTTT GGTTGGTCGCTGGTGAAGTTTGTTGAGAGAGAGAGTGAGAGTCTAGAGAG |
| SEQ ID NO: 33 | SNP_17 | resistant | TT | AATATGTGGATAGCTTGACATGTGCTATTTCTCAGAGAGCACGGAGTTGTT GGTGATATGAGAGATGCTTGGCCAAACGCTCGTGTGAGGAAAAATGTATC |
| SEQ ID NO: 34 | SNP_17 | susceptible | CC | AATATGTGGATAGCTTGACATGTGCTATTTCTCAGAGAGCACGGAGTTGTC GGTGATATGAGAGATGCTTGGCCAAACGCTCGTGTGAGGAAAAATGTATC |
| SEQ ID NO: 35 | SNP_18 | resistant | TT | GGTCATGTCCTCAGTCAGCTGTAACTGCTCCATGTCACGTTTAATCACTTT CCTCCAGTATTTCTTCGGTCTACCCCTGCCCCGCTTGAAACCGTCCAAGG |
| SEQ ID NO: 36 | SNP_18 | susceptible | CC | GGTCATGTCCTCAGTCAGCTGTAACTGCTCCATGTCACGTTTAATCACTTC CCTCCAGTATTTCTTCGGTCTACCCCTGCCCCGCTTGAAACCGTCCAAGG |
| SEQ ID NO: 37 | SNP_19 | resistant | AA | GAATAATATTATTATTTTTGGTAGAAAGGACATGCATTAATATAAAGAA AACGCAGTTTAAGTTTCAATTTTTGACGATTAGTCAGGGTTCAAAAAGGA |
| SEQ ID NO: 38 | SNP_19 | susceptible | GG | GAATAATATTATTATTTTTGGTAGAAAGGACATGCATTAATATAAAGAG AACGCAGTTTAAGTTTCAATTTTTGACGATTAGTCAGGGTTCAAAAAGGA |
| SEQ ID NO: 39 | SNP_20 | resistant | GG | AGACTGAGTTGGGGAAAGTAAAATCAAGAGGGCTGTTCTGTAAATGAGTCG TCGTTTCCGTTGAACTATCTTGAGGCAAATGGCTGCTAATGAAGGATTGA |
| SEQ ID NO: 40 | SNP_20 | susceptible | AA | AGACTGAGTTGGGGAAAGTAAAATCAAGAGGGCTGTTCTGTAAATGAGTCA TCGTTTCCGTTGAACTATCTTGAGGCAAATGGCTGCTAATGAAGGATTGA |

TABLE 4

SNP markers identified for QTL8

| SEQ ID NO | SNP | phenotype | SNP call | Sequence |
|---|---|---|---|---|
| SEQ ID NO: 41 | SNP_21 | resistant | AA | AAGGGCCGAACTGCAAGGATCTATCATGCACGGTCATACCCTGCATTTCTA<br>CGAGAGACTGTTTCATTTCCTGCATTTCTGCAAGAGATTGTATCCACACC |
| SEQ ID NO: 42 | SNP_21 | susceptible | GG | AAGGGCCGAACTGCAAGGATCTATCATGCACGGTCATACCCTGCATTTCTG<br>CGAGAGACTGTTTCATTTCCTGCATTTCTGCAAGAGATTGTATCCACACC |
| SEQ ID NO: 43 | SNP_22 | resistant | TT | CCCCTGCCTCRTACTAGTAGAGTAATTATACGTACCTCTTTGCTATGATTT<br>CTTTGGAAGTAAGTCACCAGTAATTTGATCACAATCCGCCTGTATATCAC |
| SEQ ID NO: 44 | SNP_22 | susceptible | CC | CCCCTGCCTCRTACTAGTAGAGTAATTATACGTACCTCTTTGCTATGATTC<br>CTTTGGAAGTAAGTCACCAGTAATTTGATCACAATCCGCCTGTATATCAC |
| SEQ ID NO: 45 | SNP_23 | resistant | GG | CGAGGCAAGTTGCCACTTATCTTTGGAACAACTTCTTGGGGGGACGGTCAG<br>CAAATCGTCCACTTGGTGATGCCGTTTTAGATGGAATAGACTTTGATATT |
| SEQ ID NO: 46 | SNP_23 | susceptible | AA | CGAGGCAAGTTGCCACTTATCTTTGGAACAACTTCTTGGGGGGACGGTCAA<br>CAAATCGTCCACTTGGTGATGCCGTTTTAGATGGAATAGACTTTGATATT |
| SEQ ID NO: 47 | SNP_24 | resistant | GG | ATATGGACAGAGATCATCACTGTTGTGGTTGTCCAAATCATCTATCTAGTG<br>GTAAGAAAGGAGGGAGCAGTGTCAAGATAGAWGAACATGACCAGGATAAC |
| SEQ ID NO: 48 | SNP_24 | susceptible | AA | ATATGGACAGAGATCATCACTGTTGTGGTTGTCCAAATCATCTATCTAGTA<br>GTAAGAAAGGAGGGAGCAGTGTCAAGATAGAWGAACATGACCAGGATAAC |
| SEQ ID NO: 49 | SNP_25 | resistant | GG | ATGATAAGAGGCTGCAACCTGTTGGAACAGTAAACCTKCTAGCAAGAGTCG<br>ACAATTCTGGTTCCTCCGATAGAACAAATGAGGAGGGTGAAGTTTATGAG |
| SEQ ID NO: 50 | SNP_25 | susceptible | AA | ATGATAAGAGGCTGCAACCTGTTGGAACAGTAAACCTKCTAGCAAGAGTCA<br>ACAATTCTGGTTCCTCCGATAGAACAAATGAGGAGGGTGAAGTTTATGAG |
| SEQ ID NO: 51 | SNP_26 | resistant | AA | GATAACTGTTGCTGGTGGGAGATGACAGGTATCTCGTAGAGTTGGTCGAGA<br>TGCGCAAGCTGGCCCCGATACCATGGTTATCAAAAGAAATAGAAGCTAGA |
| SEQ ID NO: 52 | SNP_26 | susceptible | GG | GATAACTGTTGCTGGTGGGAGATGACAGGTATCTCGTAGAGTTGGTCGAGG<br>TGCGCAAGCTGGCCCCGATACCATGGTTATCAAAAGAAATAGAAGCTAGA |
| SEQ ID NO: 53 | SNP_27 | resistant | TT | ATAATATCAGGATAACTTATCCCAGAACAACTAATCCCAGCATAACTAATT<br>CCGGTATAATTTCAGGGTAAAATAACAGTCCCGGGATAAACTTTCAAAAA |
| SEQ ID NO: 54 | SNP_27 | susceptible | CC | ATAATATCAGGATAACTTATCCCAGAACAACTAATCCCAGCATAACTAATC<br>CCGGTATAATTTCAGGGTAAAATAACAGTCCCGGGATAAACTTTCAAAAA |
| SEQ ID NO: 55 | SNP_28 | resistant | AA | TCTGTTAATGGAGCTCGGAAGATTCAATGTCCATGAAGCTATTCAATCTTA<br>CGTTAATGGAACTCGGAAGATTCAATTTCCATTAATGGAACTCGGGATTA |
| SEQ ID NO: 56 | SNP_28 | susceptible | CC | TCTGTTAATGGAGCTCGGAAGATTCAATGTCCATGAAGCTATTCAATCTTC<br>CGTTAATGGAACTCGGAAGATTCAATTTCCATTAATGGAACTCGGGATTA |
| SEQ ID NO: 57 | SNP_29 | resistant | TT | GGAAGCTGAAATCAAATTATTAGACGGGTTTAGGCCAACGCGATCTCAAAT<br>ATTCCAGTCATTTTCTTGGACAAAATTTAAAATGACAATGCAAGCTTGAT |
| SEQ ID NO: 58 | SNP_29 | susceptible | GG | GGAAGCTGAAATCAAATTATTAGACGGGTTTAGGCCAACGCGATCTCAAAG<br>ATTCCAGTCATTTTCTTGGACAAAATTTAAAATGACAATGCAAGCTTGAT |
| SEQ ID NO: 59 | SNP_30 | resistant | GG | CTATCCAGAAAATAATTCAAAGTTCAAATGTGAATCGGAGCAAAAAGGACG<br>GAAAAGCTGTAGAAATTGGTACTGTAGAACTTCCTTGTGTGATTATATAC |
| SEQ ID NO: 60 | SNP_30 | susceptible | AA | CTATCCAGAAAATAATTCAAAGTTCAAATGTGAATCGGAGCAAAAAGGACA<br>GAAAAGCTGTAGAAATTGGTACTGTAGAACTTCCTTGTGTGATTATATAC |
| SEQ ID NO: 61 | SNP_31 | resistant | CC | AAGAATAGTTGCTCCATCAACRCGTACCTRCATGTTGCCAATAAGAGAGGC<br>AAACAGAAACAGCCCATAAATGCAGATTAAGATGGCTAAGAGAATCTCCC |
| SEQ ID NO: 62 | SNP_31 | susceptible | TT | AAGAATAGTTGCTCCATCAACRCGTACCTRCATGTTGCCAATAAGAGAGGT<br>AAACAGAAACAGCCCATAAATGCAGATTAAGATGGCTAAGAGAATCTCCC |
| SEQ ID NO: 63 | SNP_32 | resistant | GG | ATCAAATGATTTATAAGCCAAATGAAAAGAAAAGCAGGACCATACACCTG<br>AAATTTCGCAGCCCCACCAGAAGCAATATAAGAGTTTGGACCAAAAGTT |
| SEQ ID NO: 64 | SNP_32 | susceptible | TT | ATCAAATGATTTATAAGCCAAATGAAAAGAAAAGCAGGACCATACACCTT<br>AAATTTCGCAGCCCCACCAGAAGCAATATAAGAGTTTGGACCAAAAGTT |
| SEQ ID NO: 65 | SNP_33 | resistant | AA | ATAGCTGCTTAAAAGTATTTTTTAAATCGATTAGTTGAACTTGAACACAAA<br>CACAAACTAATTCTAATCAAGCTGATTTTAAAATCTTGGCCAAATAAACA |

TABLE 4-continued

SNP markers identified for QTL8

| SEQ ID NO | SNP | phenotype | SNP call | Sequence |
|---|---|---|---|---|
| SEQ ID NO: 66 | SNP_33 | susceptible | GG | ATAGCTGCTTAAAAGTATTTTTTAAATCGATTAGTTGAACTTGAACACAAG CACAAACTAATTCTAATCAAGCTGATTTTAAAATCTTGGCCAAATAAACA |
| SEQ ID NO: 67 | SNP_34 | resistant | TT | CTTTCAGATTCAGAGACAACATCTTAATCATTCAGATGTGCATTCAGTTTT AGACCTCTGAATCTTAAAAAAAAACAAATGCAGCCGAACATATTGTTATT |
| SEQ ID NO: 68 | SNP_34 | susceptible | CC | CTTTCAGATTCAGAGACAACATCTTAATCATTCAGATGTGCATTCAGTTTC AGACCTCTGAATCTTAAAAAAAAACAAATGCAGCCGAACATATTGTTATT |
| SEQ ID NO: 69 | SNP_35 | resistant | GG | AGGTTGATCTAGACCAGCTAGAAACTTTATATAGACCTCTTATTGCAAATG TCCTTGCAAAAAGACATTGTTCACATCAAATTGGGAAATATCCCACCTTT |
| SEQ ID NO: 70 | SNP_35 | susceptible | TT | AGGTTGATCTAGACCAGCTAGAAACTTTATATAGACCTCTTATTGCAAATT TCCTTGCAAAAAGACATTGTTCACATCAAATTGGGAAATATCCCACCTTT |
| SEQ ID NO: 71 | SNP_36 | resistant | CC | GGAGAAGGTTTCATTGAAATCAATCCCTTCCTTTTGAATGTCACCTCGAAC CACCAATCTAGCCTTTAGTCTCTCAAGAGTACCATTTGCATGTTGTTTAA |
| SEQ ID NO: 72 | SNP_36 | susceptible | TT | GGAGAAGGTTTCATTGAAATCAATCCCTTCCTTTTGAATGTCACCTCGAAT CACCAATCTAGCCTTTAGTCTCTCAAGAGTACCATTTGCATGTTGTTTAA |
| SEQ ID NO: 73 | SNP_37 | resistant | TT | ACACACTGCTGGAAATTACTCGACGACTTGATTGCATCAGAGGATAATGAT ATTGGTGTTCAGGTGAGAGTGATGGATCCACGGTGTAAATTCCATGACAT |
| SEQ ID NO: 74 | SNP_37 | susceptible | CC | ACACACTGCTGGAAATTACTCGACGACTTGATTGCATCAGAGGATAATGAC ATTGGTGTTCAGGTGAGAGTGATGGATCCACGGTGTAAATTCCATGACAT |
| SEQ ID NO: 75 | SNP_38 | resistant | AA | TGTCATTAACTTTAATTCTTATGCAAAATTTGGTAGGTGAGGGCAGGAAAA ACAAAGGAGCAACAGAGAAAACCAATAATCTCCCTTGCAACRTAAGACTT |
| SEQ ID NO: 76 | SNP_38 | susceptible | GG | TGTCATTAACTTTAATTCTTATGCAAAATTTGGTAGGTGAGGGCAGGAAAG ACAAAGGAGCAACAGAGAAAACCAATAATCTCCCTTGCAACRTAAGACTT |
| SEQ ID NO: 77 | SNP_39 | resistant | CC | GGAATGCAAAAGCTATGCAGGCATCCTGTATTTCAACTGAGTAAGCCAGTC AAGAAGAGCAGACTTATCGGGATTGTAAATAGTAGGAGAGGAGGCGGAGA |
| SEQ ID NO: 78 | SNP_39 | susceptible | GG | GGAATGCAAAAGCTATGCAGGCATCCTGTATTTCAACTGAGTAAGCCAGTG AAGAAGAGCAGACTTATCGGGATTGTAAATAGTAGGAGAGGAGGCGGAGA |
| SEQ ID NO: 79 | SNP_40 | resistant | AA | CTGGCAGAGAAGATTCAGAGAAATGTGTGACACTGAAACCAGATTAGATCA GCCTACACATCTACCATAATTAGTGCAAGATATGGCCTTTCAAACAATCT |
| SEQ ID NO: 80 | SNP_40 | susceptible | GG | CTGGCAGAGAAGATTCAGAGAAATGTGTGACACTGAAACCAGATTAGATCG GCCTACACATCTACCATAATTAGTGCAAGATATGGCCTTTCAAACAATCT |

Example 4

Characterization *Frankliniella occidentalis* Resistance Phenotype

Additional pepper lines were obtained using the method as described in Example 2. The upmentioned inbred lines H20_002409, H20_002410 were obtained originally from a cross between the lines 82709-0 and SOURCE03, while H20_002474 from a cross between a lamuyo type F7 inbred proprietary line and SOURCE03, followed then by at least one generation of selfing. The selfed segregating populations were then submitted to marker selection with the aim to select inbreds having different QTLs composition each in homozygous form. The accordingly obtained pepper lines were named H20_002409, which comprises both QTL7 and QTL8 as described herein, H20_002410, which comprises QTL8 but not QTL7 as described herein and H20_002474, which comprises QTL7 but not QTL8 as described herein.

Plants of the accordingly obtained pepper lines were subjected to the Thrips resistance test as described in Example 1. This Thrips resistance test comprised a positive control (named Check S) and a negative control (named check R). The S check is a waxy type F6 inbred proprietary line and the R check is a demre type F6 inbred proprietary line derived from an original cross between 82709-0 and SOURCE03, thus TPS50021, then combined with another proprietary inbred line followed by at least 5 cycles of selfing. The results of the Thrips resistance test are provided in Table 5 as provided herein below.

TABLE 5

Results of the Thrips resistance test with pepper lines comprising QTL7 and/or QTL8

| Tested pepper line | Average resistance level score | Standard error resistance level score |
|---|---|---|
| Check S | 4.1 | 0.08 |
| Check R | 8.6 | 0.11 |
| H20_002409 | 8.11 | 0.18 |
| H20_002410 | 7.41 | 0.18 |
| H20_002474 | 6.68 | 0.26 |

It was accordingly found that QTL8 provides an improved thrips resistance level when compared to QTL7. Furthermore, it was found that a plant comprising both QTL7 and QTL8 shows a further improved thrips resistance level when compared to a plant comprising only QTL7 and not QTL8 and when compared to a plant comprising only QTL8 and not QTL7.

The invention claimed is:

1. A cultivated *Capsicum annuum* plant comprising an introgression fragment on chromosome 8 comprising Quantitative Trait Locus QTL8, wherein said QTL8 confers an improved resistance to *Frankliniella occidentalis*, wherein QTL8 is located on chromosome 8 between SNP_21 located at nucleotide 51 of SEQ ID NO: 41 or at nucleotide 51 of a sequence comprising at least 95% sequence identity to SEQ ID NO: 41 and SNP_40 located at nucleotide 51 of SEQ ID NO: 79 or at nucleotide 51 of a sequence comprising at least 95% sequence identity to SEQ ID NO: 79, wherein the introgression fragment comprising QTL8 comprises a haplotype of at least one of the following markers:

SNP_21 comprising an Adenine located at nucleotide 51 of SEQ ID NO: 41 or at nucleotide 51 of a sequence comprising at least 95% sequence identity to SEQ ID NO: 41;

SNP_22 comprising a Thymine located at nucleotide 51 of SEQ ID NO: 43 or at nucleotide 51 of a sequence comprising at least 95% sequence identity to SEQ ID NO: 43 SNP_23 comprising a Guanine located at nucleotide 51 of SEQ ID NO: 45 or at nucleotide 51 of a sequence comprising at least 95% sequence identity to SEQ ID NO: 45;

SNP_24 comprising a Guanine located at nucleotide 51 of SEQ ID NO: 47 or at nucleotide 51 of a sequence comprising at least 95% sequence identity to SEQ ID NO: 47;

SNP_25 comprising a Guanine located at nucleotide 51 of SEQ ID NO: 49 or at nucleotide 51 of a sequence comprising at least 95% sequence identity to SEQ ID NO: 49;

SNP_26 comprising a Adenine located at nucleotide 51 of SEQ ID NO: 51 or at nucleotide 51 of a sequence comprising at least 95% sequence identity to SEQ ID NO: 51;

SNP_27 comprising a Thymine located at nucleotide 51 of SEQ ID NO: 53 or at nucleotide 51 of a sequence comprising at least 95% sequence identity to SEQ ID NO: 53;

SNP_28 comprising an Adenine located at nucleotide 51 of SEQ ID NO: 55 or at nucleotide 51 of a sequence comprising at least 95% sequence identity to SEQ ID NO: 55;

SNP_29 comprising a Thymine located at nucleotide 51 of SEQ ID NO: 57 or at nucleotide 51 of a sequence comprising at least 95% sequence identity to SEQ ID NO: 57;

SNP_30 comprising a Guanine located at nucleotide 51 of SEQ ID NO: 59 or at nucleotide 51 of a sequence comprising at least 95% sequence identity to SEQ ID NO: 59;

SNP_31 comprising a Cytosine located at nucleotide 51 of SEQ ID NO: 61 or at nucleotide 51 of a sequence comprising at least 95% sequence identity to SEQ ID NO: 61;

SNP_32 comprising a Guanine located at nucleotide 51 of SEQ ID NO: 63 or at nucleotide 51 of a sequence comprising at least 95% sequence identity to SEQ ID NO: 63;

SNP_33 comprising an Adenine located at nucleotide 51 of SEQ ID NO: 65 or at nucleotide 51 of a sequence comprising at least 95% sequence identity to SEQ ID NO: 65;

SNP_34 comprising a Thymine located at nucleotide 51 of SEQ ID NO: 67 or at nucleotide 51 of a sequence comprising at least 95% sequence identity to SEQ ID NO: 67;

SNP_35 comprising a Guanine located at nucleotide 51 of SEQ ID NO: 69 or at nucleotide 51 of a sequence comprising at least 95% sequence identity to SEQ ID NO: 69;

SNP_36 comprising a Cytosine located at nucleotide 51 of SEQ ID NO: 71 or at nucleotide 51 of a sequence comprising at least 95% sequence identity to SEQ ID NO: 71;

SNP_37 comprising a Thymine located at nucleotide 51 of SEQ ID NO: 73 or at nucleotide 51 of a sequence comprising at least 95% sequence identity to SEQ ID NO: 73;

SNP_38 comprising an Adenine located at nucleotide 51 of SEQ ID NO: 75 or at nucleotide 51 of a sequence comprising at least 95% sequence identity to SEQ ID NO: 75;

SNP_39 comprising a Cytosine located at nucleotide 51 of SEQ ID NO: 77 or at nucleotide 51 of a sequence comprising at least 95% sequence identity to SEQ ID NO: 77; and/or SNP_40 comprising an Adenine located at nucleotide 51 of SEQ ID NO: 79 or at nucleotide 51 of a sequence comprising at least 95% sequence identity to SEQ ID NO: 79, and wherein the *Capsicum annuum* plant is a non-pungent *Capsicum annuum* plant when QTL8 is present in heterozygous form.

2. The *Capsicum annuum* plant according to claim 1, wherein said plant further comprises an introgression fragment on chromosome 7 comprising Quantitative Trait Locus QTL7, wherein said QTL7 confers an improved resistance to *Frankliniella occidentalis*, wherein QTL7 is located on chromosome 7 between SNP_01 located at nucleotide 51 of SEQ ID NO: 1 or at nucleotide 51 of a sequence comprising at least 95% sequence identity to SEQ ID NO: 1 and SNP_20 located at nucleotide 51 of SEQ ID NO: 39 or at nucleotide 51 of a sequence comprising at least 95% sequence identity to SEQ ID NO: 39.

3. The *Capsicum annuum* plant according to claim 2, wherein the introgression fragment comprising QTL7 comprises a haplotype of at least one of the following markers:

SNP_01 comprising a Thymine located at nucleotide 51 of SEQ ID NO: 1 or at nucleotide 51 of a sequence comprising at least 95% sequence identity to SEQ ID NO: 1;

SNP_02 comprising a Thymine located at nucleotide 51 of SEQ ID NO: 3 or at nucleotide 51 of a sequence comprising at least 95% sequence identity to SEQ ID NO: 3;

SNP_03 comprising an Adenine located at nucleotide 51 of SEQ ID NO: 5 or at nucleotide 51 of a sequence comprising at least 95% sequence identity to SEQ ID NO: 5;

SNP_04 comprising a Cytosine located at nucleotide 51 of SEQ ID NO: 7 or at nucleotide 51 of a sequence comprising at least 95% sequence identity to SEQ ID NO: 7;

SNP_05 comprising an Adenine located at nucleotide 51 of SEQ ID NO: 9 or at nucleotide 51 of a sequence comprising at least 95% sequence identity to SEQ ID NO: 9;

SNP_06 comprising an Adenine located at nucleotide 51 of SEQ ID NO: 11 or at nucleotide 51 of a sequence comprising at least 95% sequence identity to SEQ ID NO: 11;

SNP_07 comprising a Guanine located at nucleotide 51 of SEQ ID NO: 13 or at nucleotide 51 of a sequence comprising at least 95% sequence identity to SEQ ID NO: 13;

SNP_08 comprising a Guanine located at nucleotide 51 of SEQ ID NO: 15 or at nucleotide 51 of a sequence comprising at least 95% sequence identity to SEQ ID NO: 15;

SNP_09 comprising a Cytosine located at nucleotide 51 of SEQ ID NO: 17 or at nucleotide 51 of a sequence comprising at least 95% sequence identity to SEQ ID NO: 17;

SNP_10 comprising a Guanine located at nucleotide 51 of SEQ ID NO: 19 or at nucleotide 51 of a sequence comprising at least 95% sequence identity to SEQ ID NO: 19;

SNP_11 comprising a Guanine located at nucleotide 51 of SEQ ID NO: 21 or at nucleotide 51 of a sequence comprising at least 95% sequence identity to SEQ ID NO: 21;

SNP_12 comprising a Thymine located at nucleotide 51 of SEQ ID NO: 23 or at nucleotide 51 of a sequence comprising at least 95% sequence identity to SEQ ID NO: 23;

SNP_13 comprising an Adenine located at nucleotide 51 of SEQ ID NO: 25 or at nucleotide 51 of a sequence comprising at least 95% sequence identity to SEQ ID NO: 25;

SNP_14 comprising a Thymine located at nucleotide 51 of SEQ ID NO: 27 or at nucleotide 51 of a sequence comprising at least 95% sequence identity to SEQ ID NO: 27;

SNP_15 comprising a Thymine located at nucleotide 51 of SEQ ID NO: 29 or at nucleotide 51 of a sequence comprising at least 95% sequence identity to SEQ ID NO: 29;

SNP_16 comprising a Guanine located at nucleotide 51 of SEQ ID NO: 31 or at nucleotide 51 of a sequence comprising at least 95% sequence identity to SEQ ID NO: 31;

SNP_17 comprising a Thymine located at nucleotide 51 of SEQ ID NO: 33 or at nucleotide 51 of a sequence comprising at least 95% sequence identity to SEQ ID NO: 33;

SNP_18 comprising a Thymine located at nucleotide 51 of SEQ ID NO: 35 or at nucleotide 51 of a sequence comprising at least 95% sequence identity to SEQ ID NO: 35;

SNP_19 comprising an Adenine located at nucleotide 51 of SEQ ID NO: 37 or at nucleotide 51 of a sequence comprising at least 95% sequence identity to SEQ ID NO: 37; and/or SNP_20 comprising a Guanine located at nucleotide 51 of SEQ ID NO: 39 or at nucleotide 51 of a sequence comprising at least 95% sequence identity to SEQ ID NO: 39.

4. The *Capsicum annuum* plant according to claim 1, wherein QTL8 is as present in, or as obtainable from, or as obtained from, or as comprised in the genome of a *Capsicum annuum* plant designated H19_020279-044 of which a representative number of seeds have been deposited under deposit number NCIMB 43623.

5. The *Capsicum annuum* plant according to claim 1, wherein QTL8 is present in homozygous form.

6. The *Capsicum annuum* plant according to claim 1, wherein the plant is a non-pungent *Capsicum annuum* plant.

7. The *Capsicum annuum* plant according to claim 1, wherein the plant is an inbred plant, a dihaploid plant or a hybrid plant.

8. Seed produced by the *Capsicum annuum* plant according to claim 1, wherein the seed comprises QTL8 as defined in claim 1.

9. A seed from which the *Capsicum annuum* plant according to claim 1 can be grown.

10. A plant cell, tissue or plant part of the *Capsicum annuum* plant according to claim 1, comprising QTL8 as defined in claim 1.

11. A method for producing a *Capsicum annuum* plant having a *Frankliniella occidentalis* resistance phenotype, said method comprising the step(s) of:
(i) crossing a first *Capsicum annuum* plant and a second plant, wherein the first *Capsicum annuum* plant comprises in its genome QTL8 as defined in claim 1; and
(ii) optionally harvesting seed from the crossing of (i) and selecting seed comprising QTL8 and optionally QTL7 in its genome.

12. The method according to claim 11, wherein in step (i) both the first *Capsicum annuum* plant and the second plant are plants according to claim 1.

13. The *Capsicum annuum* plant according to claim 2, wherein QTL8 and QTL 7 are as present in, or as obtainable from, or as obtained from, or as comprised in the genome of a *Capsicum annuum* plant designated H19_020279-044 of which a representative number of seeds have been deposited under deposit number NCIMB 43623.

14. The *Capsicum annuum* plant according to claim 2, wherein QTL7 and QTL8 are present in homozygous form.

15. Seed produced by the *Capsicum annuum* plant according to claim 2, wherein the seed comprises QTL8 and QTL7 as defined in claim 3.

16. A plant cell, tissue or plant part of the *Capsicum annuum* plant according to claim 2, comprising QTL8 and QTL7 as defined in claim 2.

17. A method for producing a *Capsicum annuum* plant having a *Frankliniella occidentalis* resistance phenotype, said method comprising the step(s) of:
(i) crossing a first *Capsicum annuum* plant and a second plant, wherein the first *Capsicum annuum* plant comprises in its genome QTL8 and QTL7 as defined in claims 2; and
(ii) optionally harvesting seed from the crossing of (i) and selecting seed comprising QTL8 and QTL7 in its genome.

* * * * *